(12) United States Patent
Chaffee

(10) Patent No.: US 7,657,477 B1
(45) Date of Patent: Feb. 2, 2010

(54) GAMING SYSTEM PROVIDING SIMULATED SECURITIES TRADING

(75) Inventor: Arthur Willard Chaffee, Del Mar, CA (US)

(73) Assignee: SummaLP Applications Inc., Del Mar, CA (US)

(*) Notice: Subject to any disclaimer, the term of this patent is extended or adjusted under 35 U.S.C. 154(b) by 533 days.

(21) Appl. No.: 10/970,115

(22) Filed: Oct. 21, 2004

Related U.S. Application Data

(60) Provisional application No. 60/513,314, filed on Oct. 21, 2003.

(51) Int. Cl.
*G06Q 40/00* (2006.01)
*A63F 9/24* (2006.01)

(52) U.S. Cl. .......................... 705/36 R; 463/1

(58) Field of Classification Search ............... 705/36 R, 705/35, 37, 36 T, 1, 10, 26; 273/256; 463/16, 463/25, 42, 1, 17
See application file for complete search history.

(56) References Cited

U.S. PATENT DOCUMENTS

| | | | | |
|---|---|---|---|---|
| 4,363,489 A | * | 12/1982 | Chodak et al. | 273/237 |
| 4,431,195 A | * | 2/1984 | Brand et al. | 273/256 |
| 4,799,156 A | | 1/1989 | Shavit et al. | |
| 4,856,788 A | * | 8/1989 | Fischel | 273/256 |
| 4,913,446 A | * | 4/1990 | Winkelman | 273/240 |
| 4,953,085 A | | 8/1990 | Atkins | |
| 5,644,727 A | | 7/1997 | Atkins | |
| 5,713,793 A | * | 2/1998 | Holte | 463/25 |
| 5,819,238 A | | 10/1998 | Fernholz | |
| 5,826,878 A | | 10/1998 | Kiyosaki et al. | |
| 5,842,185 A | | 11/1998 | Chancey et al. | |
| 5,846,132 A | * | 12/1998 | Junkin | 463/42 |
| 5,875,435 A | | 2/1999 | Brown | |
| 5,890,963 A | * | 4/1999 | Yen | 463/42 |
| 5,903,881 A | | 5/1999 | Schrader et al. | |
| 5,911,136 A | | 6/1999 | Atkins | |
| 5,934,674 A | * | 8/1999 | Bukowsky | 273/278 |
| 5,950,176 A | * | 9/1999 | Keiser et al. | 705/36 R |
| 5,963,925 A | | 10/1999 | Kolling et al. | |
| 6,078,904 A | * | 6/2000 | Rebane | 705/36 R |
| 6,080,063 A | * | 6/2000 | Khosla | 463/42 |
| 6,155,927 A | * | 12/2000 | Levasseur et al. | 463/42 |
| 6,173,270 B1 | | 1/2001 | Cristofich et al. | |

(Continued)

OTHER PUBLICATIONS

Anonymous "E*Trade Launches Stock Game Based on TV Hit(E*Trade Securities launches the 'Stock Survivor' online investing game)" Oct. 23, 2000 Financial NetNews , v V, n 43, p. 4.*

(Continued)

*Primary Examiner*—Kelly Campen
(74) *Attorney, Agent, or Firm*—Foley & Lardner LLP

(57) ABSTRACT

A trading game allows players to engage in trading based on real-world prices of real-world securities. Simulated positions of real-world securities in player portfolios may be opened and closed in accordance with instructions provided by each player. The performance of each player may be tracked relative to an index. A tradescreen may be generated for displaying current financial information of a portfolio of a player and for entering hypothetical data to produce revised financial information. The hypothetical data may be submitted to update the portfolio of the player.

27 Claims, 89 Drawing Sheets

U.S. PATENT DOCUMENTS

| | | | |
|---|---|---|---|
| 6,175,824 B1 * | 1/2001 | Breitzman et al. | 705/36 R |
| 6,371,848 B1 * | 4/2002 | Ashby | 463/1 |
| 6,371,855 B1 * | 4/2002 | Gavriloff | 463/42 |
| 6,687,681 B1 * | 2/2004 | Schulz et al. | 705/36 T |
| 6,773,350 B2 * | 8/2004 | Yoshimi et al. | 463/42 |
| 7,006,991 B2 * | 2/2006 | Keiser et al. | 705/37 |
| 7,031,937 B2 * | 4/2006 | Brown et al. | 705/36 T |
| 7,165,044 B1 * | 1/2007 | Chaffee | 705/37 |
| 2002/0194106 A1 | 12/2002 | Kocher | |
| 2003/0101125 A1 | 5/2003 | McGill et al. | |
| 2003/0199319 A1 * | 10/2003 | Culbert | 463/42 |
| 2004/0064395 A1 | 4/2004 | Mintz et al. | |
| 2005/0064937 A1 * | 3/2005 | Ballman | 463/40 |

OTHER PUBLICATIONS

Anonymous "iBolsa cria jogo para atrair novos investidores(lBolsa is introducing the Torneio iBolsa game that will simulate games in the stock market )" Nov. 1, 2000 Gazeta Mercantil , p. 1.*

Joelson,Daniel "Online Trading Craze in Latin America (Latin America's financial institutions are refining or reconfiguring their online trading offerings )" May 2001, Bank Technology News , v 14 , n 5, p. 1.*

* cited by examiner

Financial Position - As of November 6, 2002

Assets

| | | |
|---|---|---:|
| Cash | $ | 32,901 |
| Cash Restricted | | 34,204 |
| Cash Receivable | | 0 |
| Investment Portfolio | | 121,380 |
| | $ | 188,485 |

Liabilities & Net Worth

| | | |
|---|---|---:|
| Margin Payable | $ | 19,500 |
| Taxes Payable | | (1,919) |
| Net Worth - Cash Invested | | 113,005 |
| Net Worth after Taxes | | 57,899 |
| | $ | 188,485 |

Financial Performance - January 1, 2001 through November 6, 2002

| Profit/Loss Activity | | | Revenues | Long Open Amount | Avg Cash Invested |
|---|---|---:|---:|---:|---:|
| | | | | $ 168,314 | $ 47,948 |
| Gross Gains/Losses | $ | (2,130) | 142.29 % | (1.27)% | (4.44)% |
| Dividends/Interest | | 633 | (42.29)% | 0.38 % | 1.32 % |
| Revenues | $ | (1,497) | 100.00 % | (0.89)% | (3.12)% |
| Commissions, Fees & Costs | $ | 298 | (19.91)% | 0.18 % | 0.62 % |
| Margin Interest | | 100 | (6.68)% | 0.06 % | 0.21 % |
| Expenses | $ | 398 | (26.59)% | 0.24 % | 0.83 % |
| Profit/Loss before Taxes | $ | (1,895) | 126.59 % | (1.13)% | (3.95)% |
| State and Federal Taxes | | (419) | 28.02 % | (0.25)% | (0.87)% |
| Profit/Loss after Taxes | $ | (1,476) | 98.57 % | (0.88)% | (3.08)% |

XML

FIG. 6

Cash Balance Activity - As of November 5, 2002

| Date | Symbol | Description | Receipts | Disbursed | Balance |
|---|---|---|---|---|---|
| 01/10/2002 | IBM | Stock Long Margin Borrowed | $ 4,000 | $ | $ 4,000 |
| 01/10/2002 | IBM | Stock Long Open | | 9,425 | (5,425) |
| 01/10/2002 | IBM | Stock Long Commission Open | | 25 | (5,450) |
| 01/10/2002 | IBM | Stock Long Other Costs Open | | 2 | (5,452) |
| 02/16/2002 | IBM | Cash Dividend | 33 | | (5,419) |
| 03/02/2002 | AOL | Stock Long Close | 11,175 | | 5,756 |
| 03/02/2002 | AOL | Stock Gain ST | 2,050 | | 7,806 |
| 03/02/2002 | AOL | Stock Long Commission Close | | 35 | 7,771 |
| 03/02/2002 | AOL | Stock Long Other Costs Close | | 3 | 7,768 |
| 03/02/2002 | AOL | Stock Long Margin Paid | | 1,000 | 6,768 |
| 03/13/2002 | IBM | Stock Long Commission Close | | 13 | 6,755 |
| 03/13/2002 | IBM | Stock Long Other Costs Close | | 2 | 6,753 |
| 03/13/2002 | IBM | Stock Long Margin Paid | | 11,000 | (4,247) |
| 03/13/2002 | IBM | Stock Long Close | 11,487 | | 7,240 |
| 03/13/2002 | IBM | Stock Gain ST | 1,787 | | 9,027 |
| 03/15/2002 | | Cash Interest Earned | 600 | | 9,627 |
| 03/15/2002 | | Cash Withdrawal State Taxes | | 400 | 9,227 |
| 03/15/2002 | | Margin Interest Paid | | 100 | 9,127 |
| 03/15/2002 | | Cash Withdrawal Federal Taxes | | 1,100 | 8,027 |
| 03/17/2002 | SNE | Stock Long Open | | 73,140 | (65,113) |
| 03/17/2002 | SNE | Stock Long Margin Borrowed | 12,500 | | (52,613) |
| 03/17/2002 | SNE | Stock Long Commission Open | | 10 | (52,623) |
| 03/17/2002 | SNE | Stock Long Other Costs Open | | 5 | (52,628) |
| 03/25/2002 | F | Stock Long Commission Close | | 13 | (52,641) |
| 03/25/2002 | F | Stock Long Other Costs Close | | 4 | (52,645) |
| 03/25/2002 | F | Stock Long Close | 1,506 | | (51,139) |
| 03/25/2002 | F | Stock Gain ST | 250 | | (50,889) |
| 04/02/2002 | HP | Stock Gain ST | 376 | | (50,513) |
| 04/02/2002 | HP | Stock Short Close | | 8,650 | (59,163) |
| 04/02/2002 | HP | Stock Short Commission Close | | 36 | (59,199) |
| 04/02/2002 | HP | Stock Short Other Costs Close | | 4 | (59,203) |
| 04/04/2002 | CH | Stock Long Open | | 870 | (60,073) |
| 04/04/2002 | CH | Stock Long Commission Open | | 12 | (60,085) |
| 04/04/2002 | CH | Stock Long Other Costs Open | | 3 | (60,088) |
| 04/05/2002 | S | Stock Short Close | | 8,472 | (68,560) |
| 04/05/2002 | S | Stock Short Commission Close | | 12 | (68,572) |
| 04/05/2002 | S | Stock Short Other Costs Close | | 5 | (68,577) |
| 04/05/2002 | T | Stock Long Other Costs Close | | 2 | (68,579) |
| 04/05/2002 | T | Stock Long Commission Close | | 10 | (68,589) |
| 04/05/2002 | F | Stock Long Commission Close | | 12 | (68,601) |
| 04/05/2002 | F | Stock Long Other Costs Close | | 5 | (68,606) |
| 04/05/2002 | F | Stock Loss ST | | 305 | (68,911) |
| 04/05/2002 | S | Stock Short Close | | 4,236 | (73,147) |
| 04/05/2002 | S | Stock Short Other Costs Close | | 3 | (73,150) |
| 04/05/2002 | S | Stock Short Commission Close | | 10 | (73,160) |
| 04/05/2002 | S | Stock Gain ST | 478 | | (72,682) |
| 04/05/2002 | T | Stock Long Close | 4,725 | | (67,957) |
| 04/05/2002 | T | Stock Gain ST | 1,254 | | (66,703) |
| 04/05/2002 | F | Stock Long Close | 1,506 | | (65,197) |

FIG. 7

| | | | | | |
|---|---|---|---|---|---|
| 04/05/2002 | | Initial Cash | 50,000 | | (14,741) |
| 04/09/2002 | HP | Stock Short Commission Close | | 12 | (14,753) |
| 04/09/2002 | HP | Stock Short Other Costs Close | | 5 | (14,758) |
| 04/09/2002 | HP | Stock Loss ST | | 501 | (15,259) |
| 04/09/2002 | HP | Stock Short Close | | 4,325 | (19,584) |
| 05/30/2002 | | Cash Deposit | 60,000 | | 40,416 |
| 06/05/2002 | C | Stock Long Margin Borrowed | 10,000 | | 50,416 |
| 06/05/2002 | C | Stock Long Open | | 17,500 | 32,916 |
| 06/05/2002 | C | Stock Long Commission Open | | 10 | 32,906 |
| 06/05/2002 | C | Stock Long Other Costs Open | | 5 | 32,901 |

FIG. 8

| Cash Restricted Activity - As of November 6, 2002 | | | | | |
|---|---|---|---|---|---|
| Date | Symbol | Description | Receipts | Disbursed | Balance |
| 01/05/2002 | S | Stock Short Open Prior | $ 8,472 | $ | $ 8,472 |
| 01/05/2002 | S | Stock Short Open Prior | 4,236 | | 12,708 |
| 01/05/2002 | S | Stock Short Open Prior | 4,236 | | 16,944 |
| 03/10/2002 | HP | Stock Short Open | 4,325 | | 21,269 |
| 03/10/2002 | HP | Stock Short Open | 4,325 | | 25,594 |
| 03/10/2002 | HP | Stock Short Open | 8,650 | | 34,244 |
| 03/10/2002 | HP | Stock Short Commission Open | | 9 | 34,235 |
| 03/10/2002 | HP | Stock Short Other Costs Open | | 1 | 34,234 |
| 03/10/2002 | HP | Stock Short Commission Open | | 9 | 34,225 |
| 03/10/2002 | HP | Stock Short Other Costs Open | | 1 | 34,224 |
| 03/10/2002 | HP | Stock Short Commission Open | | 18 | 34,206 |
| 03/10/2002 | HP | Stock Short Other Costs Open | | 2 | 34,204 |

FIG. 9

Investment Portfolio - As of November 6, 2002

| | Symbol | Term | Shares | Price $ Current | Price $ Open | Price $ Change | Market Value | Gain/Loss Amount | Gain/Loss % Change |
|---|---|---|---|---|---|---|---|---|---|
| | Securities (Long), Mutual Funds | | | | | | | | |
| © | AOL | LT | 500 | 15.97 | 22.35 | (6.38) | $ 7,985 | $ (3,190) | (28.55)% |
| © | C | ST | 500 | 37.53 | 35.00 | 2.53 | 18,765 | 1,265 | 7.23% |
| © | CH | ST | 100 | 7.11 | 8.70 | (1.59) | 711 | (159) | (18.28)% |
| © | F | LT | 100 | 9.18 | 15.06 | (5.88) | 918 | (588) | (39.04)% |
| © | IBM | ST | 100 | 80.57 | 94.25 | (13.68) | 8,057 | (1,368) | (14.51)% |
| © | IBM | LT | 50 | 80.57 | 76.58 | 3.99 | 4,029 | 200 | 5.21% |
| © | IBM | ST | 125 | 80.57 | 75.56 | 5.01 | 10,072 | 627 | 6.63% |
| © | SNE | ST | 1,500 | 44.65 | 48.76 | (4.11) | 66,975 | (6,165) | (8.43)% |
| © | T | ST | 700 | 13.95 | 15.75 | (1.80) | 9,765 | (1,260) | (11.43)% |
| | | | | | | | $ 127,276 | $ (10,639) | (7.71)% |
| | Securities (Short) | | | | | | | | |
| © | HP | ST | 100 | 28.64 | 43.25 | (14.61) | $ 2,864 | $ 1,461 | 51.01% |
| © | S | ST | 100 | 27.88 | 42.36 | (14.48) | 2,788 | 1,448 | 51.94% |
| | | | | | | | $ 5,652 | $ 2,909 | 33.98% |
| Totals | | | | | | | $ 121,624 | $ (7,730) | |

FIG. 10

Gains / Losses (Gross) - January 1, 2001 through November 6, 2002

| Symbol | Position Type | Date Bought | Date Sold | Open Amount | Gross Gains / Losses Realized | Gross Gains / Losses Unrealized | Total |
|---|---|---|---|---|---|---|---|
| AOL | L-Stock | 08/15/2001 | 03/02/2002 | $ 11,175 | $ 2,050 | $ | $ 2,050 |
| AOL | L-Stock | 08/15/2001 | | 11,175 | | (3,190) | (3,190) |
| C | L-Stock | 06/05/2002 | | 17,500 | | 1,265 | 1,265 |
| CH | L-Stock | 04/04/2002 | | 870 | | (159) | (159) |
| F | L-Stock | 03/10/2001 | 03/25/2002 | 1,506 | 250 | | 250 |
| F | L-Stock | 03/10/2001 | 04/05/2002 | 1,506 | (305) | | (305) |
| F | L-Stock | 03/10/2001 | | 1,506 | | (588) | (588) |
| HP | S-Stock | | 03/10/2002 | (4,325) | | 1,461 | 1,461 |
| HP | S-Stock | 04/02/2002 | 03/10/2002 | (8,650) | 376 | | 376 |
| HP | S-Stock | 04/09/2002 | 03/10/2002 | (4,325) | (501) | | (501) |
| IBM | L-Stock | 03/23/2000 | | 3,829 | | 200 | 200 |
| IBM | L-Stock | 01/10/2002 | | 9,425 | | (1,368) | (1,368) |
| IBM | L-Stock | 03/23/2000 | 03/13/2002 | 11,487 | 1,787 | | 1,787 |
| IBM | L-Stock | 04/16/2002 | | 9,445 | | 627 | 627 |
| S | S-Stock | 04/05/2002 | 01/05/2002 | (8,472) | 478 | | 478 |
| S | S-Stock | 04/05/2002 | 01/05/2002 | (4,236) | 456 | | 456 |
| S | S-Stock | | 01/05/2002 | (4,236) | | 1,448 | 1,448 |
| SNE | L-Stock | 03/17/2002 | | 73,140 | | (6,165) | (6,165) |
| T | L-Stock | 04/05/2002 | 04/05/2002 | 4,725 | 1,254 | | 1,254 |
| T | L-Stock | 04/05/2002 | | 11,025 | | (1,260) | (1,260) |
| | | | | $ 134,070 | $ 5,845 | $ (7,730) | $ (1,885) |

FIG. 11

| Dividend/Interest – January 1, 2001 through November 5, 2002 | | | | | |
|---|---|---|---|---|---|
| Date | Symbol | Description | Disbursed | Receipts | Balance |
| 02/16/2002 | IBM | Cash Dividend | | 33 | 33 |
| 03/15/2002 | | Cash Interest Earned | | 600 | 633 |

FIG. 12

Commissions, Fees and Costs Activity - January 1, 2001 throughNovember 6, 2002 

| Date | Symbol | Description | Disbursed | Receipts | Balance |
|---|---|---|---|---|---|
| 01/10/2002 | IBM | Stock Long Commission Open | $ 25 | $ | $ 25 |
| 01/10/2002 | IBM | Stock Long Other Costs Open | 2 | | 27 |
| 03/02/2002 | AOL | Stock Long Commission Close | 35 | | 62 |
| 03/02/2002 | AOL | Stock Long Other Costs Close | 3 | | 65 |
| 03/10/2002 | HP | Stock Short Commission Open | 18 | | 83 |
| 03/10/2002 | HP | Stock Short Other Costs Open | 2 | | 85 |
| 03/10/2002 | HP | Stock Short Commission Open | 9 | | 94 |
| 03/10/2002 | HP | Stock Short Other Costs Open | 1 | | 95 |
| 03/10/2002 | HP | Stock Short Commission Open | 9 | | 104 |
| 03/10/2002 | HP | Stock Short Other Costs Open | 1 | | 105 |
| 03/13/2002 | IBM | Stock Long Commission Close | 13 | | 118 |
| 03/13/2002 | IBM | Stock Long Other Costs Close | 2 | | 120 |
| 03/17/2002 | SNE | Stock Long Commission Open | 10 | | 130 |
| 03/17/2002 | SNE | Stock Long Other Costs Open | 5 | | 135 |
| 03/25/2002 | F | Stock Long Commission Close | 13 | | 148 |
| 03/25/2002 | F | Stock Long Other Costs Close | 4 | | 152 |
| 04/02/2002 | HP | Stock Short Commission Close | 36 | | 188 |
| 04/02/2002 | HP | Stock Short Other Costs Close | 4 | | 192 |
| 04/04/2002 | CH | Stock Long Commission Open | 12 | | 204 |
| 04/04/2002 | CH | Stock Long Other Costs Open | 3 | | 207 |
| 04/05/2002 | S | Stock Short Commission Close | 12 | | 219 |
| 04/05/2002 | S | Stock Short Other Costs Close | 5 | | 224 |
| 04/05/2002 | T | Stock Long Other Costs Close | 2 | | 226 |
| 04/05/2002 | T | Stock Long Commission Close | 10 | | 236 |
| 04/05/2002 | F | Stock Long Commission Close | 12 | | 248 |
| 04/05/2002 | F | Stock Long Other Costs Close | 5 | | 253 |
| 04/05/2002 | S | Stock Short Other Costs Close | 3 | | 256 |
| 04/05/2002 | S | Stock Short Commission Close | 10 | | 266 |
| 04/09/2002 | HP | Stock Short Commission Close | 12 | | 278 |
| 04/09/2002 | HP | Stock Short Other Costs Close | 5 | | 283 |
| 06/05/2002 | C | Stock Long Commission Open | 10 | | 293 |
| 06/05/2002 | C | Stock Long Other Costs Open | 5 | | 298 |

FIG. 13

Margin Interest - January through November 6, 2002

| Date | Description | Disbursed | Receipts | Balance |
|---|---|---|---|---|
| 03/15/2002 | Margin Interest Paid | 100 | | 100 |

FIG. 14

Tax Expenses - January 1, 2001 - November 6, 2002

| Term | Gains/Losses | | State Taxes | | Federal Taxes | | Tax Expenses |
|---|---|---|---|---|---|---|---|
| | Unrealized | Realized | Unrealized | Realized | Unrealized | Realized | |
| Short-Term | (4,151) | 4,113 | (444) | 410 | (1,398) | 1,293 | (138) |
| Long-Term | (3,578) | 1,732 | (180) | 83 | (684) | 316 | (465) |
| Dividend/Int | | 633 | | 63 | | 222 | 285 |
| | (7,730) | 6,478 | (624) | 557 | (2,082) | 1,830 | (319) |

FIG. 15

Tax Expenses - Short Term - January 1, 2001 through November 6, 2002

| | Gains/Losses | | State Taxes | | Federal Taxes | | Taxes |
|---|---|---|---|---|---|---|---|
| Symbol | Unrealized | Realized | Unrealized | Realized | Unrealized | Realized | Payable |
| AOL | | 1,999 | | 200 | | 630 | 830 |
| C | 1,250 | | 125 | | 394 | | 519 |
| CH | (174) | | (17) | | (55) | | (72) |
| W-HP | 1,263 | | 126 | | 398 | | 524 |
| W-HP | | 693 | | 69 | | 218 | 288 |
| W-HP | | (716) | | (72) | | (226) | (297) |
| IBM | (1,395) | | (139) | | (439) | | (579) |
| IBM | 627 | | 63 | | 197 | | 260 |
| S | | 453 | | 45 | | 143 | 188 |
| S | | 439 | | 44 | | 138 | 182 |
| S | 1,444 | | 144 | | 455 | | 599 |
| SNE | (6,180) | | (618) | | (1,947) | | (2,565) |
| T | | 1,237 | | 124 | | 390 | 513 |
| T | (1,273) | | (127) | | (401) | | (528) |
| | (4,438) | 4,104 | (444) | 410 | (1,398) | 1,293 | (138) |

PREV | NEXT

FIG. 16

Tax Expenses - Long Term - January 1, 2001 through November 6, 2002

| Symbol | Gains/Losses | | State Taxes | | Federal Taxes | | Taxes Payable |
|---|---|---|---|---|---|---|---|
| | Unrealized | Realized | Unrealized | Realized | Unrealized | Realized | |
| AOL | (3,204) | | (160) | | (609) | | (769) |
| F | | 229 | | 11 | | 43 | 55 |
| F | | (327) | | (16) | | (62) | (78) |
| F | (593) | | (30) | | (113) | | (142) |
| IBM | 196 | | 10 | | 37 | | 47 |
| IBM | | 1,761 | | 88 | | 335 | 423 |
| | (3,601) | 1,663 | (180) | 83 | (684) | 316 | (465) |

Tax Expenses – Dividend/Interest – January 1, 2001 through November 6, 2002

| Date | Symbol | Description | Amount | Taxes Payable | | Total |
|---|---|---|---|---|---|---|
| | | | | State | Federal | |
| 02/16/2002 | IBM | Cash Dividend | 33 | 3 | 12 | 15 |
| 03/15/2002 | | | 600 | 60 | 210 | 270 |
| | | | 633 | 63 | 222 | 285 |

Margin Payable Activity - As of November 6, 2002

| Date | Symbol | Description | Receipts | Disbursed | Balance |
|---|---|---|---|---|---|
| 01/10/2002 | IBM | Stock Long Margin Borrowed | | 4,000 | 4,000 |
| 03/02/2002 | AOL | Stock Long Margin Paid | 1,000 | | 3,000 |
| 03/13/2002 | IBM | Stock Long Margin Paid | 11,000 | | (8,000) |
| 03/17/2002 | SNE | Stock Long Margin Borrowed | | 12,500 | 4,500 |
| 04/05/2002 | | Initial Margin Balance | | 5,000 | 9,500 |
| 06/05/2002 | C | Stock Long Margin Borrowed | | 10,000 | 19,500 |

FIG. 19

Taxes Payable - As of November 6, 2002     [Previous Year] [?]

| Tax Type | Gains/Losses | | State Taxes | | Federal Taxes | | Taxes Payable |
|---|---|---|---|---|---|---|---|
| | Unrealized | Realized | Unrealized | Realized | Unrealized | Realized | |
| Short-Term | (4,438) | 4,104 | (444) | 410 | (1,398) | 1,293 | (138) |
| Long-Term | (3,601) | 1,663 | (180) | 83 | (684) | 316 | (465) |
| Dividend/Int | | 633 | | 63 | | 222 | 285 |
| | (8,039) | 6,400 | (624) | 557 | (2,082) | 1,830 | (319) |
| Taxes Paid | | | | (400) | | (1,100) | (1,500) |
| | | | | 157 | | 730 | (1,819) |

FIG. 20

Taxes Payable - Short Term - As of November 6, 2002

| Symbol | Gains/Losses Unrealized | Gains/Losses Realized | State Taxes Unrealized | State Taxes Realized | Federal Taxes Unrealized | Federal Taxes Realized | Taxes Payable |
|---|---|---|---|---|---|---|---|
| AOL |  | 1,999 |  | 200 |  | 630 | 830 |
| C | 1,250 |  | 125 |  | 394 |  | 519 |
| CH | (174) |  | (17) |  | (55) |  | (72) |
| W-HP | 1,263 |  | 126 |  | 398 |  | 524 |
| W-HP |  | 693 |  | 69 |  | 218 | 288 |
| W-HP |  | (716) |  | (72) |  | (226) | (297) |
| IBM | (1,395) |  | (139) |  | (439) |  | (579) |
| IBM | 627 |  | 63 |  | 197 |  | 260 |
| S |  | 453 |  | 45 |  | 143 | 188 |
| S |  | 439 |  | 44 |  | 138 | 182 |
| S | 1,444 |  | 144 |  | 455 |  | 599 |
| SNE | (6,180) |  | (618) |  | (1,947) |  | (2,565) |
| T |  | 1,237 |  | 124 |  | 390 | 513 |
| T | (1,273) |  | (127) |  | (401) |  | (528) |
| | (4,438) | 4,104 | (444) | 410 | (1,398) | 1,293 | (138) |

Taxes Payable - Long Term - As of November 6, 2002

| Symbol | Gains/Losses | | State Taxes | | Federal Taxes | | Taxes Payable |
|---|---|---|---|---|---|---|---|
| | Unrealized | Realized | Unrealized | Realized | Unrealized | Realized | |
| AOL | (3,204) | | (160) | | (609) | | (769) |
| F | | 229 | | 11 | | 43 | 55 |
| F | | (327) | | (16) | | (62) | (78) |
| F | (593) | | (30) | | (113) | | (142) |
| IBM | 196 | | 10 | | 37 | | 47 |
| IBM | | 1,761 | | 88 | | 335 | 423 |
| | (3,601) | 1,663 | (180) | 83 | (684) | 316 | (465) |

Cash Invested Activity As of November 6, 2002

| Date | Symbol | Description | Receipts | Disbursed | Balance |
|---|---|---|---|---|---|
| 03/23/2000 | IBM | Stock Long Open | $ | $ 3,833 | $ 3,833 |
| 03/23/2000 | IBM | Stock Long Open | | 11,498 | 15,331 |
| 03/10/2001 | F | Stock Long Open | | 1,511 | 16,842 |
| 03/10/2001 | F | Stock Long Open | | 1,511 | 18,353 |
| 03/10/2001 | F | Stock Long Open | | 1,511 | 19,864 |
| 08/15/2001 | AOL | Stock Long Open | | 11,189 | 31,053 |
| 08/15/2001 | AOL | Stock Long Open | | 11,189 | 42,242 |
| 01/05/2002 | S | Stock Short Open | | 4 | 42,246 |
| 01/05/2002 | S | Stock Short Open | | 4 | 42,250 |
| 01/05/2002 | S | Stock Short Open | | 8 | 42,258 |
| 01/10/2002 | IBM | Stock Long Open | | 5,452 | 47,710 |
| 02/16/2002 | IBM | Cash Dividend | 33 | | 47,677 |
| 03/02/2002 | AOL | Stock Long Close | 12,188 | | 35,489 |
| 03/10/2002 | HP | Stock Short Open | | 10 | 35,499 |
| 03/10/2002 | HP | Stock Short Open | | 20 | 35,519 |
| 03/10/2002 | HP | Stock Short Open | | 10 | 35,529 |
| 03/13/2002 | IBM | Stock Long Close | 2,259 | | 33,270 |
| 03/15/2002 | | Cash Interest Earned | 600 | | 32,670 |
| 03/17/2002 | SNE | Stock Long Open | | 60,655 | 93,325 |
| 03/25/2002 | F | Stock Long Close | 1,740 | | 91,585 |
| 04/02/2002 | HP | Stock Short Close | 20 | | 91,565 |
| 04/04/2002 | CH | Stock Long Open | | 885 | 92,450 |
| 04/05/2002 | T | Stock Long Open | | 4,730 | 97,180 |
| 04/05/2002 | T | Stock Long Open | | 11,038 | 108,218 |
| 04/05/2002 | F | Stock Long Close | 1,184 | | 107,034 |
| 04/05/2002 | T | Stock Long Close | 5,967 | | 101,067 |
| 04/05/2002 | S | Stock Short Close | 8 | | 101,059 |
| 04/05/2002 | S | Stock Short Close | 4 | | 101,055 |
| 04/05/2002 | | Initial Margin | 5,000 | | 96,055 |
| 04/09/2002 | HP | Stock Short Close | 10 | | 96,045 |
| 04/16/2002 | IBM | Stock Long Open | | 9,445 | 105,490 |
| 06/05/2002 | C | Stock Long Open | | 7,515 | 113,005 |

FIG. 25

Wash Sales - Status - As of November 6, 2002

Days until Year End to Eliminate Active Wash Sales          56

| Sym | Date Open | Date Close | Shares | Share Price Open | Share Price Close | Market | (Losses) |
|---|---|---|---|---|---|---|---|
| Active Wash Sales (non-qualified losses) | | | | | | | |
| HP | 03/10/2002 | N/A | 100.0 | 43.25 | 41.37 | 28.62 | (188) |
| Previous Year Wash Sales Eliminated (qualified losses) | | | | | | | |
| Current Year Wash Sales Eliminated (qualified losses) | | | | | | | |
| HP | 03/10/2002 | 04/02/2002 | 100.0 | 43.25 | 41.37 | 28.62 | (188) |

Wash Sales - Warnings - As of November 6, 2002

| Sym | Date | | Days to Expiration | Shares | Share Price | | | (Losses) |
|---|---|---|---|---|---|---|---|---|
| | Open | Close | | | Open | Close | Market | |

Wash Sale Creation by Opening Position

Wash Sale Creation by Closing Position

FIG. 27

Schedule D - Year 2002   [Previous Year ▾]

| Symbol | Shares | Date Acquired | Date Sold | Sales Price | Cost or Other Basis | Gain or Loss |
|---|---|---|---|---|---|---|
| Short-Term Capital Gains and Losses - Assets Held One Year or Less | | | | | | |
| AOL | 500.0 | 08/15/2001 | 03/02/2002 | 13,188 | 11,189 | 1,999 |
| HP | 200.0 | 04/02/2002 | 03/10/2002 | 8,630 | 8,313 | 317 |
| W-HP | 0.0 | 03/10/2002 | 04/09/2002 | 0 | 0 | .0 |
| W-HP | 0.0 | 03/10/2002 | N/A | 0 | 0 | 0 |
| HP | 100.0 | 04/09/2002 | 03/10/2002 | 4,315 | 4,843 | (528) |
| W-HP | 100.0 | 04/09/2002 | 03/10/2002 | 0 | 0 | 0 |
| T | 300.0 | 04/05/2002 | 04/05/2002 | 5,967 | 4,730 | 1,237 |
| S | 200.0 | 04/05/2002 | 01/05/2002 | 8,464 | 8,011 | 453 |
| S | 100.0 | 04/05/2002 | 01/05/2002 | 4,232 | 3,793 | 439 |
| | | | | 44,796 | 40,879 | 3,916 |
| Long-Term Capital Gains and Losses - Assets Held More Than One Year | | | | | | |
| F | 100.0 | 03/10/2001 | 03/25/2002 | 1,756 | 1,506 | 250 |
| F | 100.0 | 03/10/2001 | 04/05/2002 | 1,201 | 1,506 | (305) |
| IBM | 150.0 | 03/23/2000 | 03/13/2002 | 13,274 | 11,487 | 1,787 |
| | | | | 16,231 | 14,499 | 1,732 |
| | | | | 61,026 | 55,378 | 5,648 |

| | | |
|---|---|---|
| Open Short Positions | | 8,561 |
| Form 1099-B | | 69,587 |

Performance Detail - January 1, 2001 through November 6, 2002

| Profit / Loss | Financial Performance Detail | | |
|---|---|---|---|
| | Total | Unrealized Open to Date | Realized Year to Date |
| Gross Gains/Losses | $ (1,885) | $ (7,730) | $ 5,845 |
| Dividends/Interest | 633 | | 633 |
| Revenues | $ (1,252) | $ (7,730) | $ 6,478 |
| Commissions, Fees & Costs | $ 298 | $ | $ 298 |
| Margin Interest | 100 | | 100 |
| Expenses | $ 398 | $ 0 | $ 398 |
| Profit/Loss before Taxes | $ (1,650) | $ (7,730) | $ 6,080 |
| State and Federal Taxes | (319) | (2,706) | 2,387 |
| Profit/Loss after Taxes | $ (1,332) | $ (5,024) | $ 3,692 |

Commission Analysis - January 1, 2000 to November 6, 2002

| Symbol | Open Amount | Open Comm & Costs Amount | Open Comm & Costs Percentage | Closed Amount | Closed Comm & Costs Amount | Closed Comm & Costs Percentage | % of Gross Gain/Loss |
|---|---|---|---|---|---|---|---|
| AOL | 11,175 | 14 | 0.13% | 13,225 | 37 | 0.28% | 2.49% |
| AOL | 11,175 | 14 | 0.13% | 0 | 0 | 0.00% | 0.00% |
| C | 17,500 | 15 | 0.09% | 0 | 0 | 0.00% | 0.00% |
| CH | 870 | 15 | 1.72% | 0 | 0 | 0.00% | 0.00% |
| F | 1,506 | 5 | 0.33% | 1,756 | 17 | 0.94% | 8.60% |
| F | 1,506 | 5 | 0.33% | 1,201 | 17 | 1.42% | 0.00% |
| F | 1,506 | 5 | 0.33% | 0 | 0 | 0.00% | 0.00% |
| HP | 8,650 | 20 | 0.23% | 8,274 | 39 | 0.47% | 15.66% |
| HP | 4,325 | 10 | 0.23% | 4,826 | 17 | 0.35% | 0.00% |
| HP | 4,325 | 10 | 0.23% | 0 | 0 | 0.00% | 0.00% |
| IBM | 9,425 | 27 | 0.29% | 0 | 0 | 0.00% | 0.00% |
| IBM | 11,487 | 11 | 0.09% | 13,274 | 14 | 0.11% | 1.42% |
| IBM | 3,829 | 4 | 0.09% | 0 | 0 | 0.00% | 0.00% |
| IBM | 9,445 | 0 | 0.00% | 0 | 0 | 0.00% | 0.00% |
| S | 8,472 | 8 | 0.10% | 7,994 | 17 | 0.21% | 5.27% |
| S | 4,236 | 4 | 0.10% | 3,780 | 13 | 0.34% | 3.75% |
| S | 4,236 | 4 | 0.10% | 0 | 0 | 0.00% | 0.00% |
| SNE | 73,140 | 15 | 0.02% | 0 | 0 | 0.00% | 0.00% |
| T | 4,725 | 5 | 0.11% | 5,979 | 12 | 0.20% | 1.39% |
| T | 11,025 | 13 | 0.11% | 0 | 0 | 0.00% | 0.00% |
|  | 0 | 03 | 0.00% | 0 | 0 | 0.00% | 0.00% |

Short-Cash Restricted/Maintenance Requirements - As of November 6, 2002

| Symbol | Cash Restricted | Market Value | Equity Gain/Loss | Initial Req % | Initial Req Amount | Maintenance Req % | Maintenance Req Amount |
|---|---|---|---|---|---|---|---|
| HP | $ 4,315 | $ 2,860 | 1,465 | 50.00 | $ 1,430 | 30.00 | $ 1,497 |
| S | 4,232 | 2,786 | 1,450 | 50.00 | 1,393 | 30.00 | 1,466 |
| | $ 8,547 | $ 5,646 | 2,915 | | $ 2,823 | | $ 2,963 |

XML

FIG. 31

Long-Margin Available/Maintenance Requirements - As of November 6, 2002

| Symbol | Open Amount | Market Value | Margin Available | Initial Requirement % | Initial Requirement Amount | Maintenance Requirement % | Maintenance Requirement Amount |
|---|---|---|---|---|---|---|---|
| IBM | $ 9,425 | $ 8,040 | $ 4,020 | 50 | $ 4,020 | 25 | $ 2,010 |
| AOL | 11,175 | 7,995 | 3,998 | 50 | 3,998 | 25 | 1,999 |
| F | 1,506 | 912 | 456 | 50 | 456 | 25 | 228 |
| SNE | 73,140 | 66,885 | 33,443 | 50 | 33,443 | 25 | 16,721 |
| IBM | 3,829 | 4,020 | 2,010 | 50 | 2,010 | 25 | 1,005 |
| IBM | 9,445 | 10,050 | 5,025 | 50 | 5,025 | 25 | 2,513 |
| C | 17,500 | 18,740 | 9,370 | 50 | 9,370 | 25 | 4,685 |
| | $ 126,020 | $ 116,642 | $ 58,321 | | $ 58,321 | | $ 29,161 |

FIG. 32

Equity, Requirements & Buying Power - as of November 6, 2002

|  | Securities | | |
|---|---|---|---|
|  | Non-Margin | Margin | Total |
| Equity | $ 10,476 | $ 132,956 | $ 143,432 |
| Equity % | % 100.00 | % 100.00 | % 100.00 |

|  | Requirements | |
|---|---|---|
|  | Initial | Maintenance |
| Cash | $ 32,901 | $ 32,901 |
| Long Market Value - Marginable Securities | 116,642 | 116,642 |
| Shorts Gains/Losses | 2,913 | 2,913 |
| Assets before Margin Payable | $ 152,456 | $ 152,456 |
| Margin Payable | (19,500) | (19,500) |
| Equity Available before Requirements | $ 132,956 | $ 132,956 |
| Long Positions | (58,321) | (29,161) |
| Short Positions | (2,824) | (2,963) |
| Equity Available for Buying Power | $ 71,811 | |
| Maintenance Excess | | $ 100,832 |

| | |
|---|---|
| Current Buying Power (Assume 50% Initial Requirement) | $ 143,622 |
| Cash Available | $ 32,901 |
| Equity Utilized | $ (89) |
| Long Margin Available | $ 38,821 |
| Margin Payable | $ 19,500 |

FIG. 33

Return on Securities - Inception through November 6, 2002

| Symbol | Position Type | Date Bought | Date Sold | Gross Gain/Loss | Gross Return on Securities % Change | Monthly | Annualized (CAGR) |
|---|---|---|---|---|---|---|---|
| IBM | L-Stock | 03/23/2000 | 03/13/2002 | 1,787 | 15.55 | 0.63 | 7.60 |
| IBM | L-Stock | 03/23/2000 | | 194 | 5.05 | 0.16 | 1.89 |
| F | L-Stock | 03/10/2001 | 03/25/2002 | 250 | 16.60 | 1.32 | 15.90 |
| F | L-Stock | 03/10/2001 | 04/05/2002 | (305) | (20.25) | (1.59) | (19.04) |
| F | L-Stock | 03/10/2001 | | (595) | (39.51) | (2.18) | (26.12) |
| AOL | L-Stock | 08/15/2001 | 03/02/2002 | 2,050 | 18.34 | 3.02 | 36.20 |
| AOL | L-Stock | 08/15/2001 | | (3,175) | (28.41) | (1.99) | (23.84) |
| S | S-Stock | 04/05/2002 | 01/05/2002 | 478 | 5.98 | 2.21 | 26.56 |
| S | S-Stock | 04/05/2002 | 01/05/2002 | 456 | 12.06 | 4.89 | 58.71 |
| S | S-Stock | | 01/05/2002 | 1,450 | 52.05 | 5.43 | 65.12 |
| IBM | L-Stock | 01/10/2002 | | (1,380) | (14.64) | (1.46) | (17.52) |
| HP | S-Stock | 04/02/2002 | 03/10/2002 | 376 | 4.54 | 8.54 | 102.44 |
| HP | S-Stock | 04/09/2002 | 03/10/2002 | (501) | (10.38) | (6.14) | (73.65) |
| HP | S-Stock | | 03/10/2002 | 1,465 | 51.22 | 7.26 | 87.08 |
| SNE | L-Stock | 03/17/2002 | | (6,255) | (8.55) | (1.08) | (13.01) |
| CH | L-Stock | 04/04/2002 | | (159) | (18.28) | (2.41) | (28.90) |
| T | L-Stock | 04/05/2002 | 04/05/2002 | 1,254 | 26.54 | >9,999.99 | >9,999.99 |
| T | L-Stock | 04/05/2002 | | (1,267) | (11.49) | (1.56) | (18.72) |
| IBM | L-Stock | 04/16/2002 | | 611 | 6.47 | 0.99 | 11.87 |
| C | L-Stock | 06/05/2002 | | 1,210 | 6.91 | 1.43 | 17.16 |
| Portfolio Inception-to-Date CAGR | | | | | | | (1.56)% |

FIG. 34

Return On Cash Invested - Inception through November 6, 2002

| Date | Symbol | Description | Receipts | Disbursed | Balance |
|---|---|---|---|---|---|
| 03/23/2000 | IBM | Stock Long Open | $ | $ 3,833 | $ 3,833 |
| 03/23/2000 | IBM | Stock Long Open | | 11,498 | 15,331 |
| 03/10/2001 | F | Stock Long Open | | 1,511 | 16,842 |
| 03/10/2001 | F | Stock Long Open | | 1,511 | 18,353 |
| 03/10/2001 | F | Stock Long Open | | 1,511 | 19,864 |
| 08/15/2001 | AOL | Stock Long Open | | 11,189 | 31,053 |
| 08/15/2001 | AOL | Stock Long Open | | 11,189 | 42,242 |
| 01/05/2002 | S | Stock Short Open | | 4 | 42,246 |
| 01/05/2002 | S | Stock Short Open | | 4 | 42,250 |
| 01/05/2002 | S | Stock Short Open | | 8 | 42,258 |
| 01/10/2002 | IBM | Stock Long Open | | 5,452 | 47,710 |
| 02/16/2002 | IBM | Cash Dividend | 33 | | 47,677 |
| 03/02/2002 | AOL | Stock Long Close | 12,188 | | 35,489 |
| 03/10/2002 | HP | Stock Short Open | | 10 | 35,499 |
| 03/10/2002 | HP | Stock Short Open | | 20 | 35,519 |
| 03/10/2002 | HP | Stock Short Open | | 10 | 35,529 |
| 03/13/2002 | IBM | Stock Long Close | 2,259 | | 33,270 |
| 03/15/2002 | | Cash Interest Earned | 600 | | 32,670 |
| 03/17/2002 | SNE | Stock Long Open | | 60,655 | 93,325 |
| 03/25/2002 | F | Stock Long Close | 1,740 | | 91,585 |
| 04/02/2002 | HP | Stock Short Close | 20 | | 91,565 |
| 04/04/2002 | CH | Stock Long Open | | 885 | 92,450 |
| 04/05/2002 | T | Stock Long Open | | 4,730 | 97,180 |
| 04/05/2002 | T | Stock Long Open | | 11,038 | 108,218 |
| 04/05/2002 | F | Stock Long Close | 1,184 | | 107,034 |
| 04/05/2002 | T | Stock Long Close | 5,967 | | 101,067 |
| 04/05/2002 | S | Stock Short Close | 8 | | 101,059 |
| 04/05/2002 | S | Stock Short Close | 4 | | 101,055 |
| 04/05/2002 | | Initial Margin | 5,000 | | 96,055 |
| 04/09/2002 | HP | Stock Short Close | 10 | | 96,045 |
| 04/16/2002 | IBM | Stock Long Open | | 9,445 | 105,490 |
| 06/05/2002 | C | Stock Long Open | | 7,515 | 113,005 |
| Portfolio Inception-to-Date CAGR | | | | | (2.07)% |

| Symbol to Action | | | |
|---|---|---|---|
| Company Name | AOL - AMERICA ONLINE | | 3-4 |
| Exchange | NYSE | | |
| Delay | 20 minutes | Shares Outstanding | 2,308,897,000 |
| Last Price | 57.93 at 10:55 EDT | Market Capital | 133,754,403,210 |
| Change | Up 0.83 (+1.45%) | 52 - Week High | 95.81 |
| High | 58.25 at 10:47 EDT | 52 - Week Low | 48.18 |
| Low | 56.38 at 9:43 EDT | Beta | 2.48 |
| Open | 57.03 | Yield | Nil |
| Previous Close | 57.10 on 10/9 | P/E Ration | 120.69 |
| Volume | 3,327,100 | EPS | 0.48 |
| 30 - Day Average Volume | 10,236,000 | Currency Units | US Dollars |
| S/S/S | Calls | Puts | Buy Long Open | Sell Short Open |

3-14   3-12   3-10   3-6   3-8

Stock — 3-16

| | H/P | Date | Days Held | Type | Shares | Share Price (no c & oc) | Market Value | Net Gain/Loss | Net CAGR (pre-tax) |
|---|---|---|---|---|---|---|---|---|---|
| ⓒⒺⓍ | ☐ | 2/16/2001 | 406 | Long | 500 | 34.87 | 29,315 | 118,749 | 65.60% |
| ⓒⒺⓍ | ☐ | 9/15/2001 | 195 | Long | 200 | Stk Div | 11,726 | 11,726 | 0.00% |
| ⓒⒺⓍ | ☐ | 2/16/2001 | 406 | Short | 500 | (34.87) | 29,315 | 118,749 | 65.60% |
| ⓒⒺⓍ | ☐ | 9/15/2001 | 195 | Short | 200 | (34.87) | 11,726 | 11,726 | 65.60% |
| | | | | | | | Sell to Open | Buy to Open | |

Puts — 3-18

| | H/P | Date Open | Date Expire | Type | Contracts | Price Open | Strike | Net Gain/Loss | Net CAGR (pre-tax) |
|---|---|---|---|---|---|---|---|---|---|
| ⓒⒺⓍ | ☐ | 02/16/01 | 02/16/01 | Long | 10 | 2.50 | 35.50 | 118,749 | 65.60% |
| ⓒⒺⓍ | ☐ | 09/15/01 | 09/15/01 | Long | 5 | 4.25 | 55.25 | 11,726 | 65.60% |
| ⓒⒺⓍ | ☐ | 02/16/01 | 02/16/01 | Shrt-Cov | 10 | (2.50) | 45.65 | 118,749 | 65.60% |
| ⓒⒺⓍ | ☐ | 09/15/01 | 09/15/01 | Shrt-UnCov | 15 | (3.50) | 24.50 | 11,726 | 65.60% |
| | | | | Sell to Open-Cov | | Sell to Open-UnCov | | Buy to Open | |

Calls — 3-20

| | H/P | Date Open | Date Expire | Type | Contracts | Price Open | Strike | Net Gain/Loss | Net CAGR (pre-tax) |
|---|---|---|---|---|---|---|---|---|---|
| ⓒⒺⓍ | ☐ | 02/16/01 | 02/16/01 | LG | 10 | 2.50 | 35.50 | 118,749 | 65.60% |
| ⓒⒺⓍ | ☐ | 09/15/01 | 09/15/01 | LG | 5 | 4.25 | 55.25 | 11,726 | 65.60% |
| ⓒⒺⓍ | ☐ | 02/16/01 | 02/16/01 | SH-C | 10 | (2.50) | 45.65 | 118,749 | 65.60% |
| ⓒⒺⓍ | ☐ | 09/15/01 | 09/15/01 | SH-UC | 15 | (3.50) | 24.50 | 11,726 | 65.60% |
| | | | | Sell to Open-Cov | | Sell to Open-UnCov | | Buy to Open | |

| Open Positions | Closed Positions | Corporate | Charts |

Holdings & Performance

| Holdings | | | | Performance | |
|---|---|---|---|---|---|
| | Stock | Options | | Net Gain/(Loss) b/f Taxes | $ 23,575 |
| Number of Positions | 4 | 3 | | Net Gain/(Loss) Percentage | 134.98% |
| Number of Shares/Contracts | 600.0 | 65 | | Average Holding Period (mos) | 10.35 |
| Market Value | | | | Net Annualized Return (CAGR) | 129.69% |
| Weighted Average Price | | | | Initial Maintenance Requirement | |

Stock

| | H/P | Date | Days Held | Type | Shares | Share Price (no c & oc) | Market Value | Net Gain/Loss | Net CAGR (pre-tax) |
|---|---|---|---|---|---|---|---|---|---|
| ⓒⓔⓧ | ☐ | 02/16/2001 | 438 | Long | 500 | 34.87 | 29,315 | 118,749 | 65.60% |
| ⓒⓔⓧ | ☐ | 09/15/2001 | 227 | Long | 200 | Stk Div | 11,726 | 11,726 | 0.00% |
| ⓒⓔⓧ | ☐ | 02/16/2001 | 438 | Short | 500 | (34.87) | 29,315 | 118,749 | 65.60% |
| ⓒⓔⓧ | ☐ | 09/15/2001 | 227 | Short | 200 | (34.87) | 11,726 | 11,726 | 65.60% |

| Sell to Open | Buy to Open |

Puts

| | H/P | Date Open | Date Expire | Type | Contracts | Price Open | Strike | Net Gain/Loss | Net CAGR (pre-tax) |
|---|---|---|---|---|---|---|---|---|---|
| ⓒⓔⓧ | ☐ | 02/16/01 | 02/16/01 | Long | 10 | 2.50 | 35.50 | 118,749 | 65.60% |
| ⓒⓔⓧ | ☐ | 09/15/01 | 09/15/01 | Long | 5 | 4.25 | 55.25 | 11,726 | 65.60% |
| ⓒⓔⓧ | ☐ | 02/16/01 | 02/16/01 | Shrt-Cov | 10 | (2.50) | 45.65 | 118,749 | 65.60% |
| ⓒⓔⓧ | ☐ | 09/15/01 | 09/15/01 | Shrt-UnCov | 15 | (3.50) | 24.50 | 11,726 | 65.60% |

| Sell to Open-Cov | Sell to Open-UnCov | Buy to Open |

Calls

| | H/P | Date Open | Date Expire | Type | Contracts | Price Open | Strike | Net Gain/Loss | Net CAGR (pre-tax) |
|---|---|---|---|---|---|---|---|---|---|
| ⓒⓔⓧ | ☐ | 02/16/01 | 02/16/01 | LG | 10 | 2.50 | 35.50 | 118,749 | 65.60% |
| ⓒⓔⓧ | ☐ | 09/15/01 | 09/15/01 | LG | 5 | 4.25 | 55.25 | 11,726 | 65.60% |
| ⓒⓔⓧ | ☐ | 02/16/01 | 02/16/01 | SH-C | 10 | (2.50) | 45.65 | 118,749 | 65.60% |
| ⓒⓔⓧ | ☐ | 09/15/01 | 09/15/01 | SH-UC | 15 | (3.50) | 24.50 | 11,726 | 65.60% |

| Sell to Open-Cov | Sell to Open-UnCov | Buy to Open |

FIG. 38

| | 4-2 | 4-4 | | 4-6 | |
|---|---|---|---|---|---|
| | Open Positions | Closed Positions | | Corporate | Charts |

History & Performance — 4-8

| Holdings | | | Performance | |
|---|---|---|---|---|
| | Stocks | Options | Net Gain/(Loss) b/f Taxes | $ 23,575 |
| Number of Positions | 4 | 3 | Net Gain/(Loss) Percentage | 134.98% |
| Number of Shares/Contracts | 600.0 | 65 | Average Holding Period (mox) | 10.35 |
| | | | Net Annualized Return (CAGR) | 129.69% |

Stock — 4-34

| | H/P | Date | Days Held | Type | Shares | Share Price Open | Share Price Close | Net Gain/Loss | Net CAGR |
|---|---|---|---|---|---|---|---|---|---|
| ① Ⓔ ⓧ | ☐ | 02/16/2001 | 438 | LG | 500 | 34.87 | 29,315 | 118,749 | 65.60% |
| ① Ⓔ ⓧ | ☐ | 09/15/2001 | 227 | LG | 200 | Stk Div. | 11,726 | 11,726 | n/a |
| ① Ⓔ ⓧ | ☐ | 02/16/2001 | 438 | SH | 500 | (34.87) | 29,315 | 118,749 | 65.60% |
| ① Ⓔ ⓧ | ☐ | 09/15/2001 | 227 | SH | 200 | (34.87) | 11,726 | 11,726 | 0.00% |

Puts — 4-36

| | H/P | Date Close | Date Expire | Type | Contracts | Price Open | Price Close | Net Gain/Loss | Net CAGR |
|---|---|---|---|---|---|---|---|---|---|
| ① Ⓔ ⓧ | ☐ | 02/16/01 | 02/16/01 | LG | 10 | 2.50 | 2.75 | 118,749 | 65.60% |
| ① Ⓔ ⓧ | ☐ | 09/15/01 | 09/15/01 | LG | 5 | 4.25 | 4.50 | 11,726 | 65.60% |
| ① Ⓔ ⓧ | ☐ | 02/16/01 | 02/16/01 | SH-C | 10 | (2.50) | (2.25) | 118,749 | 65.60% |
| ① Ⓔ ⓧ | ☐ | 09/15/01 | 09/15/01 | SH-UC | 15 | (3.50) | (3.25) | 11,726 | 65.60% |

Calls — 4-38

| | H/P | Date Close | Date Expire | Type | Contracts | Price Open | Price Close | Net Gain/Loss | Net CAGR |
|---|---|---|---|---|---|---|---|---|---|
| ① Ⓔ ⓧ | ☐ | 02/16/01 | 02/16/01 | LG | 10 | 2.50 | 2.75 | 118,749 | 65.60% |
| ① Ⓔ ⓧ | ☐ | 09/15/01 | 09/15/01 | LG | 5 | 4.25 | 4.50 | 11,726 | 65.60% |
| ① Ⓔ ⓧ | ☐ | 02/16/01 | 02/16/01 | SH-C | 10 | (2.50) | (2.25) | 118,749 | 65.60% |
| ① Ⓔ ⓧ | ☐ | 09/15/01 | 09/15/01 | SH-UC | 15 | (3.50) | (3.25) | 11,726 | 65.60% |

FIG. 39

| Open Positions | Closed Positions | Corporate | Charts |

Dividends — 4-40

| | Date | | Cash | Shares Received | |
| | Record | Distribution | Dividend | Number | Symbol |
| Ⓔ Ⓧ | 08/10/00 | 12/15/00 | | 200 | D |
| Ⓔ Ⓧ | 08/10/00 | 12/15/00 | 150.00 | | |

Stock Dividend ** | Cash Dividend *

Stock Splits — 4-42

| | Date | | | Number of Shares | | Price per Share | |
| | Record | Distribution | Split Ratio | Before | After | Before | After |
| Ⓔ Ⓧ | 08/10/00 | 12/15/00 | 2:1 | 100 | 200 | 80.00 | 40.00 |
| Ⓔ Ⓧ | 08/10/00 | 12/15/00 | 1:4 | 100 | 25 | 10.00 | 40.00 |

Stock Split ***

Mergers — 4-44

| | Date | | Share | Shares Received | |
| | Record | Effective | Ratio | Number | Symbol |
| Ⓔ Ⓧ | 08/10/00 | 12/15/00 | 2:1 | 200 | D |

Merger ****

Stock Dividend  ** — 4-46

Record Date [08/10/2000]
Distribution Date [12/15/2000]
Symbol [D]
Shares Received [100]

| Cancel | Reset | Submit |

Cash Dividend * — 4-48

Record Date [08/10/2000]
Distribution Date [12/15/2000]
Amount [150.00]

| Cancel | Reset | Submit |

Stock Split *** — 4-50

Record Date [08/10/2000]
Effective Date [12/15/2000]
Split Ratio
Received  Surrendered
[2]          [1]

| Cancel | Reset | Submit |

Merger ***** — 4-52

New Symbol [IBM]
Record Date [08/10/2000]
Effective Date [12/15/2000]
Merger Ratio
Received  Surrendered
[2]          [1]

| Cancel | Reset | Submit |

FIG. 40

| | | | | | | | | | | | | |
|---|---|---|---|---|---|---|---|---|---|---|---|---|
| | A | B | C | D | E | F | G | H | I | J | K | L | M |

Stock - Long - Buy to Open / Transfer In

| | | | | |
|---|---|---|---|---|
| Margin Available % | 50 Maintenance Requirement % | 25 | Transfer In | ☐ |
| | OPEN POSITIONS | BUY | AVERAGE / TOTAL | |
| Dates | 04/01/2001 | 05/06/2001 CAL | | |
| Price per Share | $ 4.000 | 6.000 | $ 5.875 | |
| Number of Shares | 100.0 | 1,500.0 | 1,600.0 | |
| Commissions | $ 100.00 | 10.00 | $ 110.00 | |
| Other Costs | $ 20.00 | 5.00 | $ 25.00 | |
| Bought Settlement | $ 520.00 | $ 9,015.00 | $ 9,535.00 | |
| Cash Disbursed/Invested | | $ 3,015.00 | | |
| Cash Required | | $ | | |
| PORTFOLIO STATUS: | BEFORE | AFTER | | |
| Current Buying Power | $ 28,000 | $ 18,970 | | |
| Cash Available | $ 5,000 | $ 1,985 | | |
| Equity Utilized | $ 1,000 | $ 1,000 | | |
| Margin Available | $ 10,000 | $ 8,500 | | |
| Margin Payable | $ 2,000 | $ 8,000 | | |
| Calculate Page | | Cancel | Reset | Submit |

FIG. 46

| | | | | | | | | | | |
|---|---|---|---|---|---|---|---|---|---|---|
| Stock - Long - Buy to Open / Transfer In | | | | | | | | | | |
| Margin Available % | | 50 | Maintenance Requirement % | | | 25 | | Transfer In | | X |
| | | | | OPEN POSITIONS | | TRANSFER IN | | AVERAGE / TOTAL | | |
| Dates | | | | 04/01/2001 | | 05/05/2001 CAL | | | | |
| Price per Share | | | $ | 4.000 | | 6.000 | $ | 5.875 | | |
| Number of Shares | | | | 100.0 | | 1,500.0 | | 1,600.0 | | |
| Commissions / Transfer In Comm-Costs | | | $ | 100.00 | | 10.00 | $ | 110.00 | | |
| Other Costs / Transfer In Costs | | | $ | 20.00 | | 5.00 | $ | 25.00 | | |
| Bought Settlement / Transfer In | | | $ | 520.00 | $ | 9,000.00 | $ | 9,520.00 | | |
| Cash Disbursed/Invested | | | | | $ | 5.00 | | | | |
| Cash Required | | | | | $ | | | | | |
| PORTFOLIO STATUS: | | | | BEFORE | | AFTER | | | | |
| Current Buying Power | | | $ | 28,000 | $ | 36,990 | | | | |
| Cash Available | | | $ | 5,000 | $ | 4,995 | | | | |
| Equity Utilized | | | $ | 1,000 | $ | 1,000 | | | | |
| Margin Available | | | $ | 10,000 | $ | 14,500 | | | | |
| Margin Payable | | | $ | 2,000 | $ | 8,000 | | | | |
| Calculate Page | | | | | Cancel | | Reset | | Submit | |

FIG. 47

| | A | B | C | D | E | F | G | H | I | J | K | L | M | N |
|---|---|---|---|---|---|---|---|---|---|---|---|---|---|---|
| 1 | | | | Stock - Long - Sell to Close / Transfer Out | | | | | | | | | | |
| 2 | | | | | | | | | | | | | | |
| 3 | | | | Margin Available % | | | 50 | Maintenance Requirement % | 25 | | | Transfer Out | | ☐ |
| 4 | | | | | | | | | | | | | | |
| 5 | | | | Term Status: | | Long | | BOUGHT | | SELL | | DIFFERENCE/TOTAL | | |
| 6 | | | | | | | | | | | | | | |
| 7 | | | | Dates - Days Held | | | | 04/05/2000 | | 05/05/2001 CAL | | 395 | | |
| 8 | | | | | | | | | | | | | | |
| 9 | | | | Price per Share | | | | $ 10.000 | | 15.000 | | $ 5.000 | | |
| 10 | | | | | | | | | | | | | | |
| 11 | | | | Number of Shares | | | | 100.0 | | 50.0 | | 50.0 | | |
| 12 | | | | | | | | | | | | | | |
| 13 | | | | Commissions | | | | $ 20.00 | | 20.00 | | $ 40.00 | | |
| 14 | | | | | | | | | | | | | | |
| 15 | | | | Other Costs | | | | $ 10.00 | | 10.00 | | $ 20.00 | | |
| 16 | | | | | | | | | | | | | | |
| 17 | | | | Bought Settlement | | | | $ 1,030.00 | | $ 515.00 | | $ 515.00 | | |
| 18 | | | | | | | | | | | | | | |
| 31 | | | | Cash Deposited | | | | | | $ 870.00 | | | | |
| 32 | | | | | | | | | | | | | | |
| 33 | | | | PORTFOLIO STATUS: | | | | BEFORE | | AFTER | | | | |
| 34 | | | | | | | | | | | | | | |
| 35 | | | | Current Buying Power | | | | $ 28,000 | | $ 28,840 | | | | |
| 36 | | | | | | | | | | | | | | |
| 37 | | | | Cash Available | | | | $ 5,000 | | $ 5,870 | | | | |
| 38 | | | | | | | | | | | | | | |
| 39 | | | | Equity Utilized | | | | $ 1,000 | | $ 1,000 | | | | |
| 40 | | | | | | | | | | | | | | |
| 41 | | | | Margin Available | | | | $ 10,000 | | $ 9,750 | | | | |
| 42 | | | | | | | | | | | | | | |
| 43 | | | | Margin Payable | | | | $ 2,000 | | $ 1,950 | | | | |
| 44 | | | | | | | | | | | | | | |
| 45 | | | | Calculate Page | | | | | | Cancel | | Reset | | Submit |
| 46 | | | | | | | | | | | | | | |

FIG. 48

| | A | B | C | D | E | F | G | H | I | J | K | L | M | N |
|---|---|---|---|---|---|---|---|---|---|---|---|---|---|---|
| 1 | | | | Stock - Long - Sell to Close / Transfer Out | | | | | | | | | | |
| 2 | | | | | | | | | | | | | | |
| 3 | | | | Margin Available % | | | 50 | Maintenance Requirement % | 25 | | Transfer Out | | x | |
| 4 | | | | | | | | | | | | | | |
| 5 | | | | Term Status: | Long | | | BOUGHT | | TRANSFER OUT | | DIFFERENCE/TOTAL | | |
| 6 | | | | | | | | | | | | | | |
| 7 | | | | Dates - Days Held | | | | 04/05/2000 | | 05/05/2001 CAL | | 395 | | |
| 8 | | | | | | | | | | | | | | |
| 9 | | | | Price per Share | | | $ | 10.000 | | 16.000 | $ | 5.000 | | |
| 10 | | | | | | | | | | | | | | |
| 11 | | | | Number of Shares | | | | 100.0 | | 50.0 | | 50.0 | | |
| 12 | | | | | | | | | | | | | | |
| 13 | | | | Commissions / Transfer Out Comm-Costs | | | $ | 20.00 | | 20.00 | $ | 40.00 | | |
| 14 | | | | | | | | | | | | | | |
| 15 | | | | Other Costs / Transfer Out Costs | | | $ | 10.00 | | 10.00 | $ | 20.00 | | |
| 16 | | | | | | | | | | | | | | |
| 17 | | | | Bought Settlement / Transfer Out | | | $ | 1,030.00 | $ | 750.00 | $ | 280.00 | | |
| 18 | | | | | | | | | | | | | | |
| 31 | | | | Cash Disbursed | | | | | $ | 10.00 | | | | |
| 32 | | | | | | | | | | | | | | |
| 33 | | | | PORTFOLIO STATUS: | | | | BEFORE | | AFTER | | | | |
| 34 | | | | | | | | | | | | | | |
| 35 | | | | Current Buying Power | | | $ | 28,000 | $ | 27,580 | | | | |
| 36 | | | | | | | | | | | | | | |
| 37 | | | | Cash Available | | | $ | 5,000 | $ | 4,990 | | | | |
| 38 | | | | | | | | | | | | | | |
| 39 | | | | Equity Utilized | | | $ | 1,000 | $ | 1,000 | | | | |
| 40 | | | | | | | | | | | | | | |
| 41 | | | | Margin Available | | | $ | 10,000 | $ | 9,800 | | | | |
| 42 | | | | | | | | | | | | | | |
| 43 | | | | Margin Payable | | | $ | 2,000 | $ | 1,950 | | | | |
| 44 | | | | | | | | | | | | | | |
| 45 | | | | Calculate Page | | | | Cancel | | Reset | | Submit | | |
| 46 | | | | | | | | | | | | | | |

FIG. 49

| | | | | | | | | |
|---|---|---|---|---|---|---|---|---|
| Stock - Short - Sell to Open / Transfer In | | | | | | | | |
| Equity Utilized % | 50 | | Maintenance % | | 30 | | Transfer In | ☐ |
| | | | OPEN POSITIONS | | SELL | | AVERAGE / TOTAL | |
| Dates | | | 04/01/2001 | | 05/05/2001 CAL | | | |
| Price per Share | | $ | 35.000 | | 40.000 | $ | 36.667 | |
| Number of Shares | | | 200 | | 100 | | 300 | |
| Commissions | | $ | 100.00 | | 50.00 | $ | 150.00 | |
| Other Costs | | $ | 20.00 | | 10.00 | $ | 30.00 | |
| Gross Sold Receipts | | $ | 7,000.00 | $ | 4,000.00 | $ | 11,000.00 | |
| Cash Disbursed - Cash Restricted (Comm / Costs) | | $ | 120.00 | $ | 60.00 | $ | 180.00 | |
| Net Sold Receipts / Cash Restricted | | $ | 6,880.00 | $ | 3,940.00 | $ | 10,820.00 | |
| Equity Utilized | | | | $ | 2,000.00 | | | |
| PORTFOLIO STATUS: | | | BEFORE | | AFTER | | | |
| Current Buying Power (assumes 50% initial requirement) | | $ | 28,000 | $ | 23,880 | | | |
| Cash Available | | $ | 5,000 | $ | 4,940 | | | |
| Equity Utilized | | $ | 1,000 | $ | 3,000 | | | |
| Margin Available | | $ | 10,000 | $ | 10,000 | | | |
| Margin Payable | | $ | 2,000 | $ | 2,000 | | | |
| Calculate Page | | | | Cancel | | Reset | | Submit |

FIG. 50

| | Stock - Short - Sell to Open / Transfer In | | | | | |
|---|---|---|---|---|---|---|
| | Equity Utilized % | 50 | Maintenance % | 30 | Transfer In | 1 |
| | | | OPEN POSITIONS | TRANSFER IN | AVERAGE / TOTAL | |
| | Dates | | 04/01/2001 | 05/05/2001 CAL | | |
| | Price per Share | $ | 35.000 | 40.000 | $ | 38.687 |
| | Number of Shares | | 200 | 100 | | 300 |
| | Commissions / Transfer In Comm-Costs | $ | 100.00 | 50.00 | $ | 150.00 |
| | Other Costs / Transfer In Costs | $ | 20.00 | 10.00 | $ | 30.00 |
| | Gross Sold Receipts / Transfer In | $ | 7,000.00 | $ 4,000.00 | $ | 11,000.00 |
| | Cash Disbursed (Other Costs) | $ | 120.00 | $ 10.00 | $ | 130.00 |
| | Net Sold Receipts / Cash Restricted | $ | 6,880.00 | $ | $ | 6,880.00 |
| | Equity Utilized | | | $ 2,000.00 | | |
| | PORTFOLIO STATUS: | | BEFORE | AFTER | | |
| | Current Buying Power (assumes 50% initial requirement) | $ | 28,000 | $ 23,980 | | |
| | Cash Available | $ | 5,000 | $ 4,990 | | |
| | Equity Utilized | $ | 1,000 | $ 3,000 | | |
| | Margin Available | $ | 10,000 | $ 10,000 | | |
| | Margin Payable | $ | 2,000 | $ 2,000 | | |
| | Calculate Page | | Cancel | Reset | | Submit |

FIG. 51

| | A | B | C | D | E | F | G | H | I | J | K | L | M | N |
|---|---|---|---|---|---|---|---|---|---|---|---|---|---|---|
| 1 | | | Stock - Short - Buy to Close / Transfer Out | | | | | | | | | | | |
| 2 | | | | | | | | | | | | | | |
| 3 | | | Equity Utilized % | | 50 | | Maintenance % | | | 30 | | Transfer Out | | ☐ |
| 4 | | | | | | | | | | | | | | |
| 5 | | | Term Status: | | Short | | | SOLD | | BUY | | DIFFERENCE/TOTAL | | |
| 6 | | | | | | | | | | | | | | |
| 7 | | | Dates - Days Held | | | | | 04/01/2001 | | 05/05/2001 CAL | | 34 | | |
| 8 | | | | | | | | | | | | | | |
| 9 | | | Price per Share | | | | | $ 40.000 | | 35.000 | | $ 5.000 | | |
| 10 | | | | | | | | | | | | | | |
| 11 | | | Number of Shares | | | | | 100.0 | | 100.0 | | | | |
| 12 | | | | | | | | | | | | | | |
| 13 | | | Commissions | | | | | $ 50.00 | | 30.00 | | $ 80.00 | | |
| 14 | | | | | | | | | | | | | | |
| 15 | | | Other Costs | | | | | $ 10.00 | | 20.00 | | $ 30.00 | | |
| 16 | | | | | | | | | | | | | | |
| 17 | | | Net Sold Receipts / Allocated Basis | | | | | $ 3,940.00 | | $ 3,940.00 | | $ | | |
| 18 | | | | | | | | | | | | | | |
| 35 | | | Cash Deposited | | | | | | | $ 290.00 | | | | |
| 36 | | | | | | | | | | | | | | |
| 37 | | | PORTFOLIO STATUS: | | | | | BEFORE | | AFTER | | | | |
| 38 | | | | | | | | | | | | | | |
| 39 | | | Current Buying Power (assumes 50% initial requirement) | | | | | $ 20,000 | | $ 24,780 | | | | |
| 40 | | | | | | | | | | | | | | |
| 41 | | | Cash Available | | | | | $ 5,000 | | $ 5,290 | | | | |
| 42 | | | | | | | | | | | | | | |
| 43 | | | Equity Utilized | | | | | $ 5,000 | | $ 3,000 | | | | |
| 44 | | | | | | | | | | | | | | |
| 45 | | | Margin Available | | | | | $ 10,000 | | $ 10,100 | | | | |
| 46 | | | | | | | | | | | | | | |
| 47 | | | Margin Payable | | | | | $ 2,000 | | $ 1,900 | | | | |
| 48 | | | | | | | | | | | | | | |
| 49 | | | Calculate Page | | | | | Cancel | | Reset | | Submit | | |
| 50 | | | | | | | | | | | | | | |

FIG. 52

| | | | | | | | | | | |
|---|---|---|---|---|---|---|---|---|---|---|
| Stock - Short - Buy to Close / Transfer Out | | | | | | | | | | |
| | | | | | | | | | | |
| Equity Utilized % | | 50 | | Maintenance % | | 30 | | Transfer Out | | T. |
| | | | | | | | | | | |
| Term Status: | | Short | | | SOLD | | TRANSFER OUT | | DIFFERENCE/TOTAL | |
| | | | | | | | | | | |
| Dates - Days Held | | | | | 04/01/2001 | | 05/05/2001 CAL | | 34 | |
| | | | | | | | | | | |
| Price per Share | | | | $ | 40.000 | | 35.000 | $ | 5.000 | |
| | | | | | | | | | | |
| Number of Shares | | | | | 100.0 | | 100.0 | | | |
| | | | | | | | | | | |
| Commissions / Transfer Out Comm-Costs | | | | $ | 50.00 | | 30.00 | $ | 80.00 | |
| | | | | | | | | | | |
| Other Costs / Transfer Out Costs | | | | $ | 10.00 | | 20.00 | $ | 30.00 | |
| | | | | | | | | | | |
| Net Sold Receipts / Transfer Out | | | | $ | 3,940.00 | $ | 3,500.00 | $ | 440.00 | |
| Cash Disbursed | | | | | | $ | 20.00 | | | |
| PORTFOLIO STATUS: | | | | | BEFORE | | AFTER | | | |
| Current Buying Power (assumes 50% initial requirement) | | | | $ | 20,000 | $ | 24,160 | | | |
| Cash Available | | | | $ | 5,000 | $ | 4,980 | | | |
| Equity Utilized | | | | $ | 5,000 | $ | 3,000 | | | |
| Margin Available | | | | $ | 10,000 | $ | 10,100 | | | |
| Margin Payable | | | | $ | 2,000 | $ | 1,900 | | | |
| Calculate Page | | | | | Cancel | | Reset | | Submit | |

FIG. 53

Put - Long - Buy to Open / Transfer In

Transfer In

| | | | | | |
|---|---|---|---|---|---|
| Strike Price | $ | (65) Month Expires | May | Days Until Expiration | (95) |
| | | OPEN POSITIONS | BUY | AVERAGE / TOTAL | |
| Date | | 04/01/2001 | 05/05/2001 CAL | | |
| Price per Contract | $ | 4.000 | 4.500 | $ 4.167 | |
| Number of Contracts | | 10.0 | 5.0 | 15.0 | |
| Commissions | $ | 100.00 | 50.00 | $ 150.00 | |
| Other Costs | $ | 20.00 | 10.00 | $ 30.00 | |
| Bought Settlement | $ | 4,120.00 | $ 2,310.00 | $ 6,430.00 | |
| Cash Disbursed/Invested | | | $ 2,310.00 | | |
| Cash Required | | | $ 310.00 | | |
| PORTFOLIO STATUS: | | BEFORE | AFTER | | |
| Current Buying Power (assumes 50% initial requirement) | $ | 22,000 | $ 17,380 | | |
| Cash Available | $ | 2,000 | $ (310) | | |
| Equity Utilized | $ | 1,000 | $ 1,000 | | |
| Margin Available | $ | 10,000 | $ 10,000 | | |
| Margin Payable | $ | 2,000 | $ 2,000 | | |
| Calculate Page | | Cancel | Reset | Submit | |

FIG. 54

| | | | | | | | | | | |
|---|---|---|---|---|---|---|---|---|---|---|
| A B | C | D | E | F | | G | H | I | J | K | L |
| 1 | Put - Long - Buy to Open / Transfer In | | | | | | | | | |
| 2 | | | | | | | | | | |
| 3 | | | | | | | | Transfer In | | [X] |
| 4 | | | | | | | | | | |
| 5 | Strike Price | $ | [65] | Month Expires | | | [May] | Days Until Expiration | | (85) |
| 6 | | | | | | | | | | |
| 7 | | | | | OPEN POSITIONS | | TRANSFER IN | | AVERAGE / TOTAL | |
| 8 | | | | | | | | | | |
| 9 | Date | | | | 04/01/2001 | | 05/05/2001 CAL | | | |
| 10 | | | | | | | | | | |
| 11 | Price per Contract | | | $ | 4.000 | | 4.500 | $ | 4.167 | |
| 12 | | | | | | | | | | |
| 13 | Number of Contracts | | | | 10.0 | | 5.0 | | 15.0 | |
| 14 | | | | | | | | | | |
| 15 | Commissions / Transfer In Comm-Costs | | | $ | 100.00 | | 50.00 | $ | 150.00 | |
| 16 | | | | | | | | | | |
| 17 | Other Costs / Transfer In Costs | | | $ | 20.00 | | 10.00 | $ | 30.00 | |
| 18 | | | | | | | | | | |
| 19 | Bought Settlement / Transfer In | | | $ | 4,120.00 | | $ 2,300.00 | $ | 6,420.00 | |
| 20 | | | | | | | | | | |
| 25 | Cash Disbursed/Invested | | | | | | $ 10.00 | | | |
| 26 | | | | | | | | | | |
| 27 | Cash Required | | | | | | $ | | | |
| 28 | | | | | | | | | | |
| 29 | PORTFOLIO STATUS: | | | | BEFORE | | AFTER | | | |
| 30 | | | | | | | | | | |
| 31 | Current Buying Power (assumes 50% initial requirement) | | | $ | 22,000 | | $ 21,980 | | | |
| 32 | | | | | | | | | | |
| 33 | Cash Available | | | $ | 2,000 | | $ 1,990 | | | |
| 34 | | | | | | | | | | |
| 35 | Equity Utilized | | | $ | 1,000 | | $ 1,000 | | | |
| 36 | | | | | | | | | | |
| 37 | Margin Available | | | $ | 10,000 | | $ 10,000 | | | |
| 38 | | | | | | | | | | |
| 39 | Margin Payable | | | $ | 2,000 | | $ 2,000 | | | |
| 40 | | | | | | | | | | |
| 41 | Calculate Page | | | | | Cancel | | Reset | | Submit |
| 42 | | | | | | | | | | |

FIG. 55

| | | | | | |
|---|---|---|---|---|---|
| Put - Long - Sell to Close / Transfer Out | | | | | |
| | | | Transfer Out | | |
| Strike Price $ | 65 | Month Expires | May | Days Until Expiration | (85) |
| | | | BOUGHT | SELL | DIFFERENCE/TOTAL |
| Date | | | 04/01/2001 | 06/05/2001 CAL | 34 |
| Price per Contract | | $ | 15.060 | 12.010 | $ (3.050) |
| Number of Contracts: | | | 1.0 | 1.0 | |
| Commissions | | $ | 20.00 | 12.00 | $ 32.00 |
| Other Costs | | $ | 10.00 | 5.00 | $ 15.00 |
| Bought Settlement | | $ | 1,536.00 | $ 1,536.00 | $ |
| Cash Deposited | | | | $ 1,184.00 | |
| PORTFOLIO STATUS: | | | BEFORE | AFTER | |
| Current Buying Power (assumes 50% initial requirement) | | $ | 29,000 | $ 30,368 | |
| Cash Available | | $ | 5,000 | $ 6,184 | |
| Equity Utilized | | $ | 1,000 | $ 1,000 | |
| Margin Available | | $ | 10,000 | $ 10,000 | |
| Margin Payable | | $ | 2,000 | $ 2,000 | |
| Calculate Page | | | Cancel | Reset | Submit |

FIG. 56

| | | | | | | | | | | | | | |
|---|---|---|---|---|---|---|---|---|---|---|---|---|---|
| | A | B | C | D | E | F | G | H | I | J | K | L | M N |
| 1 | Put - Long - Sell to Close / Transfer Out | | | | | | | | | | | | |
| 2 | | | | | | | | | | | | | |
| 3 | | | | | | | | | | | Transfer Out | | ☒ |
| 4 | | | | | | | | | | | | | |
| 5 | | | Strike Price | $ | 65 | Month Expires | | May | | Days Until Expiration | | | (85) | |
| 6 | | | | | | | | | | | | | |
| 7 | | | | | | | | BOUGHT | | TRANSFER OUT | | DIFFERENCE/TOTAL | | |
| 8 | | | | | | | | | | | | | |
| 9 | | | Date | | | | | 04/01/2001 | | 05/05/2001 CAL | | | 34 | |
| 10 | | | | | | | | | | | | | |
| 11 | | | Price per Contract | | | | $ | 15.060 | | 12.010 | | $ | (3.050) | |
| 12 | | | | | | | | | | | | | |
| 13 | | | Number of Contracts: | | | | | 1.0 | | 1.0 | | | | |
| 14 | | | | | | | | | | | | | |
| 15 | | | Commissions / Transfer Out Comm-Costs | | | | $ | 20.00 | | 12.00 | | $ | 32.00 | |
| 16 | | | | | | | | | | | | | |
| 17 | | | Other Costs / Transfer In Costs | | | | $ | 10.00 | | 5.00 | | $ | 15.00 | |
| 18 | | | | | | | | | | | | | |
| 19 | | | Brought Settlement / Transfer Out | | | | $ | 1,536.00 | $ | 1,201.00 | | $ | 335.00 | |
| 20 | | | | | | | | | | | | | |
| 33 | | | Cash Disbursed | | | | | | $ | 5.00 | | | | |
| 34 | | | | | | | | | | | | | |
| 35 | | | PORTFOLIO STATUS: | | | | | BEFORE | | AFTER | | | | |
| 36 | | | | | | | | | | | | | |
| 37 | | | Current Buying Power (assumes 50% initial requirement) | | | | $ | 28,000 | $ | 27,966 | | | | |
| 38 | | | | | | | | | | | | | |
| 39 | | | Cash Available | | | | $ | 5,000 | $ | 4,983 | | | | |
| 40 | | | | | | | | | | | | | |
| 41 | | | Equity Utilized | | | | $ | 1,000 | $ | 1,000 | | | | |
| 42 | | | | | | | | | | | | | |
| 43 | | | Margin Available | | | | $ | 10,000 | $ | 10,000 | | | | |
| 44 | | | | | | | | | | | | | |
| 45 | | | Margin Payable | | | | $ | 2,000 | $ | 2,000 | | | | |
| 46 | | | | | | | | | | | | | |
| 47 | | | Calculate Page | | | | | Cancel | | Reset | | | Submit | |

| | BOUGHT SHARES | EXERCISE-SELL | DIFFERENCE/TOTAL |
|---|---|---|---|

Put - Long - Exercise

Margin Available %: 50

Strike Price $: 55  Month Expires: May    Days Until Expiration: (85)

| | BOUGHT SHARES | EXERCISE-SELL | DIFFERENCE/TOTAL |
|---|---|---|---|
| Date | 11/15/2000 | 05/05/200... CAL | 171 |
| Price per Share / Exercise price per Share | $ 15.060 | 55.0000 | $ 39.940 |
| Number of Open Contracts / Exercised | 1 | | |
| Number of Shares | 100.0 | 100.0 | |
| Commissions | $ 20.00 | $12.00 | $ 32.00 |
| Other Costs | $ 10.00 | $5.00 | $ 15.00 |
| Bought Settlement | $ 1,536.00 | $ 1,536.00 | $ |
| Net Gain / (Loss) - Put Option | | $ (260.00) | |
| Net Gain / (Loss) - Stock | | $ 3,947.00 | |

| | BEFORE TAXES | AFTER TAXES |
|---|---|---|
| Net Gain / (Loss) - Stock & Option | $ 3,697.00 | $ 2,587.90 |
| Net Gain / (Loss) Percentage | 240.69% | 168.48% |
| Net Annualized Return (CAGR) | 1271.20% | 724.43% |
| Cash Disbursed | $ 5,483.00 | |
| Margin Paid | | |
| Cash Deposited | $ 5,483.00 | |

PORTFOLIO STATUS:

| | BEFORE | AFTER |
|---|---|---|
| Current Buying Power (assumes 50% initial requirement) | $ 38,000 | $ 43,766 |
| Cash Available | $ 10,000 | $ 15,483 |
| Equity Utilized | $ 1,000 | $ 1,000 |
| Margin Available | $ 10,000 | $ 7,400 |
| Margin Payable | $ 2,000 | $ 2,000 |

Calculate Page | Cancel | Reset | Submit

FIG. 59

| | | | | | | | | | | |
|---|---|---|---|---|---|---|---|---|---|---|
| Call - Long - Buy to Open / Transfer In | | | | | | | | | | |
| | | | | | | | | Transfer In | | |
| Strike Price | | | | Month Expires | | May | | Days Until Expiration | | (85) |
| | | | | | OPEN POSITIONS | | BUY | | AVERAGE / TOTAL | |
| Date | | | | | 04/01/2001 | | 05/05/2001 CAL | | | |
| Price per Contract | | | | $ | 4.000 | | 4.500 | $ | 4.167 | |
| Number of Contracts | | | | | 10.0 | | 5.0 | | 15.0 | |
| Commissions | | | | $ | 100.00 | | 50.00 | $ | 150.00 | |
| Other Costs | | | | $ | 20.00 | | 10.00 | $ | 30.00 | |
| Bought Settlement | | | | $ | 4,120.00 | $ | 2,310.00 | $ | 6,430.00 | |
| Cash Disbursed/Invested | | | | | | $ | 1,310.00 | | | |
| Cash Required | | | | | | $ | | | | |
| PORTFOLIO STATUS: | | | | | BEFORE | | AFTER | | | |
| Current Buying Power (assumes 50% initial requirement) | | | | $ | 22,000 | $ | 17,380 | | | |
| Cash Available | | | | $ | 2,000 | $ | 690 | | | |
| Equity Utilized | | | | $ | 1,000 | $ | 1,000 | | | |
| Margin Available | | | | $ | 10,000 | $ | 9,000 | | | |
| Margin Payable | | | | $ | 2,000 | $ | 3,000 | | | |
| Calculate Page | | | | | | Cancel | | Reset | | Submit |

| | Call - Long - Sell to Close / Transfer Out | | | | | |
|---|---|---|---|---|---|---|
| | | | | | Transfer Out | |
| | Strike Price | $ 65 | Month Expires | May | Days Until Expiration | (85) |
| | | | BOUGHT | SELL | DIFFERENCE/TOTAL | |
| | Date | | 04/01/2001 | 05/05/200? CAL | 34 | |
| | Price per Contract | $ | 15.060 | 12.010 | $ (3.050) | |
| | Number of Contracts: | | 1 | | | |
| | Commissions | $ | 20.00 | 12.00 | $ 32.00 | |
| | Other Costs | $ | 10.00 | 5.00 | $ 15.00 | |
| | Bought Settlement / Allocated Basis | $ | 1,536.00 | $ 1,536.00 | $ | |
| | Cash Deposited | | | $ 1,184.00 | | |
| | PORTFOLIO STATUS: | | BEFORE | AFTER | | |
| | Current Buying Power (assumes 50% initial requirement) | $ | 28,000 | $ 30,368 | | |
| | Cash Available | $ | 5,000 | $ 6,184 | | |
| | Equity Utilized | $ | 1,000 | $ 1,000 | | |
| | Margin Available | $ | 10,000 | $ 10,000 | | |
| | Margin Payable | $ | 2,000 | $ 2,000 | | |
| | Calculate Page | | Cancel | Reset | Submit | |

FIG. 62

Call - Long - Sell to Close / Transfer Out

Transfer Out

Strike Price  $  [85]  Month Expires   May   Days Until Expiration   (85)

|  | BOUGHT | TRANSFER OUT | DIFFERENCE/TOTAL |
|---|---|---|---|
| Date |  | 04/01/2001 | 05/05/2001 CAL | 34 |
| Price per Contract | $ | 15.060 | $ 12.010 | $ (3.050) |
| Number of Contracts: |  | 1 |  |  |
| Commissions / Transfer Out Comm-Costs | $ | 20.00 | $ 12.00 | $ 32.00 |
| Other Costs / Transfer Out Costs | $ | 10.00 | $ 5.00 | $ 15.00 |
| Brought Settlement / Transfer Out | $ | 1,536.00 | $ 1,201.00 | $ 335.00 |
| Cash Disbursed |  |  | $ 5.00 |  |

PORTFOLIO STATUS:

|  | BEFORE | AFTER |
|---|---|---|
| Current Buying Power (assumes 50% initial requirement) | $ 28,000 | $ 27,990 |
| Cash Available | $ 5,000 | $ 4,995 |
| Equity Utilized | $ 1,000 | $ 1,000 |
| Margin Available | $ 10,000 | $ 10,000 |
| Margin Payable | $ 2,000 | $ 2,000 |

Calculate Page    Cancel    Reset    Submit

FIG. 63

| | | | | | | | |
|---|---|---|---|---|---|---|---|
| Call - Long - Exercise | | | | | | | |
| Margin Available % | 50 | | | | | | |
| Strike Price $ | 50 Month Expires | | May | Days Until Expiration | | | (85) |
| | | | OPEN POSITIONS | BUY-EXERCISE | | DIFFERENCE/TOTAL | |
| Date | | | 11/15/2000 | 05/05/2001 CAL | | | |
| Price per Share / Exercise Price per Share | | $ | 60.000 | 50.0000 | $ | | 55.000 |
| Contracts | | | 4 | 2 | | | 6 |
| Number of Shares | | | 200.0 | 200.0 | | | 400.0 |
| Commissions | | $ | 100.00 | 10.00 | | | 110.00 |
| Other Costs | | $ | 20.00 | 5.00 | | | 25.00 |
| Bought Settlement | | $ | 12,120.00 | $ 10,015.00 | $ | | 22,135.00 |
| Adjusted Basis Price per Share | | | | $ 54.00 | | | |
| Margin Borrowed | | | | 6,000.00 | | | |
| Margin Borrowed % | | | | 59.91% | | | |
| Cash Disbursed/Invested | | | | $ 4,015.00 | | | |
| Cash Required | | | | $ | | | |
| PORTFOLIO STATUS: | | | BEFORE | AFTER | | | |
| Current Buying Power | | $ | 38,000 | $ 31,970 | | | |
| Cash Available | | $ | 10,000 | $ 5,985 | | | |
| Equity Utilized | | $ | 1,000 | $ 1,000 | | | |
| Margin Available | | $ | 10,000 | $ 11,000 | | | |
| Margin Payable | | $ | 2,000 | $ 8,000 | | | |
| Calculate Page | | | | Cancel | Reset | | Submit |

FIG. 64

| | | | Call - Long - Expired | | | | | | | |
|---|---|---|---|---|---|---|---|---|---|---|
| | Strike Price | $ | 65 | Month Expires | May | Days Until Expiration | | | | (85) |
| | | | | | BOUGHT | EXPIRED | | DIFFERENCE/TOTAL | | |
| | Date | | | | 04/01/2001 | 05/05/2001 | CAL | | | 34 |
| | Price per Contract | | | | $ 3.250 | | | $ | | (3.250) |
| | Number of Contracts: | | | | 2.0 | 2.0 | | | | |
| | Commissions | | | | $ 50.00 | | | $ | | 50.00 |
| | Other Costs | | | | $ 10.00 | | | $ | | 10.00 |
| | Bought Settlement | | | | $ 710.00 | n/a | | $ | | 710.00 |
| | | | | | | BEFORE TAXES | | AFTER TAXES | | |
| | Net (Loss) | | | | | $ (710.00) | | $ | | (497.00) |
| | Net (Loss) Percentage | | | | | -100.00% | | | | -100.00% |
| | Net Annualized Return (CAGR) | | | | | -100.00% | | | | -100.00% |
| | PORTFOLIO STATUS: | | | | | BEFORE | | AFTER | | |
| | Current Buying Power (assumes 50% initial requirement) | | | | | $ 28,000 | $ | 28,000 | | |
| | Cash Available | | | | | $ 5,000 | $ | 5,000 | | |
| | Equity Utilized | | | | | $ 1,000 | $ | 1,000 | | |
| | Margin Available | | | | | $ 10,000 | $ | 10,000 | | |
| | Margin Payable | | | | | $ 2,000 | $ | 2,000 | | |
| | Calculate Page | | | | | Cancel | | Reset | | Submit |

FIG. 65

| | | A | B | C | D | E | F | G | H | I | J | K | L | M |
|---|---|---|---|---|---|---|---|---|---|---|---|---|---|---|
| 1 | Put - Short - Covered - Sell to Open / Transfer In | | | | | | | | | | | | | |
| 4 | | | | | | | | | | | | | | |
| 5 | Strike Price $ [ 25 ] Month Expires | | | | | | | May | | Transfer In | | [ ] | | |
| 7 | Days Until Expiration | | | | | (85) | OPEN POSITIONS | | SELL | | | AVERAGE / TOTAL | | |
| 9 | Date | | | | | | 04/01/2001 | | 05/05/2001 CAL | | | | | |
| 11 | Price per Contract | | | | | $ | 4.000 | | 4.000 | | $ | 4.000 | | |
| 13 | Number of Contracts | | | | | | 2 | | 1 | | | 3 | | |
| 15 | Short Shares Available | | | | | | 600 | | 400 | | | 300 | | |
| 17 | Short Shares Utilized | | | | | | 200 | | 100 a | | | 300 | | |
| 19 | Commissions | | | | | $ | 100.00 | | 50.00 | | $ | 150.00 | | |
| 21 | Other Costs | | | | | $ | 20.00 | | 10.00 | | $ | 30.00 | | |
| 23 | Gross Sold Receipts | | | | | $ | 800.00 | | $ 400.00 | | $ | 1,200.00 | | |
| 25 | Cash Disbursed (comm+costs) | | | | | $ | 120.00 | | $ 60.00 | | $ | 180.00 | | |
| 27 | Net Sold Receipts | | | | | $ | 680.00 | | $ 340.00 | | $ | 1,020.00 | | |
| 31 | PORTFOLIO STATUS: | | | | | | BEFORE | | AFTER | | | | | |
| 33 | Current Buying Power (assumes 50% initial requirement) | | | | | $ | 28,000 | | $ 28,680 | | | | | |
| 35 | Cash Available | | | | | $ | 5,000 | | $ 5,340 | | | | | |
| 37 | Equity Utilized | | | | | $ | 1,000 | | $ 1,000 | | | | | |
| 39 | Margin Available | | | | | $ | 10,000 | | 10,000 | | | | | |
| 41 | Margin Payable | | | | | $ | 2,000 | | $ 2,000 | | | | | |
| 43 | Calculate Page | | | | | | | Cancel | | Reset | | | Submit | |

FIG. 66

| | | | | | | |
|---|---|---|---|---|---|---|
| Put - Short - Covered - Sell to Open / Transfer In | | | | | | |
| Strike Price $ [25] Month Expires | | May | Transfer In [x] | | | |
| Days Until Expiration (85) | | OPEN POSITIONS | TRANSFER IN | | AVERAGE / TOTAL | |
| Date | | 04/01/2001 | 05/05/2001 CAL | | | |
| Price per Contract | $ | 4.000 | 4.000 | $ | 4.000 | |
| Number of Contracts | | 2 | | | 3 | |
| Short Shares Available | | 500 | 400 | | 300 | |
| Short Shares Utilized | | 200 | 100 | | 300 | |
| Commissions / Transfer In Comm-Costs | $ | 100.00 | 50.00 | $ | 150.00 | |
| Other Costs / Transfer In Costs | $ | 20.00 | 10.00 | $ | 30.00 | |
| Gross Sold Receipts / Transfer In | $ | 800.00 | $ 400.00 | $ | 1,200.00 | |
| Cash Disbursed (comm-costs) / Transfer In Costs | $ | 120.00 | $ 10.00 | $ | 130.00 | |
| Net Sold Receipts | $ | 680.00 | n/a | $ | 680.00 | |
| PORTFOLIO STATUS: | | BEFORE | AFTER | | | |
| Current Buying Power (assumes 50% initial requirement) | $ | 28,000 | $ 27,980 | | | |
| Cash Available | $ | 5,000 | $ 4,990 | | | |
| Equity Utilized | $ | 1,000 | $ 1,000 | | | |
| Margin Available | $ | 10,000 | $ 10,000 | | | |
| Margin Payable | $ | 2,000 | $ 2,000 | | | |
| Calculate Page | | Cancel | Reset | | Submit | |

FIG. 67

| | | | | | | | | |
|---|---|---|---|---|---|---|---|---|
| Put - Short - Covered - Buy to Close / Transfer Out | | | | | | | | |
| Strike Price $ | 25 | Month Expires | | May | | Transfer Out | | |
| Days Until Expiration | | (85) | | SOLD | | BUY | | DIFFERENCE/TOTAL |
| Date | | | | 04/01/2001 | | 05/05/2001 CAL | | 34 |
| Price per Contract | | | $ | 4.000 | | 4.000 | $ | |
| Number of Contracts: | | | | 2 | | | | 1 |
| Short Shares Utilized / Released | | | | 200.0 | | 100.0 | | 100.00 |
| Commissions | | | $ | 10.00 | | 12.00 | $ | 22.00 |
| Other Costs | | | $ | 5.00 | | 5.00 | $ | 10.00 |
| Net Sold Receipts / Allocated Basis | | | $ | 785.00 | $ | 392.50 | $ | 392.50 |
| Net Cash Disbursed | | | | | $ | 217.00 | | |
| PORTFOLIO STATUS: | | | | BEFORE | | AFTER | | |
| Current Buying Power (assumes 50% initial requirement) | | | $ | 20,000 | $ | 19,166 | | |
| Cash Available | | | $ | 5,000 | $ | 4,783 | | |
| Equity Utilized | | | $ | 5,000 | $ | 5,000 | | |
| Margin Available | | | $ | 10,000 | $ | 9,800 | | |
| Margin Payable | | | $ | 2,000 | $ | 2,200 | | |
| Calculate Page | | | | Cancel | | Reset | | Submit |

FIG. 68

| | | | | | | |
|---|---|---|---|---|---|---|
| Put - Short - Covered - Buy to Close / Transfer Out | | | | | | |
| Strike Price $ | 25 | Month Expires | May | | Transfer Out | x |
| Days Until Expiration | (85) | | SOLD | | TRANSFER OUT | DIFFERENCE/TOTAL |
| Date | | | 04/01/2001 | | 05/05/2001 CAL | 34 |
| Price per Contract | | $ | 4.000 | | 4.000 | $ |
| Number of Contracts: | | | 2 | | 1 | 1 |
| Short Shares Utilized / Released | | | 200.0 | | 100.0 | 100.00 |
| Commissions / Transfer Out Comm-Costs | | $ | 10.00 | | 12.00 | $ 22.00 |
| Other Costs / Transfer Out Costs | | $ | 5.00 | | 5.00 | $ 10.00 |
| Net Sold Receipts / Transfer Out Value | | $ | 785.00 | $ | 400.00 | $ 385.00 |
| Net Cash Disbursed | | | | $ | 5.00 | |
| PORTFOLIO STATUS: | | | BEFORE | | AFTER | |
| Current Buying Power (assumes 50% initial requirement) | | $ | 20,000 | $ | 19,590 | |
| Cash Available | | $ | 5,000 | $ | 4,995 | |
| Equity Utilized | | $ | 5,000 | $ | 5,000 | |
| Margin Available | | $ | 10,000 | $ | 9,800 | |
| Margin Payable | | $ | 2,000 | $ | 2,200 | |
| Calculate Page | | | Cancel | | Reset | Submit |

FIG. 69

| | A | B | C | D | E | F | G | H | I | J | K | L | M |
|---|---|---|---|---|---|---|---|---|---|---|---|---|---|
| 1 | | | | Put - Short - Covered - Exercise | | | | | | | | | |
| 2 | | | | | | | | | | | | | |
| 3 | | | | Strike Price | $ | 25 | Month Expires | | May | | Stock Margin Available % | | 50 | |
| 4 | | | | | | | | | | | | | |
| 5 | | | | Days Until Expiration | | | (85) | SOLD SHARES-COV | | EXERCISED-BUY | | DIFFERENCE/TOTAL | |
| 6 | | | | | | | | | | | | | |
| 7 | | | | Date | | | | 11/15/2000 | | 05/05/2001 CAL | | 171 | |
| 8 | | | | | | | | | | | | | |
| 9 | | | | Sold/Exercise Price per Share | | | | $ 30.000 | | 25.0000 | | $ (5.000) | |
| 10 | | | | | | | | | | | | | |
| 11 | | | | Number of Contracts | | | | 2.0 | | 1.0 | | 1.0 | |
| 12 | | | | | | | | | | | | | |
| 13 | | | | Number of Shares | | | | 200.0 | | 100.0 | | 100.0 | |
| 14 | | | | | | | | | | | | | |
| 15 | | | | Commissions | | | | $ 100.00 | | 50.00 | | 150.00 | |
| 16 | | | | | | | | | | | | | |
| 17 | | | | Other Costs | | | | $ 20.00 | | 10.00 | | 30.00 | |
| 18 | | | | | | | | | | | | | |
| 19 | | | | Net Sold Receipts / Allocated Basis | | | | $ 5,880.00 | | $ 2,940.00 | | $ 2,940.00 | |
| 20 | | | | | | | | | | | | | |
| 21 | | | | Net Gain / (Loss) - Put Option | | | | | | $ 370.00 | | | |
| 22 | | | | | | | | | | | | | |
| 23 | | | | Net Gain / (Loss) - Stock | | | | | | $ 500.00 | | | |
| 24 | | | | | | | | | | | | | |
| 25 | | | | | | | | | | BEFORE TAXES | | AFTER TAXES | |
| 26 | | | | | | | | | | | | | |
| 27 | | | | Net Gain / (Loss) - Stock & Option | | | | | | $ 870.00 | | $ 609.00 | |
| 28 | | | | | | | | | | | | | |
| 29 | | | | Net Gain / (Loss) Percentage | | | | | | 33.95% | | 23.70% | |
| 30 | | | | | | | | | | | | | |
| 31 | | | | Net Annualized Return (CAGR) | | | | | | 86.41% | | 57.50% | |
| 32 | | | | | | | | | | | | | |
| 33 | | | | Bought Settlement | | | | | | $ 2,440.00 | | | |
| 34 | | | | | | | | | | | | | |
| 35 | | | | Margin Borrowed | | | | | | 1,000.00 | | | |
| 36 | | | | | | | | | | | | | |
| 37 | | | | Net Cash Disbursed | | | | | | $ 1,440.00 | | | |
| 38 | | | | | | | | | | | | | |
| 39 | | | | PORTFOLIO STATUS: | | | | BEFORE | | AFTER | | | |
| 40 | | | | | | | | | | | | | |
| 41 | | | | Current Buying Power (assumes 50% initial requirement) | | | | $ 20,000 | | $ 16,520 | | | |
| 42 | | | | | | | | | | | | | |
| 43 | | | | Cash Available | | | | $ 5,000 | | $ 3,560 | | | |
| 44 | | | | | | | | | | | | | |
| 45 | | | | Equity Utilized | | | | $ 5,000 | | $ 4,300 | | | |
| 46 | | | | | | | | | | | | | |
| 47 | | | | Margin Available | | | | $ 10,000 | | $ 9,000 | | | |
| 48 | | | | | | | | | | | | | |
| 49 | | | | Margin Payable | | | | $ 2,000 | | $ 3,000 | | | |
| 50 | | | | | | | | | | | | | |
| 51 | | | | Calculate Page | | | | | Cancel | | Reset | | Submit |

FIG. 70

| | | | | | | |
|---|---|---|---|---|---|---|
| Put - Short - Covered - Expired | | | | | | |
| Strike Price $ | 25 | Month Expires | May | Days Until Expiration | | (85) |
| | | | SOLD | EXPIRED | | DIFFERENCE/TOTAL |
| Date | | | 04/01/2001 | 05/05/2001 | CAL | 34 |
| Price per Contract | | $ | 4.000 | | $ | 4.000 |
| Number of Contracts: | | | 6.0 | 6.0 | | |
| Short Shares Utilized / Released | | | 600.0 | 600.0 | | |
| Commissions | | $ | 50.00 | $ | $ | 50.00 |
| Other Costs | | $ | 10.00 | $ | $ | 10.00 |
| Net Sold Receipts | | $ | 2,340.00 | n/a | $ | 2,340.00 |
| | | | | BEFORE TAXES | | AFTER TAXES |
| Net Gain | | | | $ 2,340.00 | $ | 1,638.00 |
| Net Gain Percentage | | | | 100.00% | | 70.00% |
| Net Annualized Return (CAGR) | | | | 100.00% | | 29797.26% |
| PORTFOLIO STATUS: | | | BEFORE | AFTER | | |
| Current Buying Power (assumes 50% initial requirement) | | $ | 20,000 | $ 20,000 | | |
| Cash Available | | $ | 5,000 | $ 5,000 | | |
| Equity Utilized | | $ | 5,000 | $ 5,000 | | |
| Margin Available | | $ | 10,000 | $ 10,000 | | |
| Margin Payable | | $ | 2,000 | $ 2,000 | | |
| Calculate Page | | | Cancel | Reset | | Submit |

| | | | | | |
|---|---|---|---|---|---|
| Put - Short - Uncovered - Sell to Open / Transfer In | | | | | |
| Strike Price $ | 50 | Month Expires | May | Transfer In | X |
| Cash Min Req $ | 500 | In Money Maint % | 15 | Out Money Maint % | 25 |
| Days Until Expiration | (85) | OPEN POSITIONS | | TRANSFER IN | AVERAGE / TOTAL |
| Date | | 04/01/2001 | 05/05/2001 CAL | | |
| Price per Contract | | $ 3.000 | $ 3.000 | $ 3.000 | |
| Number of Contracts | | 2 | 1 | 3 | |
| Commissions / Transfer In Comm-Costs | | $ 100.00 | $ 50.00 | $ 150.00 | |
| Other Costs / Transfer In Costs | | $ 20.00 | $ 10.00 | $ 30.00 | |
| Gross Sold Receipts / Transfer In | | $ 600.00 | $ 300.00 | $ 900.00 | |
| Cash Disbursed (comm-costs) / Transfer In Costs | | $ 120.00 | $ 10.00 | $ 130.00 | |
| Net Sold Receipts | | $ 480.00 | n/a | $ 480.00 | |
| Equity Utilized | | | 1,300.00 | | |
| Cash / Margin Required | | | $ | | |
| PORTFOLIO STATUS: | | BEFORE | AFTER | | |
| Current Buying Power (assumes 50% initial requirement) | | $ 26,000 | $ 25,380 | | |
| Cash Available | | $ 5,000 | $ 4,990 | | |
| Equity Utilized | | $ 1,000 | $ 2,300 | | |
| Margin Available | | $ 10,000 | $ 10,000 | | |
| Margin Payable | | $ 2,000 | $ 2,000 | | |
| Calculate Page | | | Cancel | Reset | Submit |

FIG. 73

| | A | B | C | D | E | F | G | H | I | J | K | L | M |
|---|---|---|---|---|---|---|---|---|---|---|---|---|---|
| 1 | | | | Put - Short - Uncovered - Buy to Close / Transfer Out | | | | | | | | | |
| 2 | | | | | | | | | | | | | |
| 3 | | | | Strike Price $ | | 50 | Month Expires | | May | Transfer Out | | | |
| 4 | | | | | | | | | | | | | |
| 5 | | | | Cash Min Req $ | | 500 | In Money Maint % | | 15 | Out Money Main % | | | 25 |
| 6 | | | | | | | | | | | | | |
| 7 | | | | Days Until Expiration | | | (65) | SOLD | | BUY | | DIFFERENCE/TOTAL | |
| 8 | | | | | | | | | | | | | |
| 9 | | | | Date | | | | 04/01/2001 | | 05/05/2001 | CAL | | 34 |
| 10 | | | | | | | | | | | | | |
| 11 | | | | Price per Contract | | | | $ 3.000 | | 3.000 | | $ | · |
| 12 | | | | | | | | | | | | | |
| 13 | | | | Number of Contracts: | | | | 1 | | 1 | | | · |
| 14 | | | | | | | | | | | | | |
| 15 | | | | Commissions | | | | $ 50.00 | | 50.00 | | $ | 100.00 |
| 16 | | | | | | | | | | | | | |
| 17 | | | | Other Costs | | | | $ 10.00 | | 10.00 | | $ | 20.00 |
| 18 | | | | | | | | | | | | | |
| 19 | | | | Net Sold Receipts / Allocated Basis | | | | $ 240.00 | $ | 240.00 | | $ | |
| 20 | | | | | | | | | | | | | |
| 33 | | | | Net Cash Disbursed | | | | | $ | 160.00 | | | |
| 34 | | | | | | | | | | | | | |
| 35 | | | | PORTFOLIO STATUS: | | | | BEFORE | | AFTER | | | |
| 36 | | | | | | | | | | | | | |
| 37 | | | | Current Buying Power (assumes 50% initial requirement) | | | | $ 12,000 | $ | 13,380 | | | |
| 38 | | | | | | | | | | | | | |
| 39 | | | | Cash Available | | | | $ 5,000 | $ | 4,840 | | | |
| 40 | | | | | | | | | | | | | |
| 41 | | | | Equity Utilized | | | | $ 9,000 | $ | 7,950 | | | |
| 42 | | | | | | | | | | | | | |
| 43 | | | | Margin Available | | | | $ 10,000 | $ | 9,800 | | | |
| 44 | | | | | | | | | | | | | |
| 45 | | | | Margin Payable | | | | $ 2,000 | $ | 2,200 | | | |
| 46 | | | | | | | | | | | | | |
| 47 | | | | Calculate Page | | | | | Cancel | | Reset | | Submit |
| 48 | | | | | | | | | | | | | |

FIG. 74

| | | | | | | |
|---|---|---|---|---|---|---|
| Put - Short - Uncovered - Buy to Close / Transfer Out | | | | | | |
| Strike Price $ | 50 | Month Expires | May | Transfer Out | | |
| Cash Min Req $ | 500 | In Money Maint % | 15 | Out-Money Main % | | 25 |
| Days Until Expiration | | (85) | SOLD | TRANSFER OUT | DIFFERENCE/TOTAL | |
| Date | | | 04/01/2001 | 05/05/2001 CAL | | 34 |
| Price per Contract | | $ | 3.000 | 3.000 | $ | - |
| Number of Contracts: | | | 1 | | | - |
| Commissions / Transfer Out Comm-Costs | | $ | 50.00 | 50.00 | $ | 100.00 |
| Other Costs / Transfer Out Costs | | $ | 10.00 | 10.00 | $ | 20.00 |
| Net Sold Receipts / Transfer Out Value | | $ | 240.00 | $ 300.00 | $ | (60.00) |
| Net Cash Disbursed | | | | $ 10.00 | | |
| PORTFOLIO STATUS: | | | BEFORE | AFTER | | |
| Current Buying Power (assumes 50% initial requirement) | | $ | 12,000 | $ 13,680 | | |
| Cash Available | | $ | 5,000 | $ 4,990 | | |
| Equity Utilized | | $ | 9,000 | $ 7,950 | | |
| Margin Available | | $ | 10,000 | $ 9,800 | | |
| Margin Payable | | $ | 2,000 | $ 2,200 | | |
| Calculate Page | | | Cancel | Reset | Submit | |

FIG. 75

| | | | | | | |
|---|---|---|---|---|---|---|
| Put - Short - Uncovered - Exercise | | | | | | |
| Strike Price $ | 50 | Month Expires | May | Stock Equity Utilized % | | 50 |
| Cash Min Req $ | 500 | In Money Maint % | 15 | Out Money Main % | | 25 |
| Days Until Expiration | | (85) | OPEN SHARES | EXERCISED-BUY | | AVERAGE/TOTAL |
| Date | | | 03/12/2001 | 03/12/2001 CAL | | |
| Price per Share / Exercise Price per Share | | | $ 70.000 | $ 50.000 | | $ 62.333 |
| Number of Contracts | | | 4 | 1 | | 3 |
| Number of Shares | | | 200.0 | 100.0 | | 300.0 |
| Commissions | | | $ 50.00 | $ 50.00 | | $ 100.000 |
| Other Costs | | | $ 10.00 | $ 10.00 | | $ 20.000 |
| Bought Settlement | | | $ 14,060.00 | $ 5,060.00 | | $ 19,120.000 |
| Margin Borrowed | | | | $ 2,000.00 | | |
| Net Cash Dispursed | | | | $ 3,060.00 | | |
| PORTFOLIO STATUS: | | | BEFORE | AFTER | | |
| Current Buying Power (assumes 50% initial requirement) | | | $ 20,000 | $ 17,980 | | |
| Cash Available | | | $ 5,000 | $ 1,940 | | |
| Equity Utilized | | | $ 5,000 | $ 3,950 | | |
| Margin Available | | | $ 10,000 | $ 11,000 | | |
| Margin Payable | | | $ 2,000 | $ 4,000 | | |
| Calculate Page | | | Cancel | Reset | | Submit |

FIG. 76

| | | | | | | | | |
|---|---|---|---|---|---|---|---|---|
| Put - Short - Uncovered - Expired | | | | | | | | |
| Strike Price $ | 50 | Month Expires | | May | | | | |
| Cash Min Req $ | 500 | In Money Maint % | | 15 | Out Money Maint % | | 25 | |
| Days Until Expiration | | | (85) | SOLD | EXPIRED | | DIFFERENCE/TOTAL | |
| Date | | | | 04/01/2001 | 05/05/2001 | | 34 | |
| Price per Contract | | | $ | 3.000 | | $ | 3.000 | |
| Number of Contracts | | | | 1 | 1 | | | |
| Commissions | | | $ | 50.00 | | $ | 50.00 | |
| Other Costs | | | $ | 10.00 | | $ | 10.00 | |
| Net Sold Receipts | | | $ | 240.00 | n/a | $ | 240.00 | |
| | | | | | BEFORE TAXES | | AFTER TAXES | |
| Net Gain / (Loss) | | | | | $ 240.00 | $ | 204.00 | |
| Net Gain / (Loss) Percentage | | | | | 100.00% | | 85.00% | |
| Net Annualized Return (CAGR) | | | | | 171240.09% | | 74053.49% | |
| PORTFOLIO STATUS: | | | | BEFORE | AFTER | | | |
| Current Buying Power (assumes 50% initial requirement) | | | | $ 20,000 | $ 22,100 | | | |
| Cash Available | | | | $ 5,000 | $ 5,000 | | | |
| Equity Utilized | | | | $ 5,000 | $ 3,950 | | | |
| Margin Available | | | | $ 10,000 | $ 10,000 | | | |
| Margin Payable | | | | $ 2,000 | $ 2,000 | | | |
| Calculate Page | | | | Cancel | Reset | | Submit | |

FIG. 77

| | A | B | C | D | E | F | G | H | I | J | K | L | M |
|---|---|---|---|---|---|---|---|---|---|---|---|---|---|
| 1 | | Call - Short - Covered - Sell to Open / Transfer In | | | | | | | | | | | |
| 2 | | | | | | | | | | | | | |
| 3 | | | | | | | | | | | | | |
| 4 | | | | | | | | | | | | | |
| 5 | | | Strike Price | $ | [$55] | Month Expires | | May | | Transfer In | | | |
| 6 | | | | | | | | | | | | | |
| 7 | | | Days Until Expiration | | | [85] | OPEN POSITIONS | | SELL | | AVERAGE / TOTAL | | |
| 8 | | | | | | | | | | | | | |
| 9 | | | Date | | | | 04/01/2001 | | 05/05/2001 CAL | | | | |
| 10 | | | | | | | | | | | | | |
| 11 | | | Price per Contract | | | | $ 4.000 | | $ 4.000 | | $ 4.000 | | |
| 12 | | | | | | | | | | | | | |
| 13 | | | Number of Contracts | | | | 2 | | | | 3 | | |
| 14 | | | | | | | | | | | | | |
| 15 | | | Long Shares Available | | | | 600 | | 600 | | 600 | | |
| 16 | | | | | | | | | | | | | |
| 17 | | | Long Shares Utilized | | | | 200 | | 100 | | 300 | | |
| 18 | | | | | | | | | | | | | |
| 19 | | | Commissions | | | | $ 100.00 | | $ 50.00 | | $ 150.00 | | |
| 20 | | | | | | | | | | | | | |
| 21 | | | Other Costs | | | | $ 20.00 | | $ 10.00 | | $ 30.00 | | |
| 22 | | | | | | | | | | | | | |
| 23 | | | Gross Sold Receipts | | | | $ 800.00 | | $ 400.00 | | $ 1,200.00 | | |
| 24 | | | | | | | | | | | | | |
| 25 | | | Cash Disbursed (comm+costs) | | | | $ 120.00 | | $ 60.00 | | $ 180.00 | | |
| 26 | | | | | | | | | | | | | |
| 27 | | | Net Sold Receipts | | | | $ 680.00 | | $ 340.00 | | $ 1,020.00 | | |
| 28 | | | | | | | | | | | | | |
| 29 | | | Cash / Margin Required | | | | | | $ | | | | |
| 30 | | | | | | | | | | | | | |
| 31 | | | PORTFOLIO STATUS: | | | | BEFORE | | AFTER | | | | |
| 32 | | | | | | | | | | | | | |
| 33 | | | Current Buying Power (assumes 50% initial requirement) | | | | $ 28,000 | | $ 28,680 | | | | |
| 34 | | | | | | | | | | | | | |
| 35 | | | Cash Available | | | | $ 5,000 | | $ 5,340 | | | | |
| 36 | | | | | | | | | | | | | |
| 37 | | | Equity Utilized | | | | $ 1,000 | | $ 1,000 | | | | |
| 38 | | | | | | | | | | | | | |
| 39 | | | Margin Available | | | | $ 10,000 | | $ 10,000 | | | | |
| 40 | | | | | | | | | | | | | |
| 41 | | | Margin Payable | | | | $ 2,000 | | $ 2,000 | | | | |
| 42 | | | | | | | | | | | | | |
| 43 | | Calculate Page | | | | | | Cancel | | Reset | | Submit | |
| 44 | | | | | | | | | | | | | |

FIG. 78

| | | | | | | | |
|---|---|---|---|---|---|---|---|
| Call - Short - Covered - Sell to Open / Transfer In | | | | | | | |
| Strike Price | $ | 65 | Month Expires | May | Transfer In | X | |
| Days Until Expiration | | (85) | OPEN POSITIONS | TRANSFER IN | AVERAGE / TOTAL | | |
| Date | | | 04/01/2001 | 05/05/2001 CAL | | | |
| Price per Contract | | $ | 4.000 | 4.000 | $ | 4.000 | |
| Number of Contracts | | | 2 | | 3 | | |
| Long Shares Available | | | 600 | 600 | 600 | | |
| Long Shares Utilized | | | 200 | 100 | 300 | | |
| Commissions / Transfer In Comm-Costs | | $ | 100.00 | 50.00 | $ | 150.00 | |
| Other Costs / Transfer In Costs | | $ | 20.00 | 10.00 | $ | 30.00 | |
| Gross Sold Receipts / Transfer In | | $ | 800.00 | $ 400.00 | $ | 1,200.00 | |
| Cash Disbursed (comm-costs) / Transfer In Costs | | $ | 120.00 | $ 10.00 | $ | 130.00 | |
| Net Sold Receipts | | $ | 880.00 | n/a | $ | 680.00 | |
| Cash / Margin Required | | | | $ | | | |
| PORTFOLIO STATUS: | | | BEFORE | AFTER | | | |
| Current Buying Power (assumes 50% initial requirement) | | $ | 28,000 | $ 27,980 | | | |
| Cash Available | | $ | 5,000 | $ 4,990 | | | |
| Equity Utilized | | $ | 1,000 | $ 1,000 | | | |
| Margin Available | | $ | 10,000 | $ 10,000 | | | |
| Margin Payable | | $ | 2,000 | $ 2,000 | | | |
| Calculate Page | | | Cancel | Reset | Submit | | |

FIG. 79

| | | | | | | | | | |
|---|---|---|---|---|---|---|---|---|---|
| | Call - Short - Covered - Buy to Close / Transfer Out | | | | | | | | |
| | Strike Price $ | [85] | Month Expires | | May | Transfer Out | | | |
| | Days Until Expiration | | (85) | | SOLD | BUY | | DIFFERENCE/TOTAL | |
| | Date | | | | 04/01/2001 | 05/05/2001 CAL | | 34 | |
| | Price per Contract | | | $ | 4.000 | 4.000 | $ | | |
| | Number of Contracts: | | | | 5.0 | 3.0 | | 3.0 | |
| | Long Shares Utilized / Released | | | | 500.0 | 300.0 | | 300.00 | |
| | Commissions | | | $ | 50.00 | 50.00 | $ | 100.00 | |
| | Other Costs | | | $ | 10.00 | 10.00 | $ | 20.00 | |
| | Net Sold Receipts / Allocated Basis | | | $ | 2,340.00 | $ 1,170.00 | $ | 1,170.00 | |
| | Net Cash Disbursed | | | | | $ 760.00 | | | |
| | PORTFOLIO STATUS: | | | | BEFORE | AFTER | | | |
| | Current Buying Power (assumes 50% initial requirement) | | | $ | 20,000 | $ 17,480 | | | |
| | Cash Available | | | $ | 5,000 | $ 4,240 | | | |
| | Equity Utilized | | | $ | 5,000 | $ 5,000 | | | |
| | Margin Available | | | $ | 10,000 | $ 9,500 | | | |
| | Margin Payable | | | $ | 2,000 | $ 2,500 | | | |
| | Calculate Page | | | | Cancel | Reset | | Submit | |

FIG. 80

| | | | | | | | |
|---|---|---|---|---|---|---|---|
| Call - Short - Covered - Buy to Close / Transfer Out | | | | | | | |
| Strike Price $ | 65 | Month Expires | May | | Transfer Out | X | |
| Days Until Expiration | | (85) | SOLD | | TRANSFER OUT | | DIFFERENCE/TOTAL |
| Date | | | 04/01/2001 | | 05/05/2001 CAL | | 34 |
| Price per Contract | | | $ 4.000 | | 4.000 | $ | |
| Number of Contracts: | | | 6.0 | | 3.0 | | 3.0 |
| Long Shares Utilized / Released | | | 600.0 | | 300.0 | | 300.00 |
| Commissions / Transfer Out Comm-Costs | | | $ 50.00 | | 50.00 | $ | 100.00 |
| Other Costs / Transfer Out Costs | | | $ 10.00 | | 10.00 | $ | 20.00 |
| Net Sold Receipts / Transfer Out Value | | | $ 2,340.00 | | $ 1,200.00 | $ | 1,140.00 |
| Net Cash Disbursed | | | | | $ 10.00 | | |
| PORTFOLIO STATUS: | | | BEFORE | | AFTER | | |
| Current Buying Power (assumes 50% initial requirement) | | | $ 20,000 | | $ 18,980 | | |
| Cash Available | | | $ 5,000 | | $ 4,990 | | |
| Equity Utilized | | | $ 5,000 | | $ 5,000 | | |
| Margin Available | | | $ 10,000 | | $ 9,500 | | |
| Margin Payable | | | $ 2,000 | | $ 2,500 | | |
| Calculate Page | | | Cancel | | Reset | | Submit |

FIG. 81

| | | | | | | | | | | | |
|---|---|---|---|---|---|---|---|---|---|---|---|
| | Call - Short - Covered - Exercise | | | | | | | | | | |
| | Strike Price | $ | 65 | Month Expires | | May | | Margin Available % | | 50 | |
| | Days Until Expiration | | (85) | | | BOUGHT SHARES | | SELL-EXERCISED | | DIFFERENCE/TOTAL | |
| | Date | | | | | 11/15/2000 | | 05/05/2001 CAL | | 171 | |
| | Bought/Exercise Price per Share | | | | $ | 20.000 | | 10.000 | $ | (10.000) | |
| | Number of Contracts | | | | | 2 | | | | 1 | |
| | Number of Shares | | | | | 200.0 | | 100.0 | | 100.0 | |
| | Commissions | | | | $ | 100.00 | | 50.00 | | 150.00 | |
| | Other Costs | | | | $ | 20.00 | | 10.00 | | 30.00 | |
| | Bought Settlement | | | | $ | 4,120.00 | $ | 2,060.00 | $ | 2,060.00 | |
| | Net Gain / (Loss) - Call Option | | | | | | $ | 370.00 | | | |
| | Net Gain / (Loss) - Stock | | | | | | $ | (1,120.00) | | | |
| | | | | | | | BEFORE TAXES | | AFTER TAXES | | |
| | Net Gain / (Loss) - Stock & Option | | | | | | $ | (750.00) | $ | (525.00) | |
| | Net Gain / (Loss) Percentage | | | | | | | -36.41% | | -25.49% | |
| | Net Annualized Return (CAGR) | | | | | | | -61.97% | | -46.65% | |
| | Net Sold Receipts | | | | | | $ | 940.00 | | | |
| | Margin Paid | | | | | | | 500.00 | | | |
| | Cash Deposited | | | | | | $ | 440.00 | | | |
| | PORTFOLIO STATUS: | | | | | BEFORE | | AFTER | | | |
| | Current Buying Power | | | | $ | 20,000 | $ | 14,980 | | | |
| | Cash Available | | | | $ | 5,000 | $ | 5,440 | | | |
| | Equity Utilized | | | | $ | 5,000 | $ | 5,000 | | | |
| | Margin Available | | | | $ | 10,000 | $ | 7,000 | | | |
| | Margin Payable | | | | $ | 2,000 | $ | 1,500 | | | |
| | Calculate Page | | | | | Cancel | | Reset | | Submit | |

FIG. 82

Call - Short - Covered - Expired

| | SOLD | EXPIRED | DIFFERENCE/TOTAL |
|---|---|---|---|
| Strike Price $ 65 Month Expires | May | Days Until Expiration | (35) |
| Date | 04/01/2001 | 05/05/2001 CAL | 34 |
| Price per Contract | $ 4.000 | | $ 4.000 |
| Number of Contracts: | 6.0 | 6.0 | - |
| Long Shares Utilized / Released | 600.0 | 600.0 | - |
| Commissions | $ 50.00 | $ | $ 50.00 |
| Other Costs | $ 10.00 | $ | $ 10.00 |
| Sold Net Receipts | $ 2,340.00 | n/a | $ 2,340.00 |

| | BEFORE TAXES | AFTER TAXES |
|---|---|---|
| Net Gain | $ 2,340.00 | $ 1,638.00 |
| Net Gain Percentage | 100.00% | 70.00% |
| Net Annualized Return (CAGR) | 171240.09% | 29797.26% |

| PORTFOLIO STATUS: | BEFORE | AFTER |
|---|---|---|
| Current Buying Power (assumes 50% initial requirement) | $ 20,000 | $ 20,000 |
| Cash Available | $ 5,000 | $ 5,000 |
| Equity Utilized | $ 5,000 | $ 5,000 |
| Margin Available | $ 10,000 | $ 10,000 |
| Margin Payable | $ 2,000 | $ 2,000 |

| Calculate Page | | Cancel | Reset | Submit |

FIG. 83

| | | | | | |
|---|---|---|---|---|---|
| Call - Short - Uncovered - Sell to Open / Transfer In | | | | | |
| Strike Price $ | 65 | Month Expires | May | Transfer In | |
| Cash Min Rec $ | 500 | In Money Maint % | 15 | Out Money Main % | 2 |
| Days Until Expiration | (85) | OPEN POSITIONS | SELL | AVERAGE / TOTAL | |
| Date | | 04/01/2001 | 05/05/2001 CAL | | |
| Price per Contract | | $ 4.000 | $ 4.000 | $ 4.000 | |
| Number of Contracts | | 2 | 1 | 3 | |
| Commissions | | $ 100.00 | $ 50.00 | $ 150.00 | |
| Other Costs | | $ 20.00 | $ 10.00 | $ 30.00 | |
| Gross Sold Receipts | | $ 800.00 | $ 400.00 | $ 1,200.00 | |
| Cash Disbursed (comm-costs) | | $ 120.00 | $ 60.00 | $ 180.00 | |
| Net Sold Receipts | | $ 680.00 | $ 340.00 | $ 1,020.00 | |
| Equity Utilized | | | $ 2,150.00 | | |
| Cash Required | | | $ | | |
| PORTFOLIO STATUS: | | BEFORE | AFTER | | |
| Current Buying Power (assumes 50% initial requirement) | | $ 28,000 | $ 24,380 | | |
| Cash Available | | $ 5,000 | 5,340 | | |
| Equity Utilized | | $ 1,000 | 3,150 | | |
| Margin Available | | $ 10,000 | $ 10,000 | | |
| Margin Payable | | $ 2,000 | $ 2,000 | | |
| Calculate Page | | Cancel | Reset | Submit | |

FIG. 84

| | | | | | |
|---|---|---|---|---|---|
| Call - Short - Uncovered - Sell to Open / Transfer In | | | | | |
| Strike Price $ [85] Month Expires | | [May] | Transfer In | [Y] | |
| Cash Min Req $ [500] In Money Maint % | | [15] | Out Money Main % | [25] | |
| Days Until Expiration | (85) | OPEN POSITIONS | TRANSFER IN | AVERAGE / TOTAL | |
| Date | | 04/01/2001 | [05/05/2001] CAL | | |
| Price per Contract | $ | 4.000 | [4.000] | $ | 4.000 |
| Number of Contracts | | 2 | [1] | | 3 |
| Commissions / Transfer In Comm-Costs | $ | 100.00 | [50.00] | $ | 150.00 |
| Other Costs / Transfer In Costs | $ | 20.00 | [10.00] | $ | 30.00 |
| Gross Sold Receipts / Transfer In | $ | 800.00 | $ 400.00 | $ | 1,200.00 |
| Cash Disbursed (comm-costs) / Transfer In Costs | $ | 120.00 | $ 10.00 | $ | 130.00 |
| Net Sold Receipts | $ | 680.00 | n/a | $ | 680.00 |
| Equity Utilized | | | $ 2,150.00 | | |
| Cash Required | | | $ | | |
| PORTFOLIO STATUS: | | BEFORE | AFTER | | |
| Current Buying Power (assumes 50% initial requirement) | $ | 28,000 | $ 23,680 | | |
| Cash Available | $ | 5,000 | 4,990 | | |
| Equity Utilized | $ | 1,000 | 3,150 | | |
| Margin Available | $ | 10,000 | $ 10,000 | | |
| Margin Payable | $ | 2,000 | $ 2,000 | | |
| Calculate Page | | Cancel | Reset | Submit | |

FIG. 85

| | | | SOLD | BUY | DIFFERENCE/TOTAL |
|---|---|---|---|---|---|
| Call - Short - Uncovered - Buy to Close / Transfer Out | | | | | |
| Strike Price | $ | 65 | Month Expires | May | Transfer Out |
| Cash Min Req | $ | 500 | In Money Maint % | 15 | Out Money Maint % | 25 |
| Days Until Expiration | | (85) | SOLD | BUY | DIFFERENCE/TOTAL |
| Date | | | 04/01/2001 | 05/05/2001  CAL | 34 |
| Price per Contract | | | $ 3.000 | 3.000 | $ . |
| Number of Contracts | | | 1.0 | 1.0 | . |
| Commissions | | | $ 10.00 | 10.00 | $ 20.00 |
| Other Costs | | | $ 10.00 | 20.00 | $ 30.00 |
| Net Sold Receipts / Allocated Basis | | | $ 280.00 | $ 280.00 | $ |
| Net Cash Disbursed | | | | $ 130.00 | |
| PORTFOLIO STATUS: | | | BEFORE | AFTER | |
| Current Buying Power (assumes 50% initial requirement) | | | $ 20,000 | $ 22,940 | |
| Cash Available | | | $ 5,000 | $ 4,870 | |
| Equity Utilized | | | $ 5,000 | $ 3,200 | |
| Margin Available | | | $ 10,000 | $ 9,800 | |
| Margin Payable | | | $ 2,000 | $ 2,200 | |
| Calculate Page | | | Cancel | Reset | Submit |

FIG. 86

| | | | | | | | | | | | |
|---|---|---|---|---|---|---|---|---|---|---|---|
| A|B|C| D | E | F | G | H | I | J | K | L | M |

| | |
|---|---|
| 1 | Call - Short - Uncovered - Buy to Close / Transfer Out |

| | | | | | | |
|---|---|---|---|---|---|---|
| Strike Price | $ | 95 | Month Expires | May | Transfer Out | x |
| Cash Min Req | $ | 500 | In Money Maint % | 15 | Out Money Maint % | 25 |
| Days Until Expiration | | (35) | SOLD | TRANSFER OUT | DIFFERENCE/TOTAL |
| Date | | | 04/01/2001 | 05/05/2001 CAL | 34 |
| Price per Contract | | | $ 3.000 | 3.000 | $ |
| Number of Contracts: | | | 1.0 | 1.0 | |
| Commissions / Transfer Out Comm-Costs | | | $ 10.00 | 10.00 | $ 20.00 |
| Other Costs / Transfer Out Costs | | | $ 10.00 | 20.00 | $ 30.00 |
| Net Sold Receipts / Transfer Out Value | | | $ 280.00 | $ 300.00 | $ (20.00) |
| Net Cash Disbursed | | | | $ 20.00 | |
| PORTFOLIO STATUS: | | | BEFORE | AFTER | |
| Current Buying Power (assumes 50% initial requirement) | | | $ 20,000 | $ 23,150 | |
| Cash Available | | | $ 5,000 | $ 4,980 | |
| Equity Utilized | | | $ 5,000 | $ 3,200 | |
| Margin Available | | | $ 10,000 | $ 9,800 | |
| Margin Payable | | | $ 2,000 | $ 2,200 | |
| Calculate Page | | | Cancel | Reset | Submit |

| | A | B | C | D | E | F | G | H | I | J | K | L | M |
|---|---|---|---|---|---|---|---|---|---|---|---|---|---|
| 1 | | | | Call Short - Uncovered - Expired | | | | | | | | | |
| 2 | | | | | | | | | | | | | |
| 3 | | | | Strike Price | $ | 65 | Month Expires | | May | | | | |
| 4 | | | | | | | | | | | | | |
| 5 | | | | Cash Min Req | $ | 500 | In Money Maint % | 15 | | Out Money Main % | | 25 | |
| 6 | | | | | | | | | | | | | |
| 7 | | | | Days Until Expiration | | | (85) | SOLD | | EXPIRED | | DIFFERENCE/TOTAL | |
| 8 | | | | | | | | | | | | | |
| 9 | | | | Date | | | | 04/01/2001 | | 05/05/2001 | | 34 | |
| 10 | | | | | | | | | | | | | |
| 11 | | | | Price per Contract | | | | $ 4.000 | | | | $ 4.000 | |
| 12 | | | | | | | | | | | | | |
| 13 | | | | Number of Contracts: | | | | 2.0 | | 1.0 | | 1.0 | |
| 14 | | | | | | | | | | | | | |
| 15 | | | | Commissions | | | | $ 50.00 | | | | $ 50.00 | |
| 16 | | | | | | | | | | | | | |
| 17 | | | | Other Costs | | | | $ 10.00 | | | | $ 10.00 | |
| 18 | | | | | | | | | | | | | |
| 19 | | | | Net Sold Receipts | | | | $ 740.00 | | n/a | | $ 740.00 | |
| 20 | | | | | | | | | | | | | |
| 21 | | | | | | | | | | BEFORE TAXES | | AFTER TAXES | |
| 22 | | | | | | | | | | | | | |
| 23 | | | | Net Gain / (Loss) | | | | | | $ 740.00 | | $ 629.00 | |
| 24 | | | | | | | | | | | | | |
| 25 | | | | Net Gain / (Loss) Percentage | | | | | | 100.00% | | 85.00% | |
| 26 | | | | | | | | | | | | | |
| 27 | | | | Net Annualized Return (CAGR) | | | | | | 171240.09% | | 74053.49% | |
| 28 | | | | | | | | | | | | | |
| 29 | | | | PORTFOLIO STATUS: | | | | BEFORE | | AFTER | | | |
| 30 | | | | | | | | | | | | | |
| 31 | | | | Current Buying Power (assumes 50% initial requirement) | | | | $ 20,000 | | $ 23,800 | | | |
| 32 | | | | | | | | | | | | | |
| 33 | | | | Cash Available | | | | $ 5,000 | | $ 5,000 | | | |
| 34 | | | | | | | | | | | | | |
| 35 | | | | Equity Utilized | | | | $ 5,000 | | $ 3,100 | | | |
| 36 | | | | | | | | | | | | | |
| 37 | | | | Margin Available | | | | $ 10,000 | | $ 10,000 | | | |
| 38 | | | | | | | | | | | | | |
| 39 | | | | Margin Payable | | | | $ 2,000 | | $ 2,000 | | | |
| 40 | | | | | | | | | | | | | |
| 41 | | | | Calculate Page | | | | Cancel | | Reset | | Submit | |
| 42 | | | | | | | | | | | | | |

FIG. 89

GAMING SYSTEM PROVIDING SIMULATED SECURITIES TRADING

RELATED APPLICATIONS

Embodiments of the present invention relate to U.S. Provisional Application Ser. No. 60/513,314, filed Oct. 21, 2003, entitled "Gaming System," the content of which is incorporated by reference herein in its entirety and which is a basis for a claim of priority.

Embodiments of the present invention relate to U.S. Pat. No. 7,165,044 B1 (application Ser. No. 09/410,825), entitled "Investment Portfolio Tracking System and Method," the entirety of which is incorporated by reference herein in its entirety.

FIELD OF THE INVENTION

Embodiments of the invention relate to electronic skill-based gaming.

SUMMARY

Embodiments of the invention relate to an electronic gaming system that provides a game of skill in which players engage in simulated securities trading based on real-world prices of real-world securities.

DESCRIPTION OF DRAWINGS

FIGS. 6-35 show the details of the modules of the structure illustrated in FIG. 5.

FIG. 37 shows a symbol to action screen of the preferred embodiment.

FIGS. 38, 39 and 40 show features of security summary reports of the preferred embodiment.

FIGS. 46, and 47 show details of a tradescreen for opening a long position in a stock in accordance with the preferred embodiment.

FIGS. 48, and 49 show details of a tradescreen for closing a long position in a stock in accordance with the preferred embodiment.

FIGS. 50, and 51 show details of a tradescreen for opening a short position in a stock in accordance with the preferred embodiment.

FIGS. 52, and 53 show details of a tradescreen for closing a short position in a stock in accordance with the preferred embodiment.

FIGS. 54, and 55 show details of a tradescreen for opening a long position in a put in accordance with the preferred embodiment.

FIGS. 56, and 57 show details of a first tradescreen for closing a long position in a put in accordance with the preferred embodiment.

FIG. 58 shows details of a second tradescreen for closing a long position in a put in accordance with the preferred embodiment.

FIG. 59 shows details of a third tradescreen for closing a long position in a put in accordance with the preferred embodiment.

FIGS. 60 and 61 show details of a tradescreen for opening a long position in a call in accordance with the preferred embodiment.

FIGS. 62 and 63 show details of a first tradescreen for closing a long position in a call in accordance with the preferred embodiment.

FIG. 64 shows details of a second tradescreen for closing a long position in a call in accordance with the preferred embodiment.

FIG. 65 shows details of a third tradescreen for closing a long position in a call in accordance with the preferred embodiment.

FIGS. 66 and 67 show details of a tradescreen for opening a covered short position in a put in accordance with the preferred embodiment.

FIGS. 68 and 69 show details of a first tradescreen for closing a covered short position in a put in accordance with the preferred embodiment.

FIG. 70 shows details of a second tradescreen for closing a covered short position in a put in accordance with the preferred embodiment.

FIG. 71 shows details of a third tradescreen for closing a covered short position in a put in accordance with the preferred embodiment.

FIGS. 72 and 73 show details of a tradescreen for opening an uncovered short position in a put in accordance with the preferred embodiment.

FIGS. 74 and 75 show details of a first tradescreen for closing an uncovered short position in a put in accordance with the preferred embodiment.

FIG. 76 shows details of a second tradescreen for closing an uncovered short position in a put in accordance with the preferred embodiment.

FIG. 77 shows details of a third tradescreen for closing an uncovered short position in a put in accordance with the preferred embodiment.

FIGS. 78 and 79 show details of a tradescreen for opening a covered short position in a call in accordance with the preferred embodiment.

FIGS. 80 and 81 show details of a first tradescreen for closing a covered short position in a call in accordance with the preferred embodiment.

FIG. 82 shows details of a second tradescreen for closing a covered short position in a call in accordance with the preferred embodiment.

FIG. 83 shows details of a third tradescreen for closing a covered short position in a call in accordance with the preferred embodiment.

FIGS. 84 and 85 show details of a tradescreen for opening an uncovered short position in a call in accordance with the preferred embodiment.

FIGS. 86 and 87 show details of a first tradescreen for closing an uncovered short position in a call in accordance with the preferred embodiment.

FIG. 88 shows details of a second tradescreen for closing an uncovered short position in a call in accordance with the preferred embodiment.

FIG. 89 shows details of a third tradescreen for closing an uncovered short position in a call in accordance with the preferred embodiment.

DETAILED DESCRIPTION

Definitions

The following meanings are intended for the following terms in this disclosure:

FINANCIAL INSTRUMENT: a tradable interest in a title to, or a license, contract or right relating to, a tangible or intangible asset, such as a stock or option.

POSITION: an interest in a financial instrument. Positions include long positions, covered short positions, and uncovered short positions. The creation of a position is referred to as "opening" the position, and the termination of a position is referred to as "closing" the position.

LONG POSITION: a position involving ownership of a financial instrument.

SHORT POSITION: a position involving the sale of a financial instrument owned by another in exchange for an interest payment on the value of the financial instrument and the obligation to return the same financial instrument to the other at a later date.

COVERED SHORT POSITION: a short position in which the position holder possesses another financial instrument of the same type as the one for which the short position has been assumed, such that the currently owned financial instrument may be provided to the owner of the shorted financial instrument if necessary.

UNCOVERED SHORT POSITION: a short position entered without possessing another financial instrument of the same type as the instrument being shorted.

SECURITY: a share of a company (stock), mutual fund or investment trust, index, or commodity, including any related derivative financial instrument.

OPTION: a contract giving the right to buy or sell a stock, index, or commodity, including any related derivative financial instrument at a given "strike price". An option has a contract price and an expiration date. A position in an option may be closed through an offsetting transaction, through exercise of the option, or through expiration of the option.

PUT: an option giving the right to sell a stock, index, or commodity, including any related derivative financial instrument at a given strike price.

CALL: an option giving the right to buy a stock, index, or commodity, including any related derivative financial instrument at a given strike price.

Figure 1:
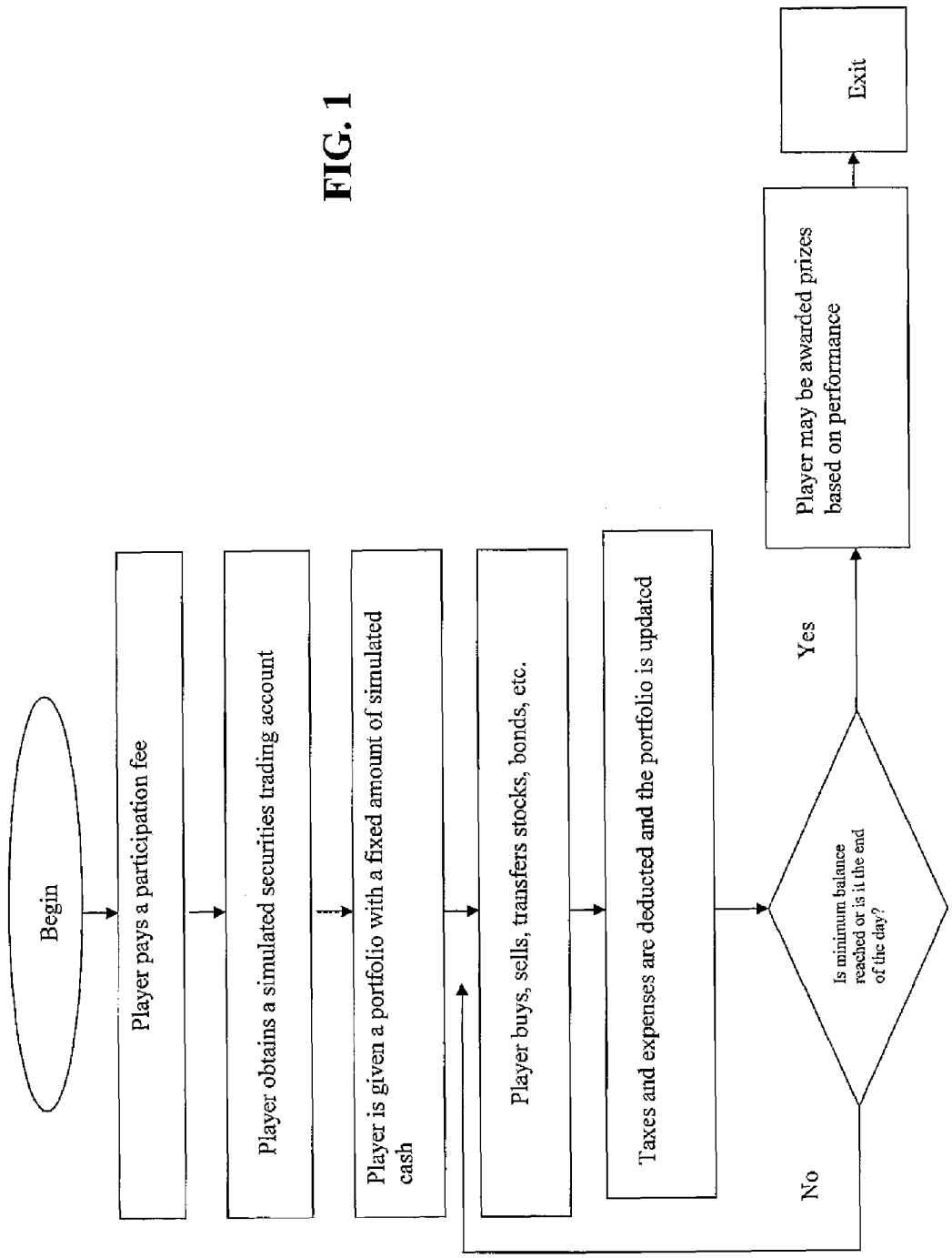
FIG. 1 shows a set of high-level steps associated with the operation of an embodiment of the present invention.

An embodiment of the invention is a system that provide players with simulated securities trading accounts and tools that enable the players to engage in simulated transactions in stocks, options, mutual funds, bonds, commodities, currencies, futures and other financial instruments. The player pays a participation fee to play. A set of high-level steps associated with the operation of an embodiment of the present invention, is shown in FIG. 1. The following is a more detailed description. The player begins with a fixed amount of simulated cash in the portfolio, and engages in transactions of their choosing. Prizes may be awarded at the conclusion of the game based on the net worth of the player's portfolio, and special prizes may be awarded for individual achievements such as best investment. Interim prizes may also be awarded. For example, daily prizes may be awarded for the end of day net worth leader, the day's biggest net worth gainer, or the best single investment performance of the day. The interim prizes may be awarded as cash or as an addition of simulated cash to the trading portfolio. Interim prizes may also be awarded for poor performance such as for the day's biggest net worth loser or the worst single investment of the day.

Figure 2:
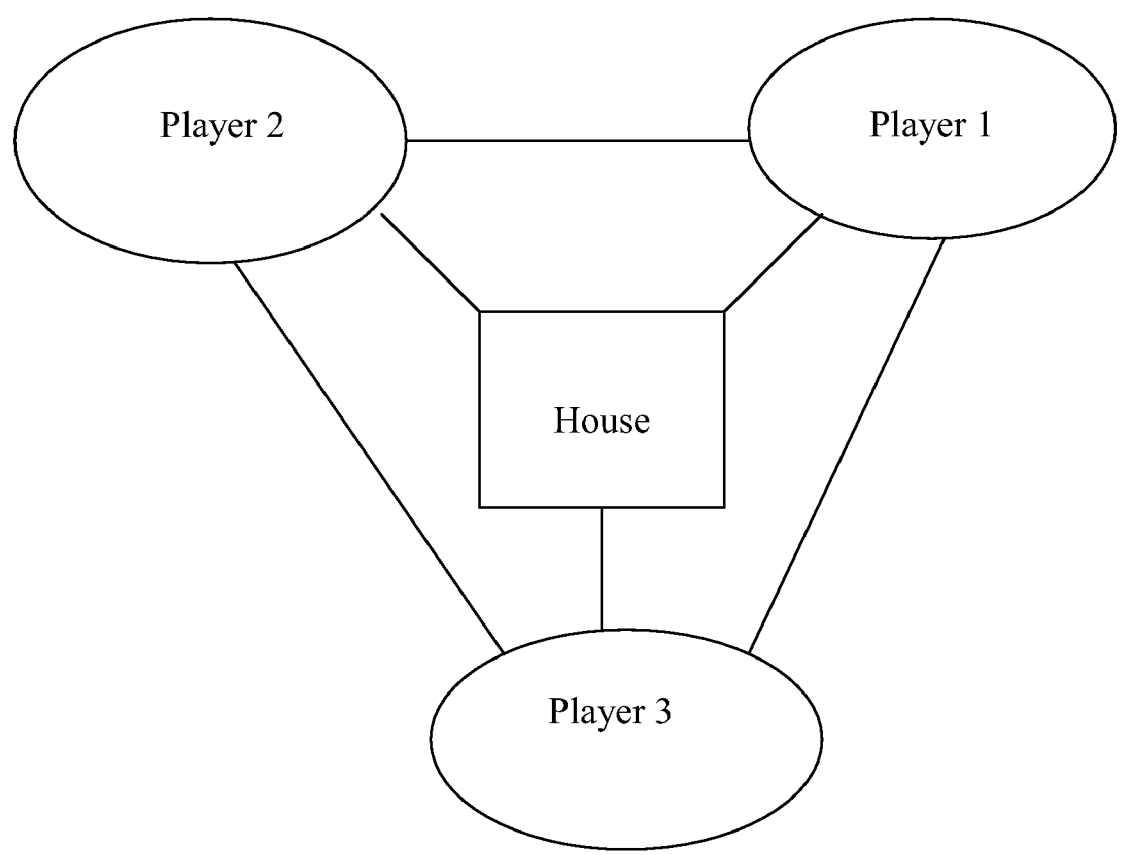
FIG. 2 shows that players may compete against each other in open tournament style play or in private games, or may play against "the house."

In the currently preferred embodiment, players may compete against each other in open tournament style play or in private games, or may play against "the house," which may be represented, for example, by an index such as the S&P 500 or some other objective performance measure (See FIG. 2).

The system imposes financial regulations and restrictions on the behavior of the players that simulate the regulations and restrictions that exist in real-world securities trading, such as the regulations of the SEC, FRB, IRS and NYSE. These include charging commissions and other costs for each transaction, paying interest on simulated cash held in the account, charging interest on amounts borrowed on margin, imposing initial and maintenance margin requirements, and tracking and assessing short term and long term capital gains taxes. Thus the skill of the players in profiting from opening and closing positions in securities is tested under real-world conditions.

Tax expenses and margin interest expenses are deducted from the account as they are realized, and unrealized tax expenses and margin interest expenses are deducted from portfolio assets to determine the net worth of the portfolio. A player may be disqualified if the portfolio moves into a margin call status.

Figure 3:
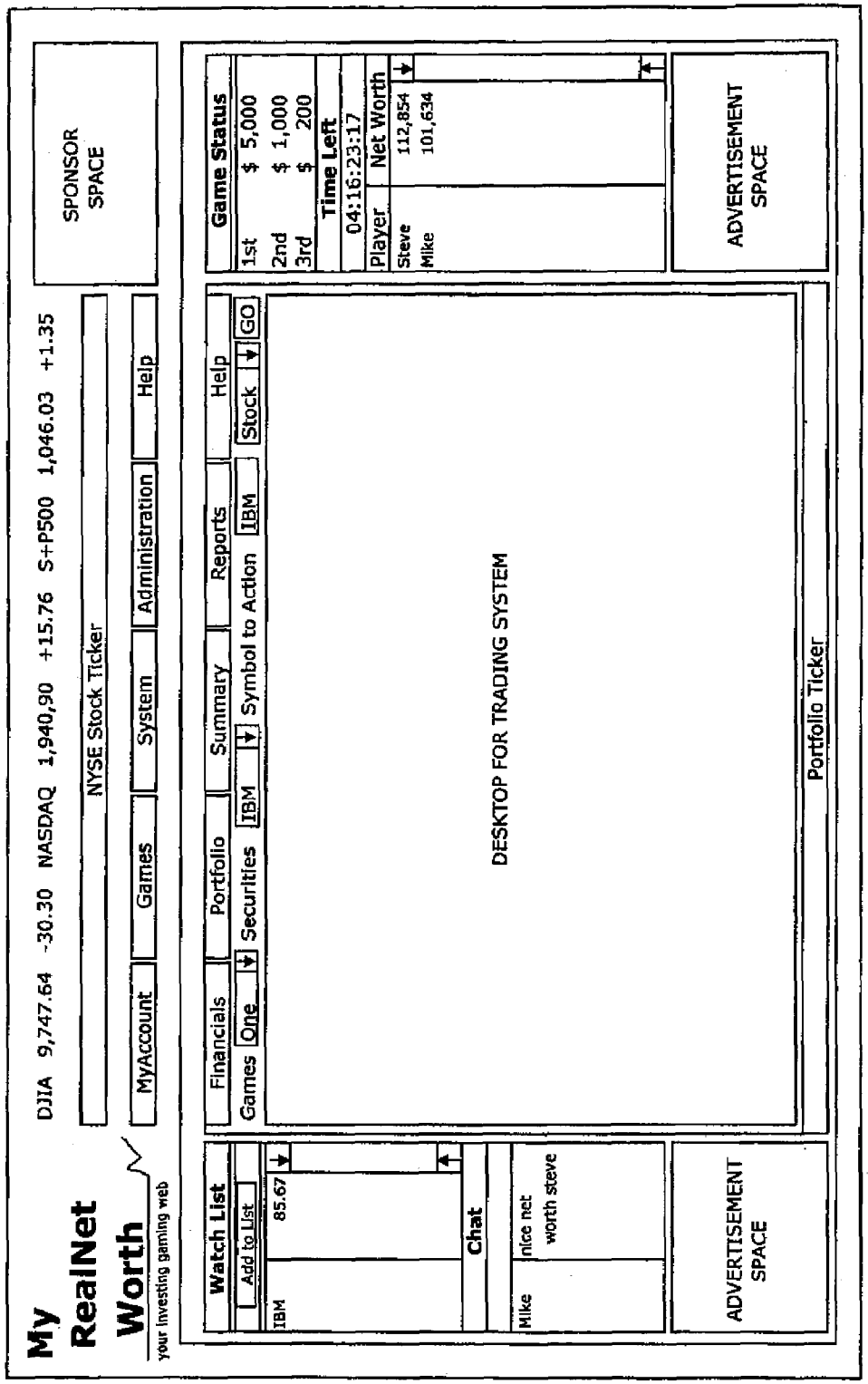
FIG. 3 shows features of a main user interface that is presented to a player.

FIG. 3 shows features of a main user interface that is presented to a player. The interface includes a central trading desktop area that provides screens for conducting transactions and screens for reviewing the portfolio, details of which are described below. The left side of the interface includes a watch list where the current status of specified securities is monitored, and an instant messaging window where communication with other players is displayed. At the right side of the interface is a standings column showing the present net worth of each player, and a game status area showing the prizes to be awarded. The interface may also include information showing the time and date at which the competition concludes or the time remaining in the competition, and may present additional information about players such as the day's and tournament's biggest gainers and losers, or best and worst investments.

The main user interface also includes a set of navigation tools for accessing reports including financial reports, portfolio reports, summary reports, a full list of all available reports, and help materials. Beneath these buttons are a set of tools including a games selection tool for changing between multiple games, a securities selection tool for accessing a list of current holdings with links to screens reports for each current holding and providing links to screens for opening and closing positions, a symbol to action tool for accessing screens showing current holdings of a security and providing links to screens for opening and closing positions, and a securities type selection tool for selecting either stocks, option, mutual funds, bonds, commodities, currencies, futures.

Figure 4:
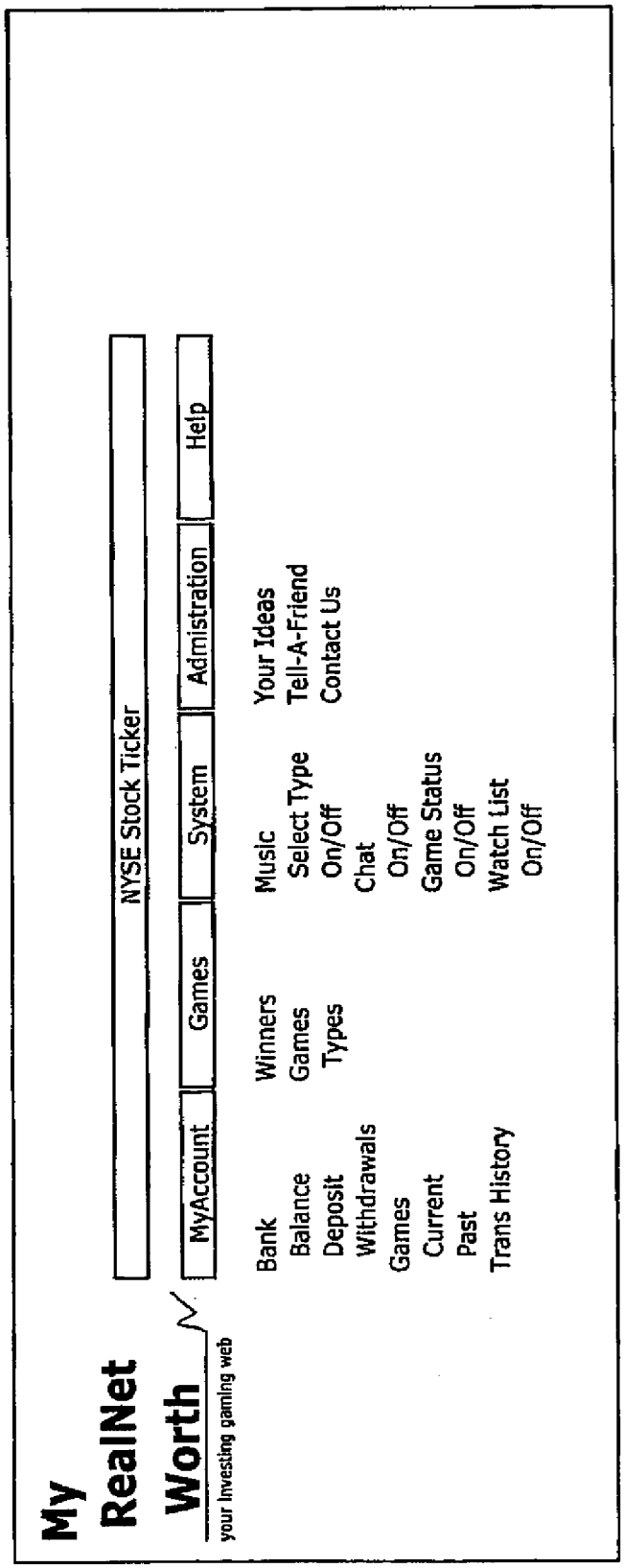
FIG. 4 shows the contents of the pull down menus accessed using the tools of FIG. 3.

The main user interface also includes a row of tools for accessing additional information, labeled as My Account, Games, System, Administration and Help. FIG. 4 shows the contents of the pull down menus accessed using the tools of FIG. 3.

Figure 5:
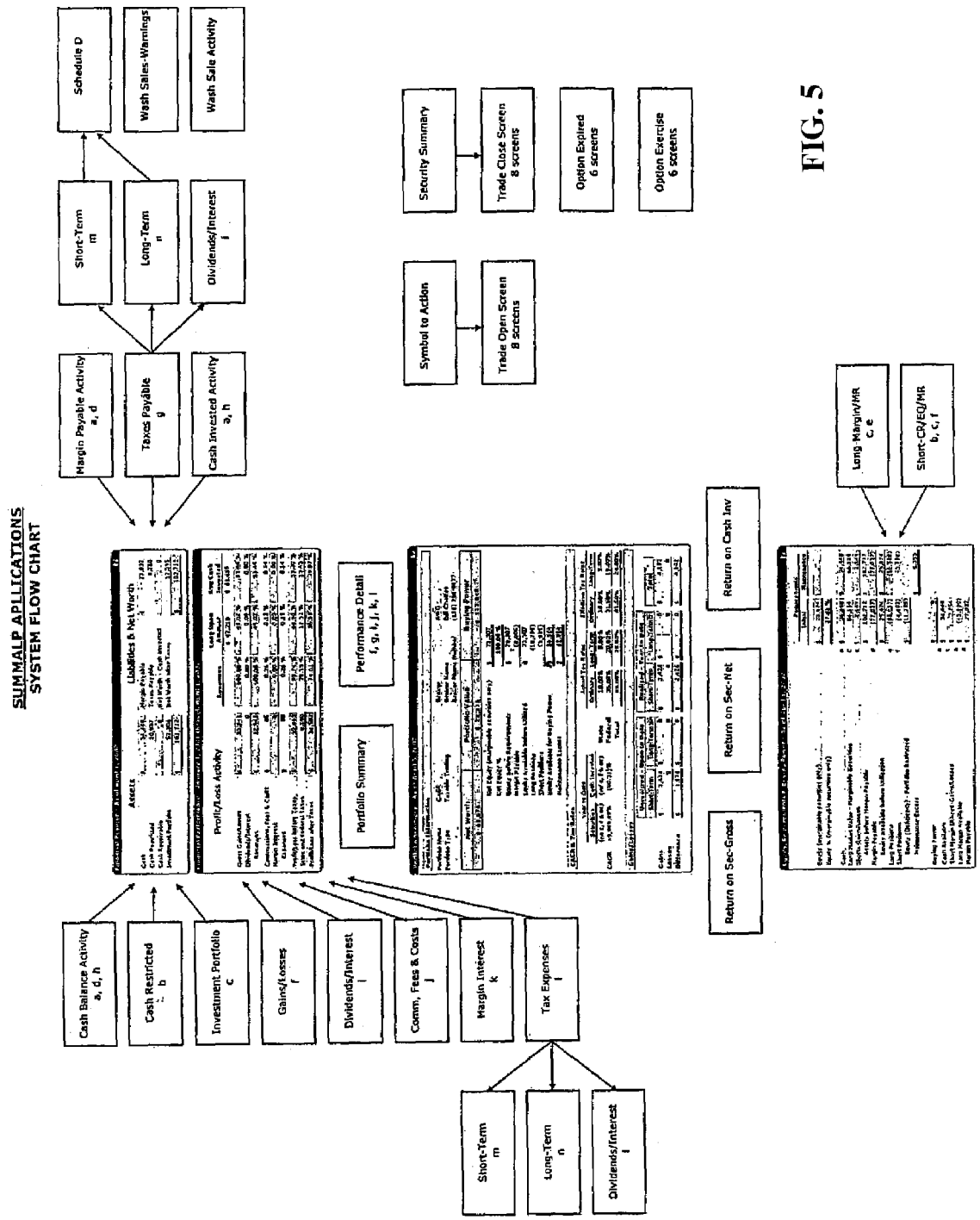
FIG. 5 shows the main flow chart of an embodiment of the present invention.
Figure 17:
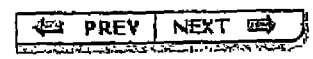
Figure 18:
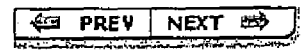
Figure 21:
Figure 22:
Figure 23:
Figure 24:
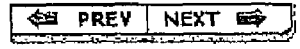
Figure 26:
Figure 28:
Figure 29:
Figure 30:

The gaming system described herein employs a portfolio tracking system as described in commonly-owned U.S. Pat. No. 7,165,044 B1, the entirety of which is incorporated herein by reference. This system processes transaction data to generate a net worth report for the portfolio that is presented in the form of a balance sheet representing the assets, liabilities and equity (net worth) of the investment portfolio. The balances are calculated based on current asset prices and account for realized and unrealized commissions, fees, interest, and taxes. The balances in the balance sheet are linked to supporting reports for each balance. A variety of additional reports are also provided. This system provides players with a detailed understanding of the true net worth of their portfolios when all costs and liabilities are considered. FIGS. 5-35 show the organization of these reports and images of reports generated by the implementation of this system that is produced by SummaLP Applications, Inc. Because the descriptions of these reports are similar to those presented in U.S. Pat. No. 7,165,044 B1, they are omitted herein. However, note that FIG. 5 shows the main flow chart of an embodiment of the present invention, while FIGS. 6-35 show the details of the modules of the structure illustrated in FIG. 5. These screens are made available to players in the embodiment of the gaming system described herein.

Figure 36:
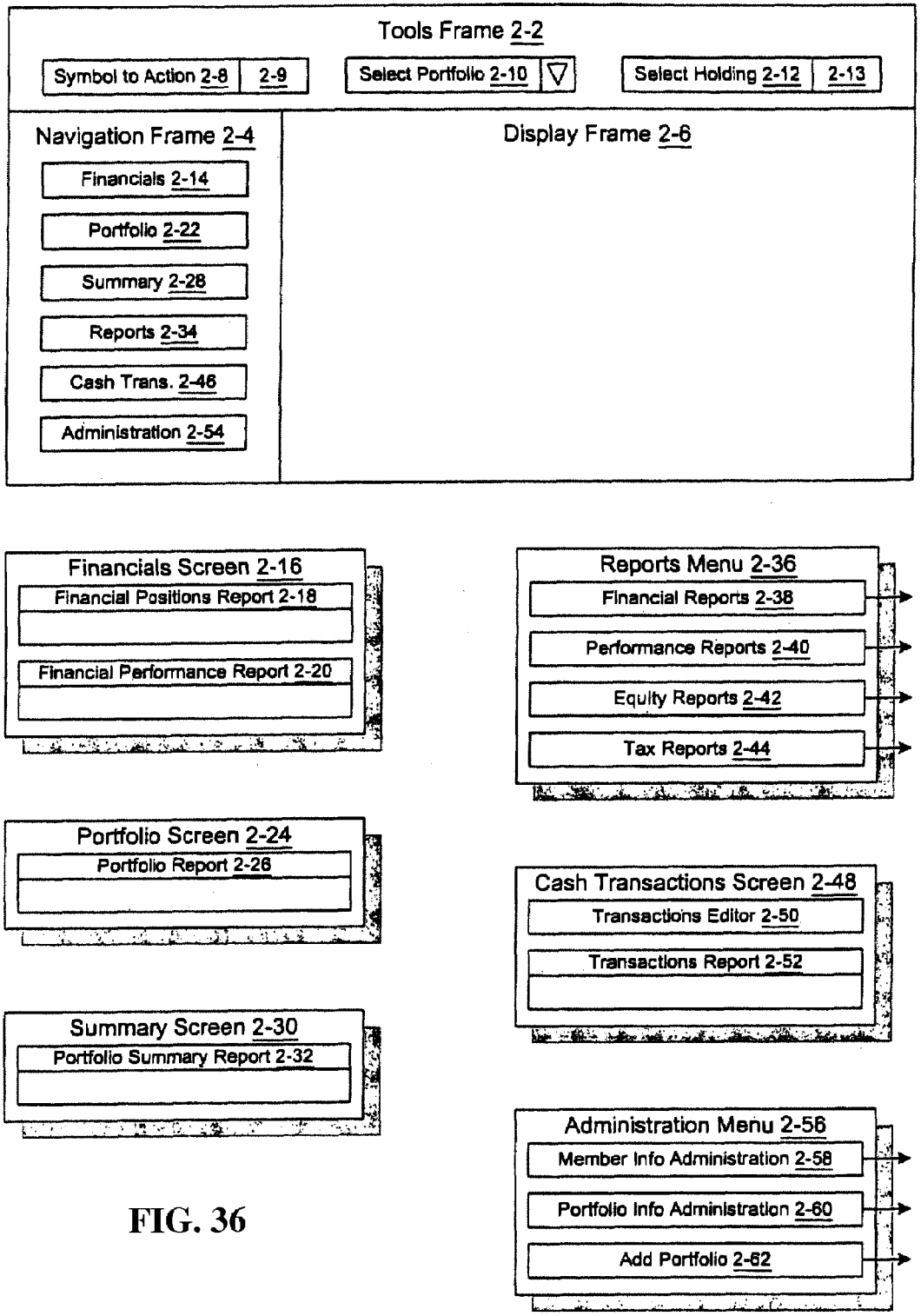
FIG. 36 shows a basic user interface layout in accordance with the preferred embodiment.

The gaming system described herein also uses a system for generating screens for opening and closing positions in securities as described in commonly owned U.S. patent application Ser. No. 10/150,990. This system generates screens for opening and closing positions in securities that present data showing the effects of a proposed opening/closing transaction on the portfolio's assets, liabilities and equity. The screens allow the user to enter the parameters of a proposed hypothetical transaction and view the consequences of that hypothetical transaction prior to actually executing the transaction. As a result, the user can make better informed decisions about issues such as transaction parameters, timing, and funding. FIGS. 36-89 show the organization of these screens and diagrams of open and close screens generated by the implementation of this system that is produced by SummaLP Applications, Inc. These screens are made available to players in the embodiment of the gaming system described herein.

The following is additional information in reference to FIGS. 36-89, which also provide details for executable trade screens and hypothetical trades and transfers.

FIG. 36 provides a generic illustration of a user interface and related navigation options in accordance with the preferred embodiment. The user interface comprises a tools frame 2-2, a navigation frame 2-4, and a display frame 2-6. The tools frame 2-2 provides tools that may be operated by the user including a symbol to action tool 2-8 for displaying a symbol to action screen that in turn enables the user to request a tradescreen for a selected financial instrument, a select portfolio tool 2-10 for selecting a particular portfolio for which tradescreens or reports are to be generated, and a select individual holding tool 2-12 for selecting a financial instrument for which a summary report is to be generated.

The symbol to action tool 2-8 of the preferred embodiment includes a symbol box 2-9 in which the user may enter the stock ticker of a selected financial instrument for which a symbol to action screen is desired. FIG. 37 illustrates details of a symbol to action screen 3-2 for the stock AOL that is provided in response to operation of the symbol to action tool 2-8. The symbol to action screen includes a market data section 3-4 that provides current market data for the selected financial instrument. The symbol to action screen 3-2 further includes several tools, presented in the user interface as buttons, for requesting tradescreens for opening various types of positions in the selected financial instrument. The tools include a buy long open tool 3-6, a sell short open tool 3-8, a put tool 3-10, a call tool 3-12, and an option combination tool 3-14 for various combinations of options transactions such as straddles, spreads and strangles ("S/S/S"). The symbol to action screen 3-2 further includes reports itemizing any positions held in the selected financial instrument and its derivatives, including a stock report 3-16, a put report 3-18, and a call report 3-20. Each position itemized in each report has associated therewith a close tool 3-22 that may be used to request a tradescreen for closing the position, as described in detail below.

Returning to the user interface of FIG. 36, the select holding tool 2-12 of the tools frame 2-2 includes a symbol box 2-13 in which the user may enter the stock ticker of a financial instrument for which a summary report is desired. FIGS. 38-40 show three sections of a summary reports that are generated in response to operation of the select holding tool 2-12. An open positions section of the summary report is shown in FIG. 38. The open positions section includes tools presented as buttons for navigating among the sections of the summary report, including open positions tool 4-2, a closed positions tool 4-4, and a corporate actions tool 4-6. Each of the sections of the report presents these tools to facilitate navigation. The open positions section includes a holding and performance section 4-8 providing holding and performance information. A stock section 4-10 describes individual holdings in the selected stock, and provides tools 4-12, 4-14 for requesting tradescreens for opening additional positions in the stock. A puts section 4-16 describes individual holdings in puts of the selected stock, and provides tools 4-18, 4-20, 4-22 for requesting tradescreens for opening additional positions in the puts. A calls section 4-24 describes individual holdings in calls of the selected stock, and provides tools 4-26, 4-28, 4-30 for requesting tradescreens for opening additional positions in the calls. Each position in each of the sections 4-10, 4-16, 4-24 has associated therewith a close tool 4-32 for requesting a tradescreen for closing the corresponding position.

FIG. 39 shows the closed position section of the summary report. The closed position section includes navigation tools 4-2, 4-4, 4-6 and a history and performance section 4-8. The closed position section further includes a stock section 4-34 describing individual closed positions in the selected stock, a puts section 4-36 describing individual closed positions in puts of the selected stock, and a calls section 4-38 describing individual closed positions in calls of the selected stock.

FIG. 40 shows the corporate action section of the summary report. The corporate action section includes a dividends report 4-40 showing dividends declared for the selected security, a stock split report 4-42 describing stock splits for the selected security, and a mergers report 4-44 describing mergers affecting the selected security. The corporate action section also includes tools that enable the user to enter information regarding particular corporate actions, including a stock dividend editor 4-46, a cash dividend editor 4-48, a stock split editor 4-50, and a merger editor 4-52.

Returning again to the user interface of FIG. 36, the navigation frame 2-4 of the user interface provides navigation tools that control the content displayed in the display frame 2-6. A financials tool 2-14 initiates the generation of a financial reports screen 2-16. The financial reports screen 2-16 includes a financial positions report 2-18 that provides information concerning the assets, liabilities and net worth of the selected portfolio, and a financial performance report 2-20 that provides information concerning the profit/loss activity to date of the selected portfolio.

The navigation frame 2-4 also includes a portfolio tool 2-22 that initiates the display of a portfolio screen 2-24. The portfolio screen includes a portfolio report 2-26 that provides descriptive and performance information concerning each individual holding in the selected portfolio.

The navigation frame 2-4 further includes a summary tool 2-28 that initiates the display of a summary screen 2-30 providing a portfolio summary report 2-32 for the selected portfolio, showing information such as net worth, portfolio value, buying power, tax liabilities, and gains and losses.

The navigation frame 2-4 also includes a reports tool 2-34 that initiates the display of a reports menu 2-36. The reports menu 2-36 provides links to a wide variety of detailed reports for the selected portfolio. The available reports include financial reports 2-38 including a portfolio summary, financial statements, cash balance activity, investment portfolio, margin payable activity, taxes payable, cash invested activity, gains/losses, dividend/interest, commissions fees and costs, margin interest, and tax expenses. Also available are performance reports 2-40 including a portfolio summary, gains/losses, performance details, return on securities, return on cash invested, and commission analysis. The available reports further include equity reports 2-42 such as a portfolio summary, short cash restricted/margin requirements, long margin available margin requirements, and equity maintenance and buying power. The available reports also include tax reports 2-44 such as a portfolio summary taxes payable, tax expenses, wash sales warnings, wash sales status, and a Schedule D report. Examples of these reports are described further in U.S. Pat. No. 7,165,044, entitled Investment Portfolio Tracking System and Method, the entirety of which is incorporated herein by references for its teachings regarding report generation and types of reports.

The navigation frame 2-4 further includes a cash transactions tool 2-46 that initiates the display of a cash transactions screen 2-48. The cash transactions screen 2-48 includes a transactions editor 2-50 that enables the user to enter information concerning a wide variety of portfolio related cash transactions including cash deposit, cash withdrawal, cash withdrawal for federal taxes, cash withdrawal for state taxes, cash interest earned, margin interest borrowed, margin interest paid, margin borrowed, margin paid, and management fees. The transactions screen further includes a transactions report 2-52 detailing all transactions recorded for the selected portfolio.

The navigation frame 2-4 further includes an administration tool 2-54 that initiates display of an administration menu 2-56. The administration menu 2-56 include a member information administration tool 2-58 that initiates a member information editor, a portfolio information administration tool 2-60 that initiates a portfolio information editor, and an add portfolio tool 2-62.

The system of the preferred embodiment enables the user to request and receive tradescreens for calculating the effects of hypothetical opening transactions and for initiating hypothetical opening transactions through the symbol to action screen illustrated in FIG. 37. In particular, the symbol to action screen links the user to tradescreens for opening long or short positions in the selected security, as well as links to put and call options screens for the selected security. The put and call options screens in turn provide links to tradescreens for opening long, short, and covered short positions in puts or calls for the selected security. The security summary screen of FIG. 38 also links the user to a tradescreen for opening long and short positions in the selected security.

Figure 41:
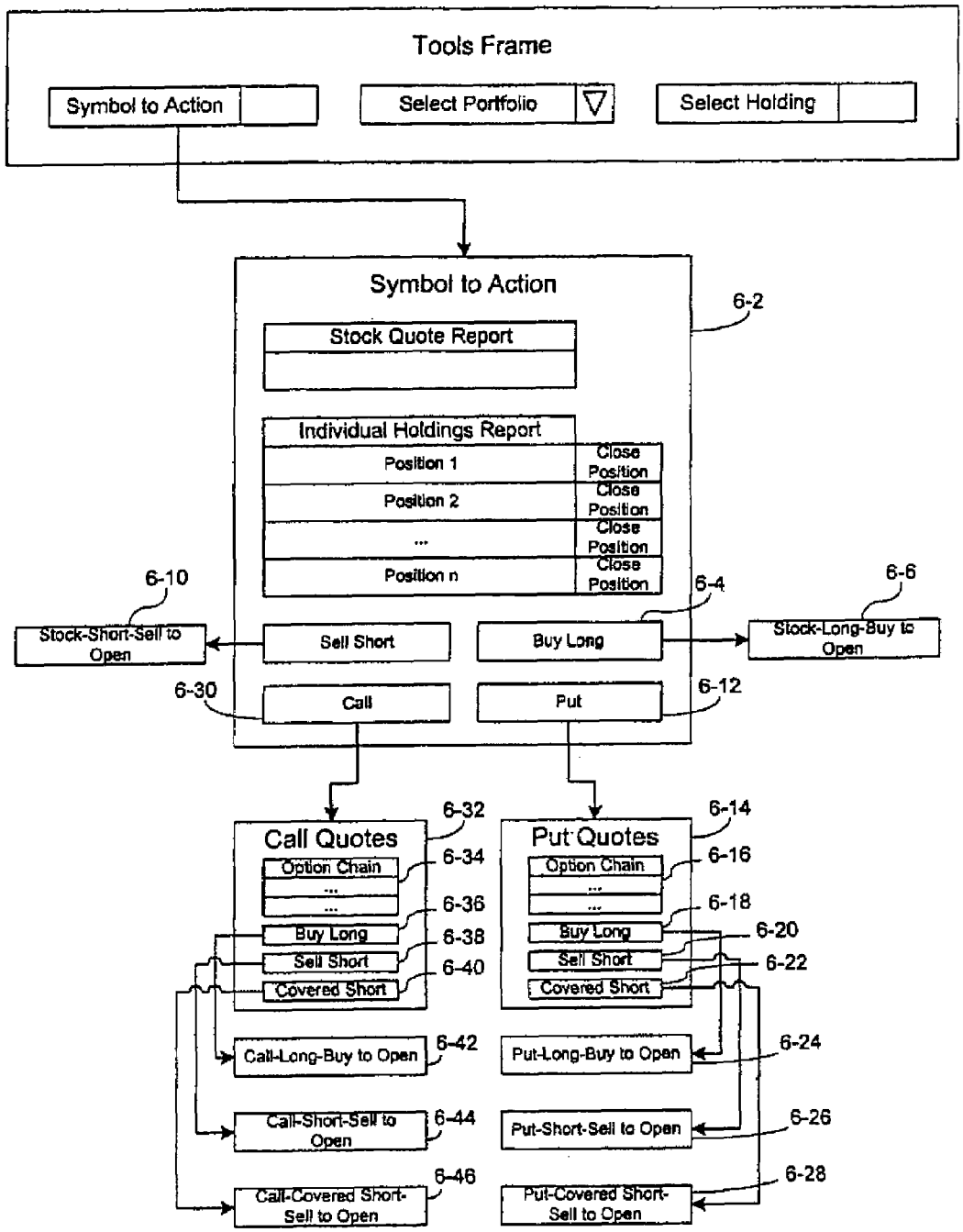
FIGS. 41 and 42 show an organization of screens and tradescreens for transactions for opening positions in accordance with the preferred embodiment.
Figure 42:
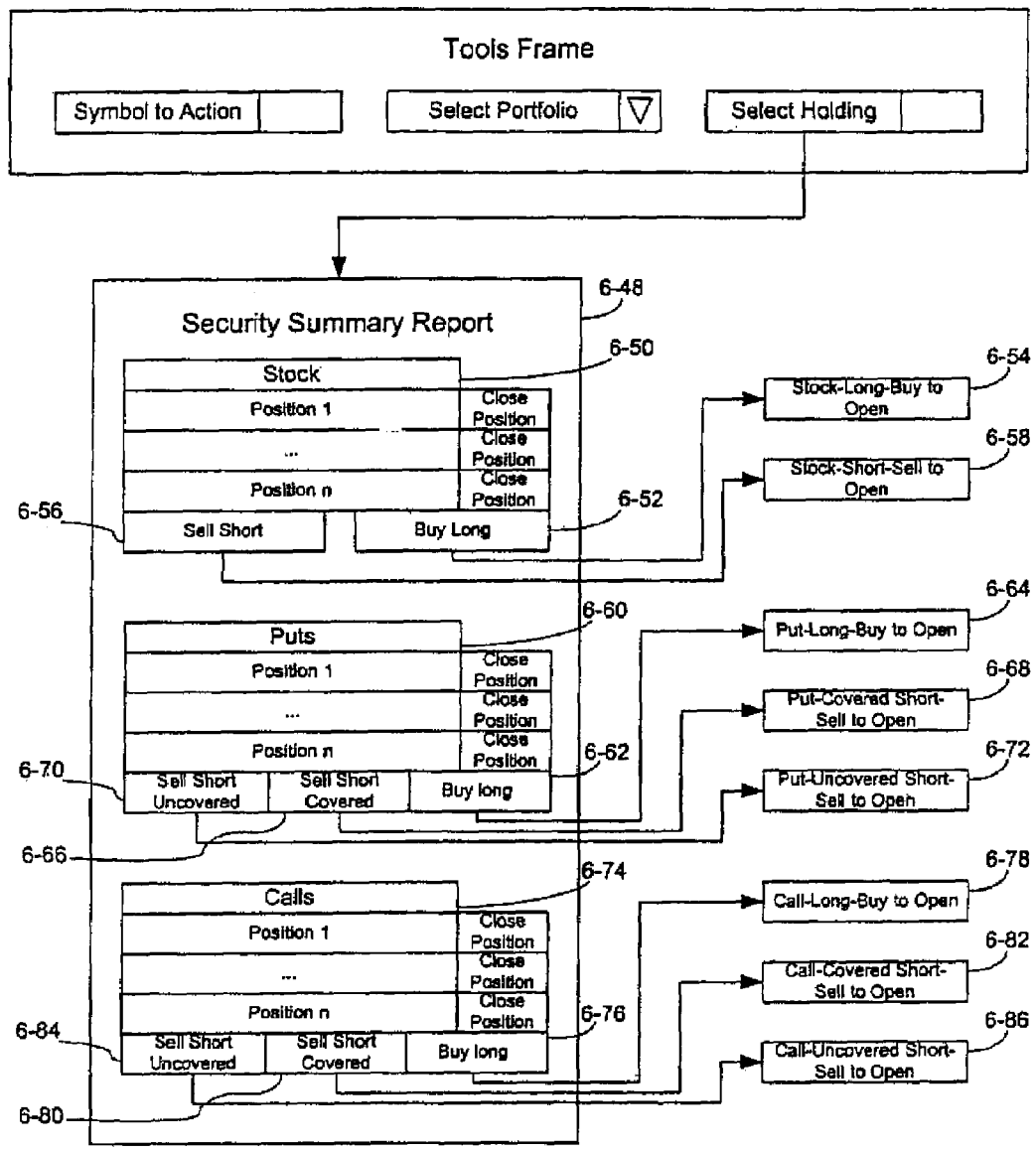

The organization of opening transaction tradescreens is illustrated in FIGS. 41 and 42. FIG. 41 shows ways of requesting tradescreens for opening positions from the symbol to action screen. As shown in FIG. 41, the symbol to action screen 6-2 for a given security includes a link 6-4 to a screen 6-6 including a tradescreen for a hypothetical purchase of the security to open a long position in the security. Operation of the link issues a request to the server for a dynamically configured tradescreen for opening a long position in the selected security for the selected portfolio. The symbol to action screen also includes a link 6-8 to a screen 6-10 including a tradescreen for a hypothetical short sale of the security to open a short position in the security. Operation of the link issues a request to the server for a dynamically configured tradescreen for opening a short position in the selected security for the selected portfolio.

The symbol to action screen also includes links to further screens for options in the selected security. A put link 6-12 provides a link to a put option quotes screen 6-14 that provides a put options chain report 6-16 for the security, and links 6-18, 6-20, 6-22 that issue requests for screens including tradescreens for opening long 6-24, short 6-26, and covered short 6-28 positions in a selected option from the put option chain. Similarly, a call link 6-30 provides a link to a call option quotes screen 6-32 that provides a call options chain report 6-34 for the security, and links 6-36, 6-38, 6-40 that issue requests for screens including tradescreens for opening long 6-42, short 6-44, and covered short 6-46 positions in a selected option from the call option chain.

FIG. 42 shows ways of requesting tradescreens for opening positions from the security summary report. As shown in FIG. 42, a stock section 6-50 of the security summary report 6-48 includes a buy long tool 6-52 that issues a request for a stock long buy to open tradescreen 6-54, and a sell short tool 6-56 that issues a request for stock short sell to open tradescreen 6-58. A puts section 6-60 of the security summary report includes a buy long tool 6-62 that issues a request for a put long buy to open tradescreen 6-64, a sell short covered tool 6-66 that issues a request for put covered short sell to open tradescreen 6-68, and a sell short uncovered tool 6-70 that issues a request for put covered short sell to open tradescreen 6-72. A calls section 6-74 of the security summary report includes a buy long tool 6-76 that issues a request for a call long buy to open tradescreen 6-78, a sell short covered tool 6-80 that issues a request for call covered short sell to open tradescreen 6-82, and a sell short uncovered tool 6-84 that issues a request for call covered short sell to open tradescreen 6-86.

The system of the preferred embodiment also enables the user to request and receive tradescreens for closing transactions through several mechanisms. The open positions report in the symbol to action screen lists all positions held in the selected portfolio and provides a close link for with each position that requests a tradescreen for closing the position. Similarly, by operating the select holding tool of the user interface tools frame, the user is presented with an open positions screen that lists all individual positions held in the selected security. A close link associated with each position requests a tradescreen for closing the position. In addition, by operating the summary tool in the navigation frame of the user interface, the user is presented with a portfolio summary screen including a portfolio holdings report. A close link associated with each position listed in the holding report links to a screen including a tradescreen for an appropriate closing transaction for that position.

Figure 43:
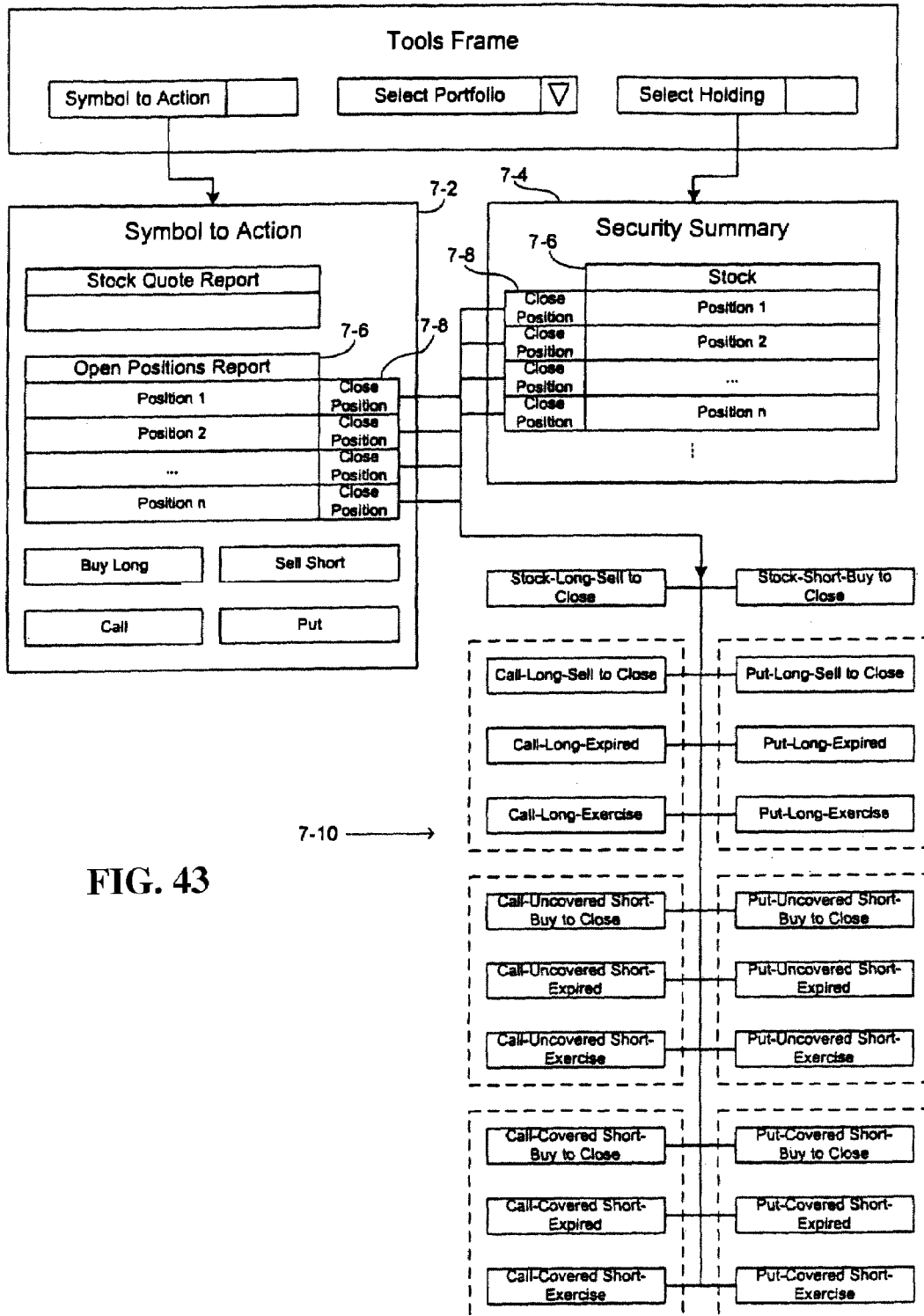
FIGS. 43 and 44 show an organization of screens and tradescreens for transactions for closing positions in accordance with the preferred embodiment.
Figure 44:
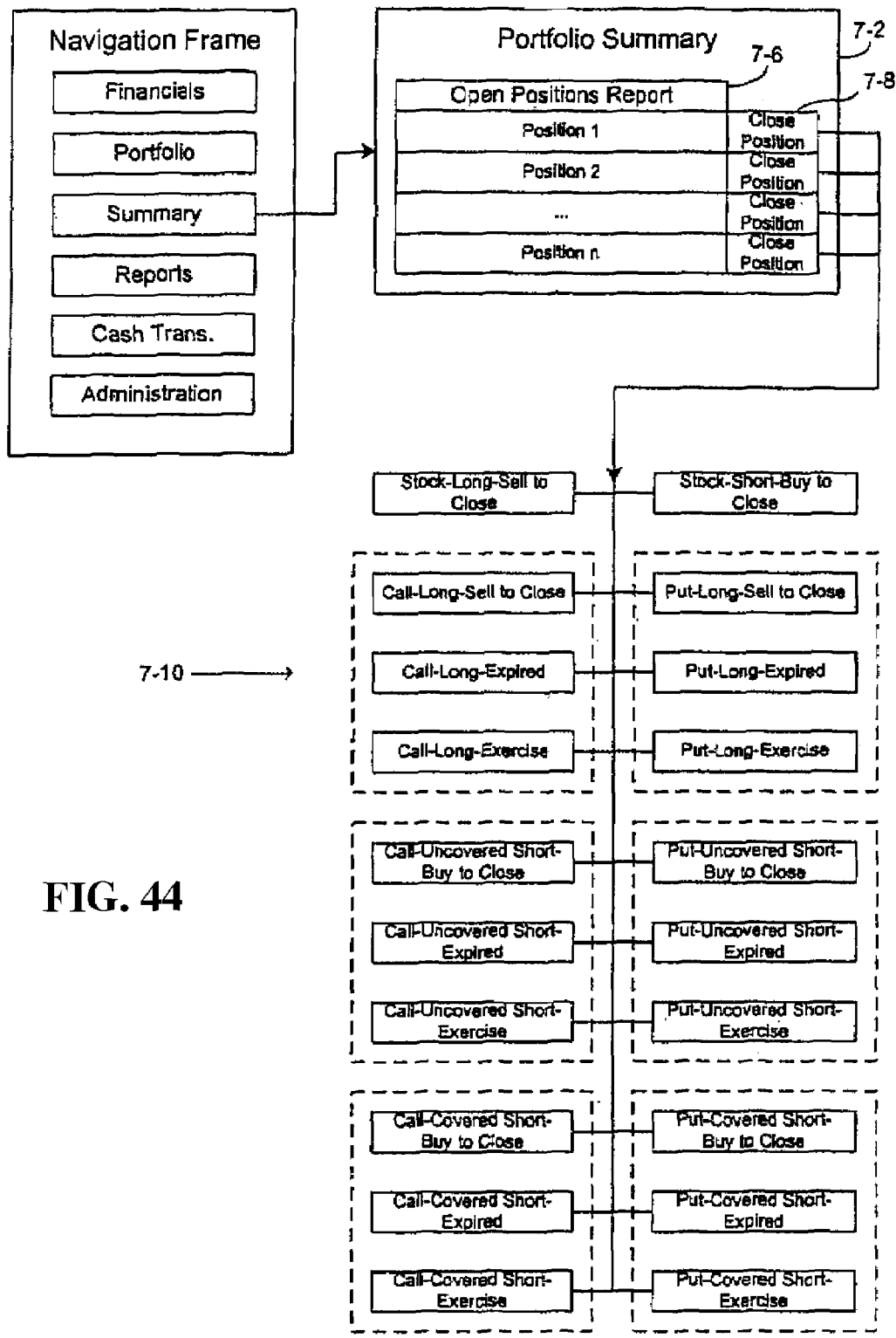

The organization of closing transaction tradescreens is illustrated in FIGS. 43 and 44. FIG. 43 shows the symbol to action screen 7-2 and the security summary screen 7-4 that may be accessed by operating tools of the tools frame. Each of these screens includes one or more reports 7-6 showing open positions, and each position included each report 7-6 has associated with it a close link 7-8. The close links 7-8 issue requests for a screen 7-10 containing an appropriate tradescreen for a trade or transfer to close the position. Similarly, as shown in FIG. 44, a user may access a portfolio summary screen 7-12 for a selected portfolio through operation of the summary tool in the navigation frame of the user interface. The portfolio summary screen includes a portfolio holdings report 7-14 that includes descriptions of each position held in the portfolio. Each position has associated with it a close link 7-8 that issues a request for a screen 7-10 containing an appropriate tradescreen for a closing transaction for the position.

In the case of a long or short position in a security, a single close link is associated with that position since there is only one manner of closing those types of positions. In the case of options in the selected security, three distinct close links may be provided for closing the position through an appropriate offsetting transaction (i.e. a purchase or sale), through exercising the option, and through expiration of the option.

Figure 45:
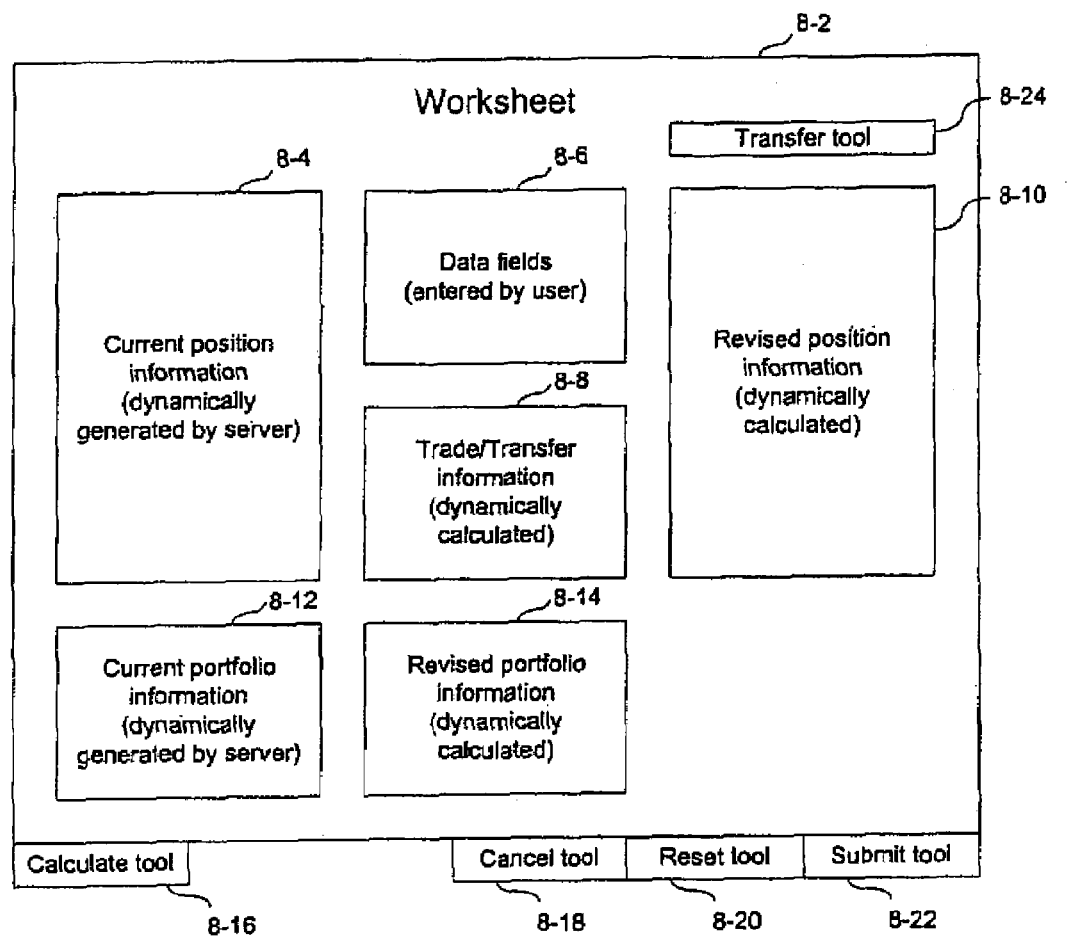
FIG. 45 shows the generic model for tradescreens in accordance with the preferred embodiment.

FIG. 45 shows a generic model for tradescreens in accordance with the preferred embodiment. The generic layout of information display and entry fields shown in FIG. 45 approximates the actual layout of specific display and entry fields in the actual tradescreens of the preferred embodiment discussed below. The information content of each tradescreen depends on the type of financial instrument and the action to be taken.

The tradescreen 8-2 includes current position information 8-4 reflecting the current positions (if any) in a selected security or option that are held in a selected portfolio. This information is dynamically generated by the server using data from the portfolio database for the selected portfolio. The tradescreen further includes fields 8-6 into which the user is enabled to enter data characterizing the parameters of a hypothetical trade or transfer, such as a number of shares. Using the entered data, the current position information, and other information previously set up for the portfolio, routines embedded in the tradescreen calculate additional trade or transfer information 8-8, such as cash invested. The tradescreen also calculates revised position information 8-10 that shows revised values for the quantities displayed in the current position information that reflect changes that will occur if the trade or transfer is executed. The typical user will find this information very useful because it quickly provides an analysis of the effects of a trade or transfer on the overall holdings of the security or option before the trade or transfer is submitted for execution.

The tradescreen also includes current portfolio information 8-12 reflecting the overall financial position of the portfolio as a whole. This information is dynamically generated by the server using data from the general ledger for the selected portfolio. Examples of current portfolio information are current buying power and cash available. Using the current portfolio information 8-12, the data 8-6 entered by the user, and other information previously set up for the portfolio, the routines embedded in the tradescreen calculate revised portfolio information 8-14 that shows revised values for the quantities displayed in the current portfolio information reflecting changes that will occur if the hypothetical trade or transfer is executed. The typical user will find this information very useful because it quickly provides an analysis of the effects of a trade or transfer on the portfolio as a whole before the trade or transfer is executed.

The generic tradescreen 8-2 also contains several user operated tools. A calculate tool 8-16 causes all calculable quantities in the tradescreen to be recalculated based on currently entered transaction data. A cancel tool 8-18 cancels the current tradescreen. A reset tool 8-20 resets all entered values in the tradescreen. A submit tool 8-22 submits the trade or transfer for execution based on the quantities currently entered in the tradescreen.

A transfer tool 8-24 is also provided. The transfer tool 8-24 is used to indicate whether the action to be taken is a trade or a transfer into or out of the portfolio. When the transfer tool 8-24 has been used to indicate a transfer, the operation of the submit tool 8-22 causes the general ledger and portfolio database for the selected portfolio to be updated in the server, but no trade is submitted for execution.

A tradescreen provided to a user for opening a long position in a security is illustrated in FIG. 46. The gray boxes of FIG. 46 are fields in which data may be entered by the user. An Excel implementation of the routines embedded in the tradescreen of FIG. 46 is illustrated in FIG. 9b. The fields of the tradescreen of FIG. 46 are provided with cell references for purposes of correlation with FIG. 9b. General ledger debit and credit entries for the trade illustrated in FIG. 46 and for a transfer using the same numbers are shown in FIG. 9c. A version of the tradescreen for a transfer using the same numbers is illustrated in FIG. 47.

The tradescreen of FIG. 46 presents current position information for the selected security in the column headed "Open Positions." This information is dynamically generated by the server using data stored in the portfolio database for the selected portfolio. The current position information includes the date (or date range) of the opening of existing positions in the selected security (G7), price per share (G9), number of shares (G11), commissions paid (G13), other costs (G15), bought settlement (G17), margin borrowed (G19), and margin borrowed % (G21). The tradescreen also presents current information for the portfolio as a whole under the heading "Before." This information includes current buying power (G29), cash available (G31), equity utilized (G33), margin available (G35) and margin payable (G37).

The tradescreen also includes fields for entering data characterizing a trade. The fields for entering trade data are provided under the heading "Buy." They include fields for the trade date (I7), price per share (I9), number of shares (I11), commissions paid (I13), other costs (I15), margin borrowed (I19). The tradescreen also includes a margin available % field (D3) for entering a maximum percentage eligible to be paid for on margin. In accordance with current federal regulations, this amount cannot exceed 50%. A maintenance requirement may be entered in the "Maintenance Requirement %" field (H3). Currently, regulations require this amount to be in the range of 25 to 100.

Using the information entered in the aforementioned fields, the tradescreen calculates revised portfolio information and revised holdings information reflecting changes that will occur if the hypothetical trade is executed. Information representing the final state of the trade is included under the "Buy" column, including margin borrowed % (I19), cash disbursed/invested (I23), and cash required (I25). Revised information representing the state of the portfolio after the hypothetical trade is presented under the heading "After" and includes current buying power (I29), cash available (I31), equity utilized (I33), margin available (I35) and margin payable (I37). Revised information representing the state of the user's holdings in the selected security after the hypothetical trade is presented under the heading "Average/Total" and includes average price per share (K9), number of shares (K11), total commissions paid (K13), total other costs (K15), and total bought settlement (K17).

In the preferred embodiment, the quantities calculated by the tradescreen are calculated automatically upon entering data into the "Buy" fields I7, I9, I11, I13 and then tabbing out of field I15. The quantities are recalculated upon entering a value into and tabbing out of the margin borrowed field I19. In addition, a calculate tool is provided at the bottom of the tradescreen (C39) to enable the user to recalculate the tradescreen upon changing of any of the entered data. The tradescreen also includes a cancel tool (G39) for canceling the tradescreen and a reset tool (I39) for resetting all of the data fields.

The tradescreen of FIG. 46 further includes a submit tool (K39) that submits a trade request for execution in accordance with the entered data. Thus the user may vary the trade data entered into the tradescreen and view the effects on the portfolio and positions held in the security, and then submit a trade request once appropriate parameters for the trade have been determined.

The tradescreen also includes a transfer in field (L3) for indicating that the entered data reflects parameters of a transfer in rather than a trade. A version of the tradescreen that is produced for transfer in is shown in FIG. 47. As seen in FIG. 47, the rows 19 and 21 (margin borrowed and margin borrowed %) are eliminated from the tradescreen, the "Buy" column is captioned as "Transfer In," and operation of the submit tool (K39) causes the data entered into the tradescreen to be transmitted to the server for entry in the general ledger and the portfolio database, but does not initiate a trade.

A tradescreen provided to a user for closing a long position in a security is illustrated in FIG. 48. The gray boxes of FIG. 48 are fields in which data may be entered by the user. A version of the tradescreen for the case where the position is being transferred out is shown in FIG. 49.

The tradescreen of FIG. 48 presents current position information for the selected security in the column headed "Bought." This information is dynamically generated by the server using data stored in the portfolio database for the selected portfolio. The current position information includes the date (or date range) of the opening of existing positions in the selected security (H7), price per share (H9), number of shares (H11), commissions paid (H13), other costs (H15), and bought settlement (H17). The tradescreen also presents current portfolio information under the heading "Before." This information includes current buying power (H35), cash available (H37), equity utilized (H39), margin available (H41) and margin payable (H43).

The tradescreen also includes fields for entering trade data characterizing a trade. The fields for entering trade data characterizing a trade are provided under the heading "Sell." They include fields for the trade date (J7), price per share (J9), number of shares (J11), commissions paid (J13), and other costs (J15).

Using the information entered in the aforementioned fields, the tradescreen calculates revised portfolio information and revised position information reflecting changes that will occur if a trade represented by the entered data is effected. This information is included under the "Before Taxes" and "After Taxes" columns, including net gain/(loss) (J21), (L21), net gain/(loss) percentage (J23), (L23), and net annualized return (CAGR) (J25), (L25). The "Before Taxes" column also presents net sold receipts (J27) and cash deposited (J31). The tradescreen also calculates bought settlement. Revised information representing the state of the portfolio after the hypothetical transaction is presented under the heading "After" and includes current buying power (J35), cash available (J37), equity utilized (J39), margin available (J41) and margin payable (J43). Revised information representing the state of the user's holdings in the selected security after the hypothetical trade is presented under the heading "Difference/Total" and includes days held (L7), difference in price per share (L9), difference in number of shares (L11), total commissions paid (L13), total other costs (L15), and difference in bought settlement (L17).

In the preferred embodiment, the quantities calculated by the tradescreen are calculated automatically upon entering data into the "Sell" fields J7, J9, J11, J13 and J15 and then tabbing out of field J15. The quantities are recalculated upon entering a value into and tabbing out of the margin paid field J29. In addition, a calculate tool is provided at the bottom of the tradescreen (D45) to enable the user to recalculate the tradescreen upon changing of any of the entered data. The tradescreen also includes a cancel tool (H45) for canceling the tradescreen and a reset tool (J45) for resetting all of the transaction data fields.

The tradescreen of FIG. 48 further includes a submit tool (L45) that submits the hypothetical trade for execution using the entered data. Thus the user may vary the trade data entered into the tradescreen and view the effects on the portfolio and positions held in the security, and then submit enter a trade once the appropriate parameters for the trade have been determined.

The tradescreen also includes a transfer out field (M3) for indicating that the entered information reflects a transfer out rather than a transaction. A version of the tradescreen that is produced for transfer out is shown in FIG. 49. When this field is marked, the rows 21, 23 and 25 (net gain/(loss), net gain/(loss) %, and net annualized return) are eliminated from the tradescreen, the "Sell" column is captioned as "Transfer Out," and operation of the submit tool (L45) causes the data entered into the tradescreen to be transmitted to the server for entry in the general ledger and portfolio database to execute the transfer, but does not submit a trade for execution.

A tradescreen provided to a user for opening a short position in a security is illustrated in FIG. 50. The gray boxes of FIG. 50 are fields in which data may be entered by the user. A version of the tradescreen for the case where the position is being transferred in is shown in FIG. 51.

The tradescreen of FIG. 50 presents current open position information for the selected security in the column headed "Open Positions." This information is dynamically generated by the server using data stored in the portfolio database for the selected portfolio. The open position information includes the date (or date range) of the opening of existing positions in the selected security (G7), price per share (G9), number of shares (G11), commissions paid (G13), other costs (G15), gross sold receipts (G17), cash disbursed (G19), and net sold receipts (G21). The tradescreen also presents current information for the portfolio as a whole under the heading "Before." This information includes current buying power (G27), cash available (G29), equity utilized (G31), margin available (G33) and margin payable (G35).

The tradescreen also includes fields for entering data characterizing a hypothetical trade. Based on the entered information, the tradescreen calculates the effects of the hypothetical trade on the overall holdings of the security, and on the portfolio as a whole. The fields for entering trade data are provided under the heading "Sell." They include fields for the trade date (I7), price per share (I9), number of shares (I11), commissions paid (I13), and other costs (I15). The tradescreen also includes an equity utilized % field (D3) for entering the initial equity maintenance requirement percentage. In accordance with federal regulations, this amount cannot be less than 50%. A maintenance requirement may be entered in the "Maintenance %" field (H3). Current regulations require this amount be in the range of 30 to 100.

Using the information entered in the aforementioned fields, the tradescreen calculates revised portfolio information and revised holdings information reflecting changes that will occur if the trade is executed. Information representing the final state of the trade is included under the "Sell" column, including gross sold receipts (I17), cash disbursed (I19), and net sold receipts (I21), cash restricted (I21), and equity utilized/required (I23). Revised information representing the state of the portfolio after the trade is presented under the heading "After" and includes current buying power (I27), cash available (I29), equity utilized (I31), margin available (I33) and margin payable (I35). Revised information representing the state of the user's holdings in the selected security after the trade is presented under the heading "Average/Total" and includes average price per share (K9), total number of shares (K11), total commissions paid (K13), total other costs (K15), total gross sold receipts (K17), total cash disbursed (K19), and total net sold receipts (K21).

In the preferred embodiment, the quantities calculated by the tradescreen are calculated automatically upon entering data into the "Sell" fields I7, I9, I11, I13 and I15 and tabbing out of field I15. In addition, a calculate tool is provided at the bottom of the tradescreen (C37) to enable the user to recalculate the tradescreen upon changing of any of the entered data. The tradescreen also includes a cancel tool (G37) for canceling the tradescreen and a reset tool (I37) for resetting all of the fields.

The tradescreen of FIG. 50 further includes a submit tool (K37) that submits the hypothetical trade for execution in accordance with the entered data. Thus the user may vary the trade data entered into the tradescreen and view the effects on the portfolio and positions held in the security, and then submit a trade once the appropriate parameters for the trade have been determined.

The tradescreen also includes a transfer in field (L3) for indicating that the transaction data reflect parameters of a transfer in rather than a trade. A version of the tradescreen that is produced for transfer is shown in FIG. 51. When this field is marked, the "Sell" column is captioned as "Transfer In," and operation of the submit tool (K37) causes the data entered into the tradescreen to be transmitted to the server for entry in the general ledger and the portfolio database, but does not initiate a trade.

A tradescreen provided to a user for closing a short position in a security is illustrated in FIG. 52. The gray boxes of FIG. 52 are fields in which data may be entered by the user. A version of the tradescreen for the case where the position is being transferred out is shown in FIG. 53.

The tradescreen of FIG. 52 presents current sold security information for the selected security in the column headed "Sold." This information is dynamically generated by the server using data stored in the portfolio database for the selected portfolio. The sold security information includes the date (or date range) of the opening of existing positions in the selected security (H7), price per share (H9), number of shares (H11), commissions paid (H13), other costs (H15), and net sold receipts (H17). The tradescreen also presents current information for the portfolio as a whole under the heading "Before." This information includes current buying power (H39), cash available (H41), equity utilized (H43), margin available (H45) and margin payable (H47). The tradescreen also includes fields for entering trade data characterizing a hypothetical trade. Based on the entered information, the tradescreen calculates the effects of the hypothetical trade on the overall holdings of the security and on the portfolio as a whole. The fields for entering trade data are provided under the heading "Buy." They include fields for the trade date (J7), price per share (J9), number of shares (J11), commissions paid (J13), other costs (J15), and margin borrowed (J33). Using the information entered in the aforementioned fields, the tradescreen calculates revised portfolio information and revised holdings information reflecting changes that will occur if the hypothetical trade is executed. Information representing the final state of the trade is included under the "Before Taxes" and "After Taxes" columns, including net gain/(loss) (J21), (L21), net gain/(loss) percentage (J23), (L23), net annualized return (CAGR) (J25), (L25). The "Before Taxes" column also presents bought settlement (J27) and cash disbursed (J35). Revised information representing the state of the portfolio after the hypothetical trade is presented under the heading "After" and includes current buying power (J39), cash available (J41), equity utilized (J43), margin available (J45) and margin payable (J47). Revised information representing the state of the user's holdings in the selected security after the hypothetical trade is presented under the heading "Difference/Total" and includes days held (L7), difference in price per share (L9), difference in number of shares (L11), total commissions paid (L13), total other costs (L15), and net allocated basis (L17). The routines for calculating these quantities are shown in corresponding fields in FIG. 12b. In the preferred embodiment, the quantities calculated by the tradescreen are calculated automatically upon entering data into the "Buy" fields J7, J9, J11, J13 and J15 and then tabbing out of field J15. The quantities are recalculated upon entering a value into and tabbing out of the margin borrowed field (J33). In addition, a calculate tool is provided at the bottom of the tradescreen (C49) to enable the user to recalculate the tradescreen upon changing of any of the entered data. The tradescreen also includes a cancel tool (H49) for canceling the tradescreen and a reset tool (J49) for resetting all of the fields.

The tradescreen of FIG. 52 further includes a submit tool (L49) that submits the hypothetical trade for execution in accordance with the entered data. Thus the user may vary the trade data entered into the tradescreen and view the effects on the portfolio and positions held in the security, and then submit the trade once the appropriate parameters for the trade have been determined.

The tradescreen also includes a transfer out field (M3) for indicating that the entered information reflects a transfer out rather than a trade. A version of the tradescreen that is produced for transfer out is shown in FIG. 53. When this field is marked, the rows 19, 21, 23, 25, 27, 29 and 31 (before taxes/after taxes, net gain/(loss), net gain/(loss) %, net annualized return, bought settlement, cash restricted/released, cash available and margin borrowed) are eliminated from the tradescreen, the "Buy" column is captioned as "Transfer Out," and operation of the submit tool (L49) causes the data entered into the tradescreen to be transmitted to the server for entry in the general ledger and portfolio database, but does not initiate a trade. A tradescreen provided to a user for opening a long position in a put option is illustrated in FIG. 54. The gray boxes of FIG. 54 are fields in which data may be entered by the user. A version of the tradescreen for the case where the position is being transferred in is shown in FIG. 55. The tradescreen of FIG. 54 presents current open position information for the selected put option in the column headed "Open Positions." This information is dynamically generated by the server using data stored in the portfolio database for the selected portfolio. The open position information includes the date (or date range) of the opening of existing positions in the selected put (G9), price per contract (G11), number of contracts (G13), commissions paid (G15), other costs (G17), and bought settlement (G19). The tradescreen also presents current information for the portfolio as a whole under the heading "Before." This information includes current buying power (G31), cash available (G33), equity utilized (G35), margin available (G37) and margin payable (G39).

The tradescreen also includes fields for entering data characterizing a hypothetical trade. Based on the entered information, the tradescreen calculates the effects of the hypothetical trade on the overall holdings of the put, and on the portfolio as a whole. The fields for entering trade data are provided under the heading "Buy." They include fields for the trade date (I9), price per contract (I11), number of contracts (I13), commissions paid (I15), other costs (I17), and margin borrowed (I21). The tradescreen also includes a strike price field (E5) for entering the strike price of the put, and an expiration month field (H5).

Using the information entered in the aforementioned fields, the tradescreen calculates revised portfolio information and revised holdings information reflecting changes that will occur if the hypothetical trade is executed. Information representing the final state of the trade is included under the "Buy" column, including bought settlement (I19), margin borrowed % (I21), cash disbursed/invested (I25), and cash required (I27). The tradescreen also calculates days to expiration of the put (L5). Revised information representing the state of the portfolio after execution of the hypothetical trade is presented under the heading "After" and includes current buying power (I31), cash available (I33), equity utilized (I35), margin available (I37) and margin payable (I39). Revised information representing the state of the user's holdings in the selected put after execution of the hypothetical trade is presented under the heading "Average/Total" and includes average price per contract (K11), number of contracts (K13), total commissions paid (K15), total other costs (K17), and total bought settlement (K19). The routines for calculating these quantities are shown in corresponding fields in FIG. 13b.

In the preferred embodiment, the quantities calculated by the tradescreen are calculated automatically upon entering data into the "Buy" fields I9, I11, I13, I15 and I17 and then tabbing out of field I17. The quantities are recalculated upon entering a value into and tabbing out of the margin borrowed field I21. In addition, a calculate tool is provided at the bottom of the tradescreen (C41) to enable the user to recalculate the tradescreen upon changing of any of the entered data. The tradescreen also includes a cancel tool (G41) for canceling the tradescreen and a reset tool (I41) for resetting all of the data fields.

The tradescreen of FIG. 54 further includes a submit tool (K41) that submits the hypothetical trade for execution using the entered trade data. Thus the user may vary the trade data entered into the tradescreen and view the effects on the portfolio and positions held in the security, and then submit a trade once the appropriate parameters for the trade have been determined.

The tradescreen also includes a transfer in field (L3) for indicating that the entered data reflect parameters of a transfer in rather than a trade. A version of the tradescreen that is produced for transfer in is shown in FIG. 55. When this field is marked, the rows 21 and 23 (margin borrowed and margin borrowed %) are eliminated from the tradescreen, the "Buy" column is captioned as "Transfer In," and operation of the submit tool (K41) causes the data entered into the tradescreen to be transmitted to the server for entry in the general ledger and the portfolio database, but does not initiate a trade.

Positions in options may be closed by making an offsetting transaction, by exercising the option, or by expiration of the option. The preferred embodiment of the invention provides tradescreens for each of these alternatives. A tradescreen provided to a user for closing a long position in a put through an offsetting transaction is illustrated in FIG. 56. The gray boxes of FIG. 56 are fields in which data may be entered by the user. A version of the tradescreen for the case where the position is being transferred out is shown in FIG. 57. The tradescreen of FIG. 56 presents current information for previously bought puts of the selected type in the column headed "Bought." This information is dynamically generated by the server using data stored in the portfolio database for the selected portfolio. The bought security information includes the date (or date range) of the opening of existing positions in the selected put (H9), price per contract (H11), number of contracts (H13), commissions paid (H15), other costs (H17), and bought settlement (H19). The tradescreen also presents current information for the portfolio as a whole under the heading "Before." This information includes current buying power (H37), cash available (H39), equity utilized (H41), margin available (H43) and margin payable (H45). The tradescreen also displays the strike price (E5) and expiration month (H5) of the put and calculates days until expiration (L5). The tradescreen also includes fields for entering data characterizing a hypothetical trade. Based on the entered information, the tradescreen calculates the effects of execution of the hypothetical trade on the overall holdings of the security and on the portfolio as a whole. The fields for entering data characterizing a hypothetical trade are provided under the heading "Sell." They include fields for the trade date (J9), price per contract (J11), number of contracts (J13), commissions paid (J15), and other costs (J17).

Using the information entered in the aforementioned fields, the tradescreen calculates revised portfolio information and revised holdings information reflecting changes that will occur if the hypothetical trade is executed. Information representing the final state of the trade is included under the "Before Taxes" and "After Taxes" columns, including net gain/(loss) (J23), (L23), net gain/(loss) percentage (J25), (L25), and net annualized return (CAGR) (J27), (L27). The "Before Taxes" column also presents sold net receipts (J29), and cash deposited (J33). Revised information representing the state of the portfolio after execution of the hypothetical trade is presented under the heading "After" and includes current buying power (J37), cash available (J39), equity utilized (J41), margin available (J43) and margin payable (J45). Revised information representing the state of the user's holdings in the selected security after execution of the hypothetical trade is presented under the heading "Difference/Total" and includes days held (L9), difference in price per contract (L11), difference in number of contracts (L13), total commissions paid (L15), total other costs (L17), and difference in bought settlement (L19). In the preferred embodiment, the quantities calculated by the tradescreen are calculated automatically upon entering data into the "Sell" fields J9, J11, J13, J15 and J17 and then tabbing out of field J17. The quantities are recalculated upon entering a value into and tabbing out of the margin paid field J31. In addition, a calculate tool is at the bottom of the tradescreen (D47) to enable the user to recalculate the tradescreen upon changing any of the entered data. The tradescreen also includes a cancel tool (H47) for canceling the tradescreen and a reset tool (J47) for resetting all of the data fields.

The tradescreen of FIG. 56 further includes a submit tool (L47) that submits the hypothetical trade for execution using the entered trade data. Thus the user may vary the trade data entered into the tradescreen and view the effects on the portfolio and positions held in the security, and then submit a trade once the appropriate parameters for the trade have been determined.

The tradescreen also includes a transfer out field (M3) for indicating that the entered information reflects a transfer out rather than a trade. A version of the tradescreen that is produced for transfer out is shown in FIG. 57. When this field is marked, the rows 21, 23, 25, 27, 29, 31 and 33 (before taxes/after taxes, net gain/(loss), net gain/(loss) %, net annualized return, sold net receipts, margin paid, and cash deposited) are eliminated from the tradescreen, the "Sell" column is captioned as "Transfer Out," and operation of the submit tool (L47) causes the data entered into the tradescreen to be transmitted to the server for entry in the general ledger and portfolio database, but does not initiate a trade.

Figure 58:
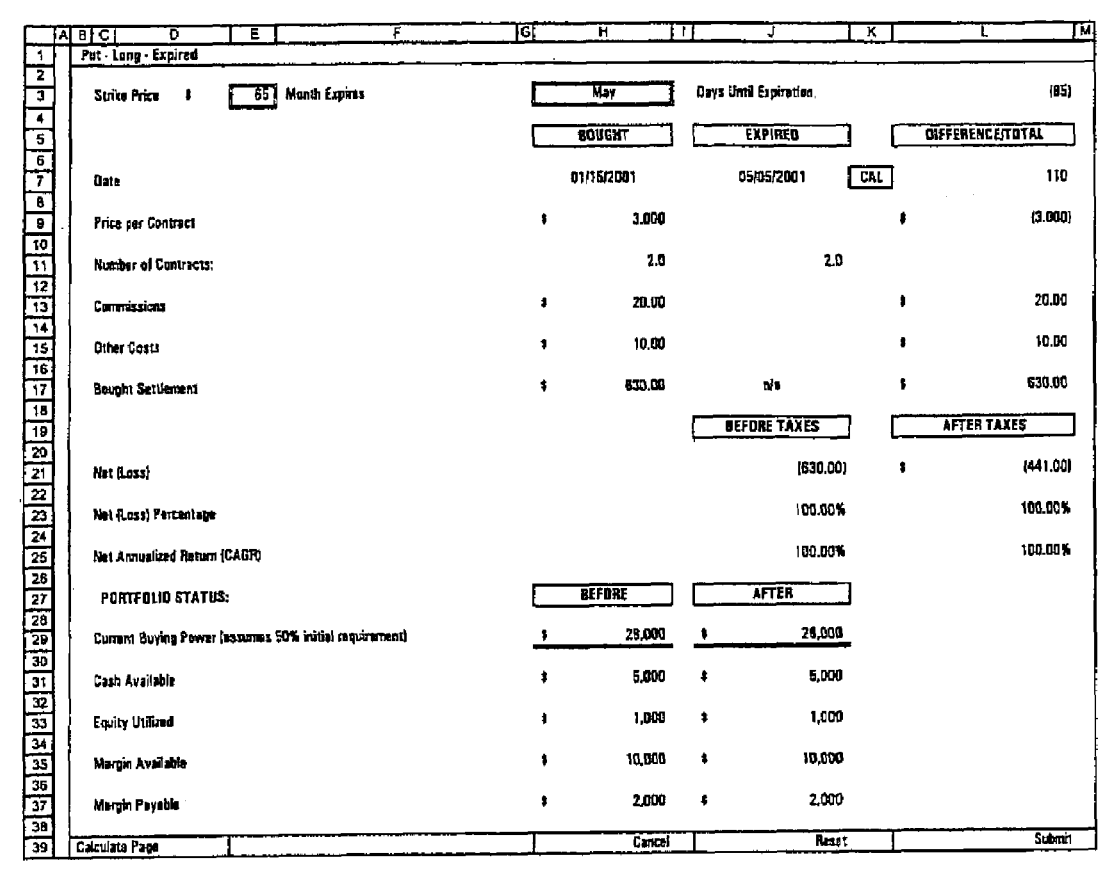

FIG. 58 shows a tradescreen for closing a long position in a put by exercising the put.

There are a number of notable differences between the exercise tradescreen of FIG. 58 and the offsetting transaction tradescreen of FIG. 56. Rather than showing the bought and sold price for the contract, the tradescreen of FIG. 58 shows the current price per share (H11) and the strike price of the put (J11). Similarly, rather than showing contracts bought and entering contracts sold, the tradescreen shows contracts open (H13) and has a field for entering contracts to be exercised (J13). The tradescreen also shows the number of shares represented by the open contracts (H15) and calculates the number of shares represented by the contracts to be exercised (J15). The tradescreen also calculates a net gain/loss on the option (J23) and a net gain/loss on the underlying security (J25).

FIG. 59 shows a tradescreen for closing a long position in a put through expiration of the put.

Figure 61:
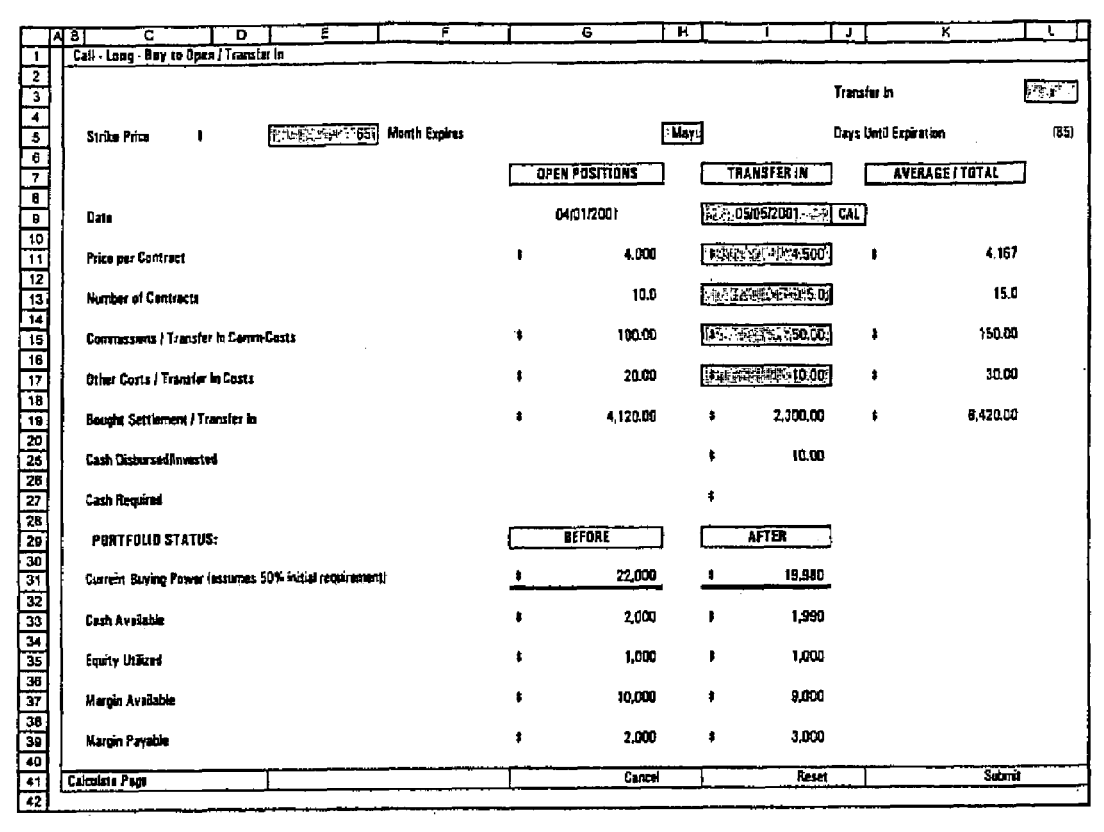

There are a number of notable differences between the expiration tradescreen of FIG. 59 and the offsetting transaction tradescreen of FIG. 56. Most notably, the expiration tradescreen does not have fields for entering information, since the fact of the expiration is the only new information needed to determine the effect of this occurrence using information previously recorded when the position was entered or transferred in to the portfolio. Also, the expiration tradescreen does not calculate quantities for sold net receipts, margin paid, or cash deposited. A tradescreen provided to a user for opening a long position in a call option is illustrated in FIG. 60. A version of the tradescreen for the case where the position is being transferred in is shown in FIG. 61. The operation of the tradescreens of FIGS. 60 and 61 is very similar to that of the tradescreens of FIGS. 54 and 55 for opening long positions in put options and may be understood by reference to the corresponding descriptions. A tradescreen provided to a user for closing a long position in a call through an offsetting transaction is illustrated in FIG. 62. The gray boxes of FIG. 62 are fields in which data may be entered by the user. A version of the tradescreen for the case where the position is being transferred out is shown in FIG. 63. The operation of the tradescreens of FIGS. 62 and 63 is very similar to that of the tradescreens of FIGS. 56 and 57 for closing long positions in put options by an offsetting transaction and may be understood by reference to the corresponding descriptions.

FIG. 64 shows a tradescreen for a hypothetical transaction for closing a long position in a call by exercising the call. The operation of the tradescreen of FIG. 64 is very similar to that of the tradescreen of FIG. 58 for closing long positions in call options by exercising the option and may be understood by reference to the corresponding description.

FIG. 65 shows a tradescreen for a hypothetical transaction for closing a long position in a call through expiration of the call. The operation of the tradescreen of FIG. 65 is very similar to that of the tradescreen of FIG. 59 for closing long positions in put options by expiration of the option and may be understood by reference to the corresponding description.

A tradescreen provided to a user for opening a covered short position in a put option is illustrated in FIG. 66. A version of the tradescreen for the case where the position is being transferred in is shown in FIG. 67. The tradescreen of FIG. 66 presents current open position information for the selected covered short put in the column headed "Open Positions." This information is dynamically generated by the server using data stored in the portfolio database for the selected portfolio. The open position information includes the date (or date range) of the opening of existing positions in the selected security (G9), price per contract (G11), number of contracts (G13), short shares available (G15), short shares utilized (G17), commissions paid (G19), other costs (G21), gross sold receipts (G23), cash disbursed (G25), and net sold receipts (G27). The tradescreen also presents current information for the portfolio as a whole under the heading "Before." This information includes current buying power (G33), cash available (G35), equity utilized (G37), margin available (G39) and margin payable (G41). The tradescreen also includes fields for entering data characterizing a hypothetical trade. Based on the entered information, the tradescreen calculates the effects of execution of the hypothetical trade on the overall holdings of the security, and on the portfolio as a whole. The fields for entering data characterizing the hypothetical trade are provided under the heading "Sell." They include fields for the trade date (I9), price per contract (I11), number of contracts (I13), commissions paid (I19), and other costs (I21). The tradescreen also includes fields for entering the strike price (D5) and expiration month (G5) of the selected put.

Using the information entered in the aforementioned fields, the tradescreen calculates revised information that represents the final state of the transaction, the state of the user's portfolio, and the state of the user's holdings in the selected put, in the event that the hypothetical trade is executed. Revised information representing the final state of the trade is included under the "Sell" column, including short shares available (I15), short shares utilized (I17), gross sold receipts (I23), cash disbursed (I25), and net sold receipts (I27). Revised information representing the state of the portfolio after execution of the hypothetical trade is presented under the heading "After" and includes current buying power (I33), cash available (I35), equity utilized (I37), margin available (I39) and margin payable (I41). Revised information representing the state of the user's holdings in the selected put after execution of the hypothetical trade is presented under the heading "Average/Total" and includes average price per contract (K11), total number of contracts (K13), short shares available (K15), short shares utilized (K17), total commissions paid (K19), total other costs (K21), total gross sold receipts (K23), total cash disbursed (K25), and total net sold receipts (K27). The routines for calculating these quantities are shown in corresponding fields in FIG. 21b.

In the preferred embodiment, the quantities calculated by the tradescreen are calculated automatically upon entering data into the "Sell" fields I9, I11, I13, I19 and I21 and then tabbing out of field I21. In addition, a calculate tool is provided at the bottom of the tradescreen (C43) to enable the user to recalculate the tradescreen upon changing of any of the entered data. The tradescreen also includes a cancel tool (G43) for canceling the tradescreen and a reset tool (I43) for resetting all of the data fields. The tradescreen of FIG. 66 further includes a submit tool (K43) that submits the hypothetical trade for execution in accordance with the entered data. Thus the user may vary the trade data entered into the tradescreen and view the effects on the portfolio and individual put, and then submit a trade once the appropriate parameters for the trade have been determined.

The tradescreen also includes a transfer in field (J5) for indicating that the entered data reflect parameters of a transfer in rather than a trade. A version of the tradescreen that is produced for transfer in is shown in FIG. 67. When this field is marked, the "Sell" column is captioned as "Transfer In," and operation of the submit tool (K43) causes the data entered into the tradescreen to be transmitted to the server for entry in the general ledger and portfolio database, but does not initiate a trade. Like long positions in options, short positions in options may be closed by making an offsetting transaction, by exercising the option, or by expiration of the option. The preferred embodiment of the invention provides tradescreens for each of these alternatives.

A first tradescreen provided to a user for closing a covered short position in a put by purchasing the put is illustrated in FIG. 68. The gray boxes of FIG. 68 are fields in which data may be entered by the user. A version of the tradescreen for the case where the position is being transferred out is shown in FIG. 69.

The tradescreen of FIG. 68 presents current sold security information for the selected short put in the column headed "Sold." This information is dynamically generated by the server using data stored in the portfolio database for the selected portfolio. The sold security information includes the date (or date range) of the opening of existing positions in the selected security (H7), price per contract (H9), number of contracts (H11), short shares utilized (H13), commissions (H15), other costs (H17), and net sold receipts (H19). The tradescreen also presents current information for the portfolio as a whole under the heading "Before." This information includes current buying power (H37), cash available (H39), equity utilized (H41), margin available (H43) and margin payable (H45).

The tradescreen also includes fields for entering transaction data characterizing a hypothetical trade. Based on the entered information, the tradescreen calculates the effects of execution of the hypothetical trade on the overall holdings of the security and on the portfolio as a whole. The fields for entering data characterizing the hypothetical trade are provided under the heading "Buy." They include fields for the transaction date (J7), price per contract (J9), number of contracts (J11), commissions paid (J15), other costs (J17), and margin borrowed (J31).

Using the information entered in the aforementioned fields, the tradescreen calculates revised portfolio information and revised holdings information reflecting changes that will occur if the hypothetical trade is executed. Revised information representing the final state of the trade is included under the "Before Taxes" and "After Taxes" columns, including net gain/(loss) (J23), (L23), net gain/(loss) percentage (J25), (L25), net annualized return (CAGR) (J27), (L27). The "Before Taxes" column also presents bought settlement (J29) and cash disbursed (J33). The tradescreen also calculates short shares released (J13) and net allocated basis (J19). Revised information representing the state of the portfolio after execution of the hypothetical trade is presented under the heading "After" and includes current buying power (J37), cash available (J39), equity utilized (J41), margin available (J43) and margin payable (J45). Revised information representing the state of the user's holdings in the selected short put after execution of the hypothetical trade is presented under the heading "Difference/Total" and includes days held (L7), difference in price per contract (L9), difference in number of contracts (L11), total commissions paid (L15), total other costs (L17), and net allocated basis (L19). The tradescreen also calculates days until expiration (F5). T In the preferred embodiment, the quantities calculated by the tradescreen are calculated automatically upon entering data into the "Buy" fields J7, J9, J11, J15 and J17 and then tabbing out of field J17. The quantities are recalculated upon entering a value into and tabbing out of the margin borrowed field (J31). In addition, a calculate tool is provided at the bottom of the tradescreen (D47) to enable the user to recalculate the tradescreen upon changing of any of the entered data. The tradescreen also includes a cancel tool (H47) for canceling the tradescreen and a reset tool (J47) for resetting all of the data fields.

The tradescreen of FIG. 68 further includes a submit tool (L47) that submits the hypothetical trade for execution in accordance with the entered data. Thus the user may vary the trade data entered into the tradescreen and view the effects on the portfolio and positions held in the security, and then submit a trade once the appropriate parameters for the trade have been determined.

The tradescreen also includes a transfer out field (K3) for indicating that the entered information reflects a transfer out rather than a transaction. A version of the tradescreen that is produced for transfer out is shown in FIG. 69. When this field is marked, the rows 21, 23, 25, 27, 29 and 31 (before taxes/after taxes, net gain/(loss), net gain/(loss) %, net annualized return, bought settlement, margin borrowed) are eliminated from the tradescreen, the "Buy" column is captioned as "Transfer Out," and operation of the submit tool (L47) causes the data entered into the tradescreen to be transmitted to the server for entry in the general ledger and portfolio database, but does not initiate a trade.

FIG. 70 shows a tradescreen for closing a covered short position in a put by exercising the put.

There are a number of notable differences between the exercise tradescreen of FIG. 70 and the offsetting transaction tradescreen of FIG. 68. Rather than displaying the sold price of the contract and entering the bought price of the contract, the tradescreen of FIG. 70 shows the sold price per share (H9) and the strike (exercise) price of the put (J20). Similarly, rather than showing contracts bought and entering contracts sold, the tradescreen shows contracts open (H20) and has a field for entering contracts to be exercised (J9). The tradescreen also shows the number of shares represented by the open contracts (H13) and calculates the number of shares represented by the contracts to be exercised (J13). The tradescreen also calculates a net gain/loss on the option (J21) and a net gain/loss on the underlying security (J23).

FIG. 71 shows a tradescreen for closing a long position in a put through expiration of the put. FIG. 24*b* shows an Excel implementation of routines embedded in the tradescreen of FIG. 71 and FIG. 24*c* shows general ledger debit and credit entries for the expiration illustrated in FIG. 71.

There are a number of notable differences between the expiration tradescreen of FIG. 71 and the offsetting transaction tradescreen of FIG. 68. Most notably, the expiration tradescreen does not have fields for entering information, since the fact of the expiration is the only new information needed to determine the effect of this occurrence using information previously recorded when the position was entered or transferred in to the portfolio. Also, the expiration tradescreen does not calculate quantities for bought settlement, margin borrowed, or cash disbursed.

Figure 72:
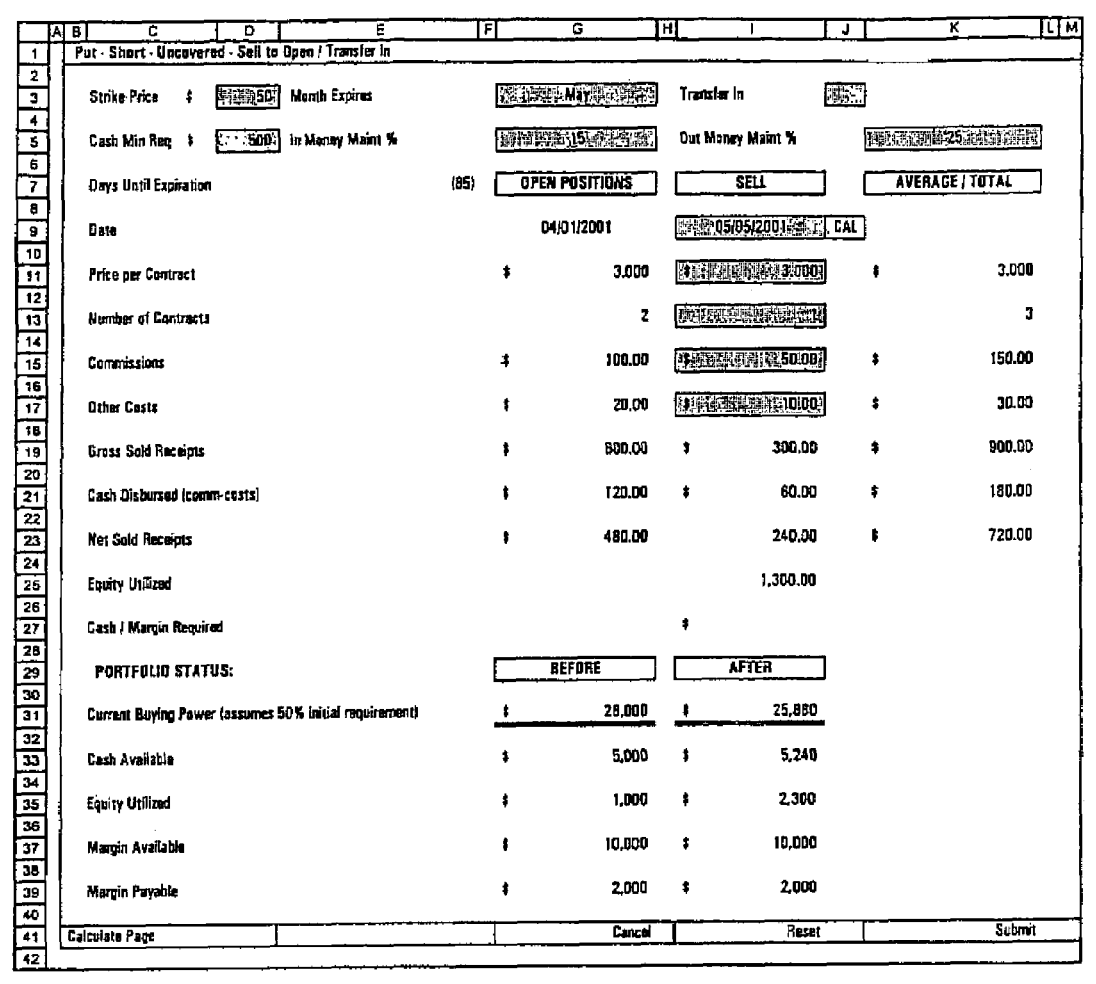

A tradescreen provided to a user for opening an uncovered short position in a put option is illustrated in FIG. 72. The gray boxes of FIG. 72 are fields in which data may be entered by the user. A version of the tradescreen for the case where the position is being transferred in is shown in FIG. 73.

The tradescreen of FIG. 72 for an uncovered short put is similar to the tradescreen of FIG. 66 for a covered short put, but with several notable differences. Unlike the tradescreen for the covered short put, the tradescreen of FIG. 72 includes fields for entering a cash minimum requirement (D5), an in the money maintenance % (G5), and an out of the money maintenance % (K5). In addition, the tradescreen of FIG. 72 calculates equity utilized by the hypothetical trade (I25). The tradescreen of FIG. 72 does not calculate short shares available or utilized since the short position is uncovered.

The tradescreen also includes a transfer in field (J3) for indicating that the transaction data reflect parameters of a transfer in rather than an actual transaction. A version of the tradescreen that is produced for transfer in is shown in FIG. 73. When this field is marked, the "Sell" column is captioned as "Transfer In," and operation of the submit tool (K41) causes the data entered into the tradescreen to be transmitted to the server for entry in the general ledger and portfolio database, but does not initiate a trade.

Like covered short positions in puts, uncovered short positions in puts may be closed by making an offsetting transaction, by exercising the option, or by expiration of the option. The preferred embodiment of the invention provides tradescreens for each of these alternatives.

A first tradescreen provided to a user for closing an uncovered short position in a put by an offsetting transaction is illustrated in FIG. 74. The gray boxes of FIG. 74 are fields in which data may be entered by the user. A version of the tradescreen for the case where the position is being transferred out is shown in FIG. 75.

The tradescreen of FIG. 74 for closing an uncovered short put by an offsetting transaction is similar to the tradescreen of FIG. 68 for closing a covered short put, but with several notable differences. Unlike the tradescreen for the covered short put, the tradescreen of FIG. 74 includes fields for entering a cash minimum requirement (E5), an in the money maintenance % (H5), and an out of the money maintenance % (L5). The tradescreen of FIG. 74 does not calculate short shares utilized or released since the short position is uncovered.

FIG. 76 shows a tradescreen for closing a covered short position in a put by exercising the put.

There are a number of notable differences between the exercise tradescreen of FIG. 76 and the offsetting transaction tradescreen of FIG. 74. Rather than displaying the sold price of the contract and entering the bought price of the contract, the tradescreen of FIG. 76 shows the average price per share for shares long in the account (H20) and the strike (exercise) price of the put (J11). Similarly, rather than showing contracts sold and entering contracts bought in an offsetting transaction, the tradescreen shows contracts open (H13) and calculates contracts exercised (J13), and also shows the number of shares long in the account (H15) and calculates the number of shares represented by the exercised contracts (J15). The tradescreen of FIG. 76 also has a field for entering a stock equity utilized % (L3). The tradescreen of FIG. 76 does not calculate net sold receipts, net gain/(loss), net gain/(loss) %, or net annualized return. The tradescreen of FIG. 76 also calculates net cash disbursed (J25) as a result of the trade.

FIG. 77 shows a tradescreen for closing an uncovered short position in a put through expiration of the put.

There are a number of notable differences between the expiration tradescreen of FIG. 77 and the offsetting transaction tradescreen of FIG. 74. Most notably, the expiration tradescreen does not have fields for entering information, since the fact of the expiration is the only new information needed to determine the effect of this occurrence using information previously recorded when the position was entered or transferred in to the portfolio. Also, the expiration tradescreen does not calculate quantities for bought settlement, margin borrowed, or cash disbursed.

A tradescreen provided to a user for opening a covered short position in a call option is illustrated in FIG. 78. The gray boxes of FIG. 78 are fields in which data may be entered by the user. A version of the tradescreen for the case where the position is being transferred in is shown in FIG. 79.

The operation of the tradescreens of FIGS. 78 and 79 is very similar to that of the tradescreens of FIGS. 66 and 67 for opening covered short positions in puts and may be understood by reference to the corresponding description.

A tradescreen provided to a user for closing a covered short position in a call through an offsetting transaction is illustrated in FIG. 80. The gray boxes of FIG. 80 are fields in which data may be entered by the user. A version of the tradescreen for the case where the position is being transferred out is shown in FIG. 81.

The operation of the tradescreens of FIGS. 80 and 81 is very similar to that of the tradescreens of FIGS. 68 and 69 for closing covered short positions in puts by an offsetting transaction and may be understood by reference to the corresponding description.

FIG. 82 shows a tradescreen for closing a covered short position in a call by exercising the call. The operation of the tradescreen of FIG. 82 is very similar to that of the tradescreen of FIG. 70 for closing covered short positions in puts by exercising the puts and may be understood by reference to the corresponding description.

FIG. 83 shows a tradescreen for closing a covered short position in a call through expiration of the call. The operation of the tradescreen of FIG. 83 is very similar to that of the tradescreen of FIG. 71 for closing uncovered short positions in puts by expiration of the puts and may be understood by reference to the corresponding description.

A tradescreen provided to a user for opening an uncovered short position in a call option is illustrated in FIG. 84. The gray boxes of FIG. 84 are fields in which data may be entered by the user. A version of the tradescreen for the case where the position is being transferred in is shown in FIG. 85.

The operation of the tradescreens of FIGS. 84 and 85 is very similar to that of the tradescreens of FIGS. 72 and 73 for opening uncovered short positions in puts and may be understood by reference to the corresponding description.

A tradescreen provided to a user for closing an uncovered short position in a call through an offsetting transaction is illustrated in FIG. 86. The gray boxes of FIG. 86 are fields in which data may be entered by the user. A version of the tradescreen for the case where the position is being transferred out is shown in FIG. 87.

The operation of the tradescreens of FIGS. 86 and 87 is very similar to that of the tradescreens of FIGS. 74 and 75 for closing uncovered short positions in puts by an offsetting transaction and may be understood by reference to the corresponding description.

Figure 88:
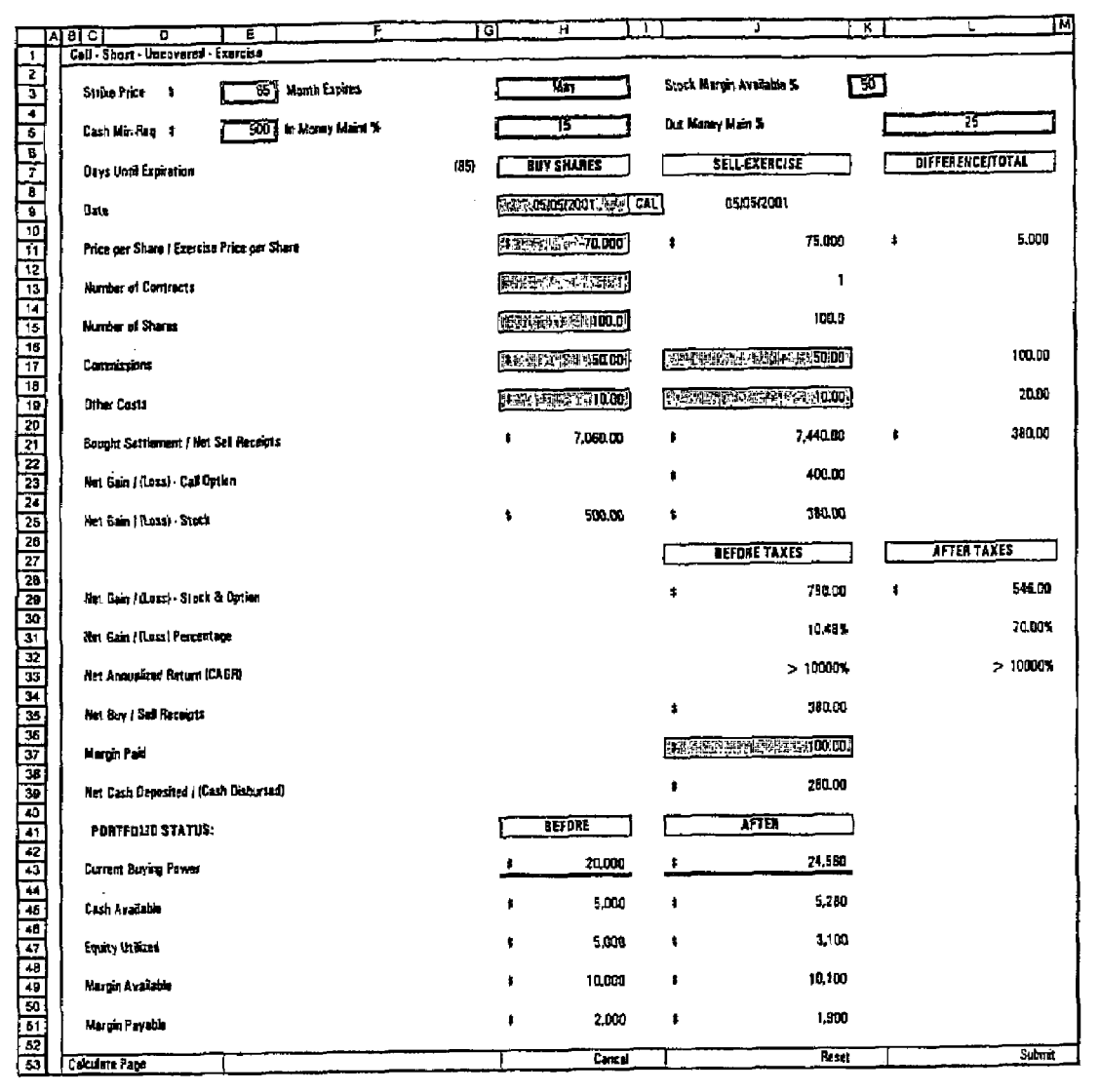

FIG. 88 shows a tradescreen for closing an uncovered short position in a call by exercising the call. The operation of the tradescreen of FIG. 88 is very similar to that of the tradescreen of FIG. 76 for closing uncovered short positions in puts by exercising the puts and may be understood by reference to the corresponding description.

FIG. 89 shows a tradescreen for closing an uncovered short position in a call through expiration of the call. The operation of the tradescreen of FIG. 89 is very similar to that of the tradescreen of FIG. 77 for closing covered short positions in puts by expiration of the puts and may be understood by reference to the corresponding description.

The functionalities as described above or as shown in the drawings are implemented in a programmable computing system comprised of elements such as a programmable server device and a programmable client device. Programming code stored in computer readable media associated with these devices is used to cause the devices to operate in a manner that provides these functionalities.

While the preferred embodiment described herein focus on securities and options transactions, alternative embodiments need not be limited to portfolios of these types of assets, but may be modified to encompass transactions in any other kind of tradable asset such as commodity and currency futures, debt instruments, commercial paper, or real property.

What is claimed is:

1. A method for operating a gaming system on a computer system having a server and at least one computer, the method comprising:
   opening and closing simulated positions of real world securities in simulated securities portfolios for a plurality of players in accordance with instructions provided by each of the plurality of players;
   tracking by the server or the at least one computer performances of the simulated securities portfolio of each of the plurality of players relative to one of 1) performances of the simulated securities portfolios of the other players, and 2) one or more of a securities index;
   maintaining a portfolio database in the server for the simulated securities portfolios for each of the plurality of players, wherein each simulated securities portfolio has current financial information associated with the respective simulated securities portfolio;
   receiving a request for a tradescreen from a requesting player of the plurality of players; and
   generating the tradescreen based on the portfolio database of the server for the requesting player for display on a computer of the requesting player, the tradescreen for displaying the current financial information for the simulated securities portfolio of the requesting player and for calculating and displaying revised financial information for the simulated securities portfolio of the requesting player, the tradescreen for entering proposed data comprising one of a proposed trade and a proposed transfer of the simulated positions of real world securities, the tradescreen for allowing the requesting player to determine if the proposed data entered into the tradescreen would produce one of a first type of result and a second type of result;
   providing an interface on the tradescreen for enabling the requesting player to submit the transaction corresponding to the proposed data entered into the tradescreen to update the portfolio database in the server with the revised financial information for the simulated securities portfolio of the requesting player in an event the requesting player determines that the proposed data would produce the first type of result; and
   updating the portfolio database in the server with the revised financial information for the simulated securities portfolio of the requesting player upon the requesting player submitting the transaction;
   wherein the revised financial information for the simulated securities portfolio of the requesting player is based on the proposed data entered into the tradescreen and the current financial information for the simulated securities portfolio of the requesting player.

2. The method claimed in claim 1, further comprising: transmitting the tradescreen to the requesting player.

3. The method claimed in claim 2, further comprising:
   executing the tradescreen to calculate the revised financial information for the simulated securities portfolios of the requesting player based on the proposed data entered into the tradescreen.

4. The method claimed in claim 1, further comprising:
   providing the tradescreen with
   financial information representing a current state of the simulated securities portfolio;
   financial information representing a current state of any holdings within the simulated securities portfolio of a selected financial instrument;
   fields for entry of data;
   routines for calculating the revised financial information representing a revised state of the simulated securities portfolio reflecting changes that will occur if the proposed data is submitted; and
   routines for calculating the revised financial information representing a revised state of the holdings within the simulated securities portfolio of the selected financial instrument reflecting changes that will occur if the proposed data is submitted.

5. The method of claim 1, further comprising:
   receiving a request for a financial position report for the simulated securities portfolio of the requesting player;
   calculating current asset, liability, and equity balances for the simulated securities portfolios of the requesting player as a whole using current prices for securities held in the simulated securities portfolios, wherein the liability balances include balances that reflect obligations that would result if all securities held in the simulated securities portfolios were liquidated at said current prices;
   generating a financial position report for the simulated securities portfolio that presents the asset, liability, and equity balances of the simulated securities portfolio in a double entry format; and
   transmitting the financial position report to the requesting player.

6. The method claimed in claim 5, further comprising:
   associating the asset, liability, and equity balances displayed in the financial position report with hyperlinks to corresponding reports supporting the respective balances.

7. The method claimed in claim 5, further comprising:
   calculating revenue and expense balances for the simulated securities portfolio as a whole during a given period of time, wherein the sum of the revenue balances less the sum of the expense balances equals the net worth after taxes of the simulated securities portfolio as a whole during said period of time;
   wherein said financial position report further comprises a profit and loss section presenting said revenue and expense balances and said net worth after taxes for said period of time.

8. The method claimed in claim 7, further comprising:
   associating the revenue and expense balances of the profit and loss section with hyperlinks to corresponding reports supporting the respective balances.

9. The method claimed in claim 5, further comprising:
saving the financial position report for later display.

10. The method claimed in claim 1, wherein the current financial information for the simulated securities portfolio for each of the plurality of players is retrieved from the portfolio database.

11. The method claimed in claim 10, wherein the revised financial information for the simulated securities portfolio of the requesting player replaces the current financial information for the simulated securities portfolio of the requesting player in the portfolio database when the requesting player submits the proposed data.

12. The method claimed in claim 1, wherein the tradescreen is customized to a selected financial instrument and a type of action to be taken.

13. The method claimed in claim 12,
wherein the selected financial instrument is a stock; and
wherein the type of action to be taken is one of opening a long position in the stock, closing a long position in the stock, opening a short position in the stock, and closing a short position in the stock.

14. The method claimed in claim 12,
wherein the selected financial instrument is an option; and
wherein the type of action to be taken is one of opening a long position in the option, closing a long position in the option by an offsetting transaction, opening a short position in the option by exercising the option, closing a short position in the option by expiration of the option, opening a covered short position in the option, closing a covered short position in the option by an offsetting transaction, closing a covered short position in the option by exercising the option, and closing a covered short position in the option by expiration of the option.

15. The method of claim 1, wherein providing an interface on the tradescreen comprises enabling the requesting player to not submit the transaction corresponding to the proposed data entered into the tradescreen in an event the requesting player determines that the proposed data would produce the second type of result.

16. The method of claim 1,
wherein the first type of result comprises a result that is deemed appropriate by the requesting player; and
wherein the second type of result comprises a result that is deemed inappropriate by the requesting player.

17. An apparatus for operating a gaming system comprising:
a programmable device configured to 1) open and close simulated positions of real world securities in simulated securities portfolios for a plurality of players in accordance with instructions provided by each of the plurality of players, and 2) track performances of the simulated securities portfolio of each of the plurality of players relative to one of (i) performances of the simulated securities portfolios of the other players, and (ii) one or more of a securities index;
a portfolio database for the simulated securities portfolios for each of the plurality of players, wherein each simulated securities portfolio has current financial information associated with the respective simulated securities portfolio; and
a tradescreen generated based on the portfolio database in response to a request of a requesting player of the plurality of players, the tradescreen for displaying the current financial information for the simulated securities portfolio of the requesting player, and for calculating and displaying revised financial information for the simulated securities portfolio of the requesting player, the tradescreen for entering proposed data comprising one of a proposed trade and a proposed transfer, the tradescreen for allowing the requesting player to determine if the proposed data entered into the tradescreen would produce one of a first type of result and a second type of result, the tradescreen having an interface for enabling the requesting player to submit the transaction corresponding to the proposed data entered into the tradescreen to update the portfolio database with the revised financial information for the simulated securities portfolio of the requesting player in an event the requesting player determines that the proposed data would produce the first type of result;
wherein the portfolio database is updated with the revised financial information for the simulated securities portfolio of the requesting player upon the requesting player submitting the transaction; and
wherein the revised financial information for the simulated securities portfolio of the requesting player is based on the proposed data entered into the tradescreen and the current financial information for the simulated securities portfolio of the requesting player.

18. The apparatus claimed in claim 17, further comprising:
a transmission device for transmitting the tradescreen to the requesting player.

19. The apparatus claimed in claim 18, the programmable device further configured to execute the tradescreen to calculate the revised financial information for the simulated securities portfolios of the requesting player based on proposed data entered into the tradescreen.

20. The apparatus claimed in claim 17, wherein the tradescreen comprises:
financial information representing a current state of the simulated securities portfolio;
financial information representing a current state of any holdings within the simulated securities portfolio of a selected financial instrument;
fields for entry of data;
routines for calculating the revised financial information representing a revised state of the simulated securities portfolio reflecting changes that will occur if the proposed data is submitted; and
routines for calculating the revised financial information representing a revised state of the holdings within the simulated securities portfolio of the selected financial instrument reflecting changes that will occur if the proposed data is submitted.

21. The apparatus of claim 17, further comprising:
a receiving device for receiving a request for a financial position report for the simulated securities portfolio of the requesting player, the programmable device further configured to 1) calculate current asset, liability, and equity balances for the simulated securities portfolios of the requesting player as a whole using current prices for securities held in the simulated securities portfolio, wherein the liability balances include balances that reflect obligations that would result if all securities held in the simulated securities portfolio were liquidated at said current prices, 2) generate a financial position report for the simulated securities portfolio that presents the asset, liability, and equity balances of the simulated securities portfolio in a double entry format; and
a transmission device for transmitting the financial position report to the requesting player.

22. The apparatus claimed in claim 21, wherein the programmable device is further configured to save the financial position report for later display.

23. The apparatus claimed in claim 21, wherein asset, liability, and equity balances displayed in the financial position report are associated with hyperlinks to corresponding reports supporting the respective balances.

24. The apparatus claimed in claim 21,
the programmable device is further configured to calculate revenue and expense balances for the simulated securities portfolio as a whole during a given period of time;
wherein the sum of the revenue balances less the sum of the expense balances equals the net worth after taxes of the simulated securities portfolio as a whole during said period of time; and
wherein said financial position report further comprises a profit and loss section presenting said revenue and expense balances and said net worth after taxes for said period of time.

25. The apparatus claimed in claim 24, wherein revenue and expense balances of the profit and loss section are associated with hyperlinks to corresponding reports supporting the respective balances.

26. The apparatus claimed in claim 17, wherein the current financial information for the simulated securities portfolio for each of the plurality of players is retrieved from the portfolio database.

27. The apparatus claimed in claim 26, wherein the revised financial information for the simulated securities portfolio of the requesting player replaces the current financial information for the simulated securities portfolio of the requesting player in the portfolio database when the requesting player submits the proposed data.

* * * * *